(12) United States Patent
Murakami et al.

(10) Patent No.: US 9,393,988 B2
(45) Date of Patent: Jul. 19, 2016

(54) ARM STOPPER MECHANISM AND STEERING APPARATUS USING SAME

(71) Applicant: Showa Corporation, Gyoda-shi (JP)

(72) Inventors: Takuya Murakami, Haga-gun (JP); Masanori Matsumoto, Haga-gun (JP); Hideo Yoshimura, Haga-gun (JP); Satoru Higashi, Haga-gun (JP); Shinji Kuno, Haga-gun (JP); Taro Inoue, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/582,658

(22) Filed: Dec. 24, 2014

(65) Prior Publication Data
US 2015/0274205 A1    Oct. 1, 2015

(30) Foreign Application Priority Data

| Mar. 27, 2014 | (JP) | 2014-067247 |
| Mar. 27, 2014 | (JP) | 2014-067248 |
| Mar. 27, 2014 | (JP) | 2014-067249 |
| Mar. 27, 2014 | (JP) | 2014-067250 |
| Mar. 27, 2014 | (JP) | 2014-067251 |
| Mar. 27, 2014 | (JP) | 2014-067252 |
| Mar. 27, 2014 | (JP) | 2014-067253 |
| Mar. 27, 2014 | (JP) | 2014-067254 |
| Mar. 27, 2014 | (JP) | 2014-067255 |

(51) Int. Cl.
*B62D 3/00* (2006.01)
*B62D 5/04* (2006.01)
*B62D 6/10* (2006.01)

(52) U.S. Cl.
CPC .. *B62D 3/00* (2013.01); *B62D 5/04* (2013.01); *B62D 5/0457* (2013.01); *B62D 6/10* (2013.01)

(58) Field of Classification Search
CPC .............. B62D 3/00; B62D 6/10; B62D 5/04; B62D 5/0457; B62D 7/228
See application file for complete search history.

(56) References Cited

U.S. PATENT DOCUMENTS

| 4,865,143 | A * | 9/1989 | Hashimoto | B62D 6/10 180/443 |
| 7,458,593 | B2 * | 12/2008 | Saito | B62D 1/16 280/272 |
| 7,641,022 | B2 * | 1/2010 | Okada | B62D 5/04 180/444 |
| 7,644,939 | B2 * | 1/2010 | Tomita | B62D 1/16 180/444 |
| 7,654,360 | B2 * | 2/2010 | Saito | B62D 1/16 180/444 |

(Continued)

FOREIGN PATENT DOCUMENTS

JP    2007-196927 A    8/2007

OTHER PUBLICATIONS

Office Action mailed Nov. 9, 2016 for the related U.S. Appl. No. 14/065,576.

*Primary Examiner* — Laura Freedman
(74) *Attorney, Agent, or Firm* — Leason Ellis LLP

(57) ABSTRACT

A steering arm includes an output shaft hole into which an output shaft is fitted; two tie rod holes to which tie rods are respectively attached; and two striking surfaces that strike against a stopper. The stopper includes two contract surfaces. An angle formed by the two contact surfaces of the stopper is greater than an angle formed by the two striking surfaces of the steering arm, and is greater than or equal to 90°.

32 Claims, 61 Drawing Sheets

(56) References Cited

U.S. PATENT DOCUMENTS

| | | | | |
|---|---|---|---|---|
| 7,775,318 B2* | 8/2010 | Okada | ............... | B62D 1/10 |
| | | | | 180/444 |
| 7,791,296 B2* | 9/2010 | Ogawa | ............... | B62D 5/04 |
| | | | | 318/434 |
| 7,878,293 B2* | 2/2011 | Okada | ............... | B62D 5/04 |
| | | | | 180/443 |
| 8,066,092 B2* | 11/2011 | Shimizu | ............... | B62D 1/16 |
| | | | | 180/443 |
| 8,408,354 B2* | 4/2013 | Nozaki | ............... | B62K 5/01 |
| | | | | 180/444 |
| 8,448,742 B2* | 5/2013 | Kawada | ............... | B62D 1/16 |
| | | | | 180/443 |
| 8,517,142 B1* | 8/2013 | Farrar | ............... | B62D 5/0409 |
| | | | | 180/444 |
| 9,193,384 B1* | 11/2015 | Murakami | ............... | B62D 7/226 |
| 2007/0175696 A1 | 8/2007 | Saito et al. | | |
| 2011/0101904 A1 | 5/2011 | Sakamoto | | |
| 2014/0290432 A1* | 10/2014 | Murakami | ............... | B62D 3/02 |
| | | | | 74/99 R |

* cited by examiner

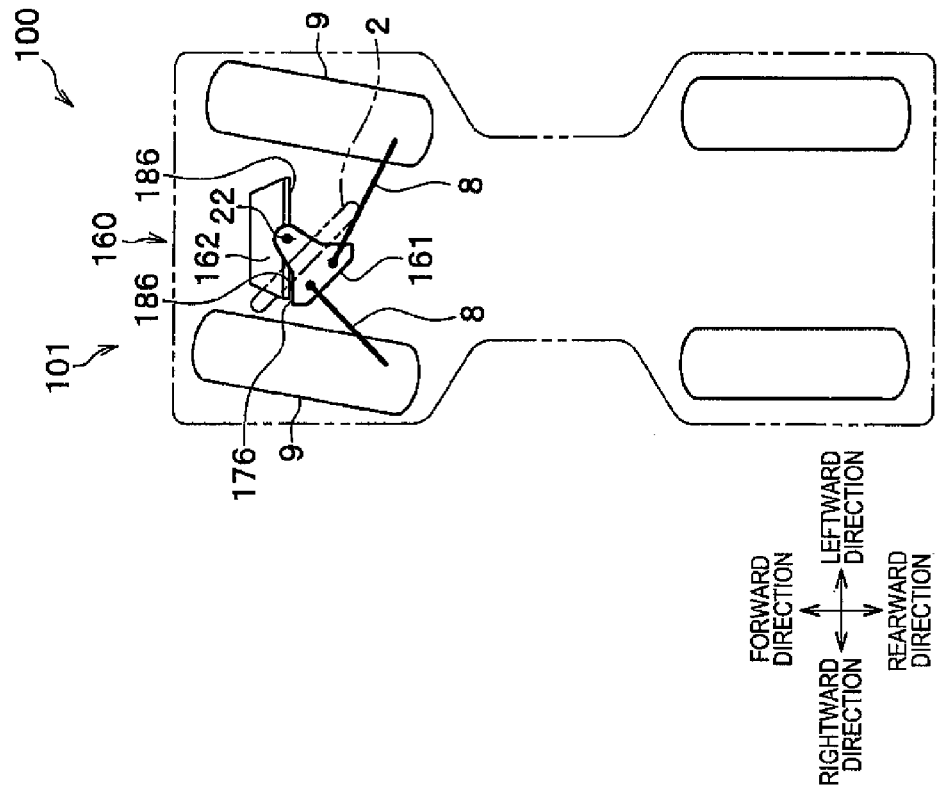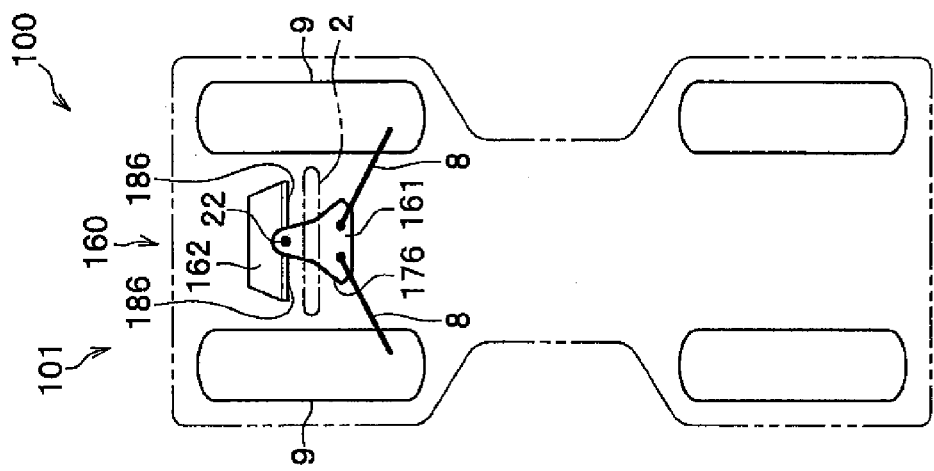

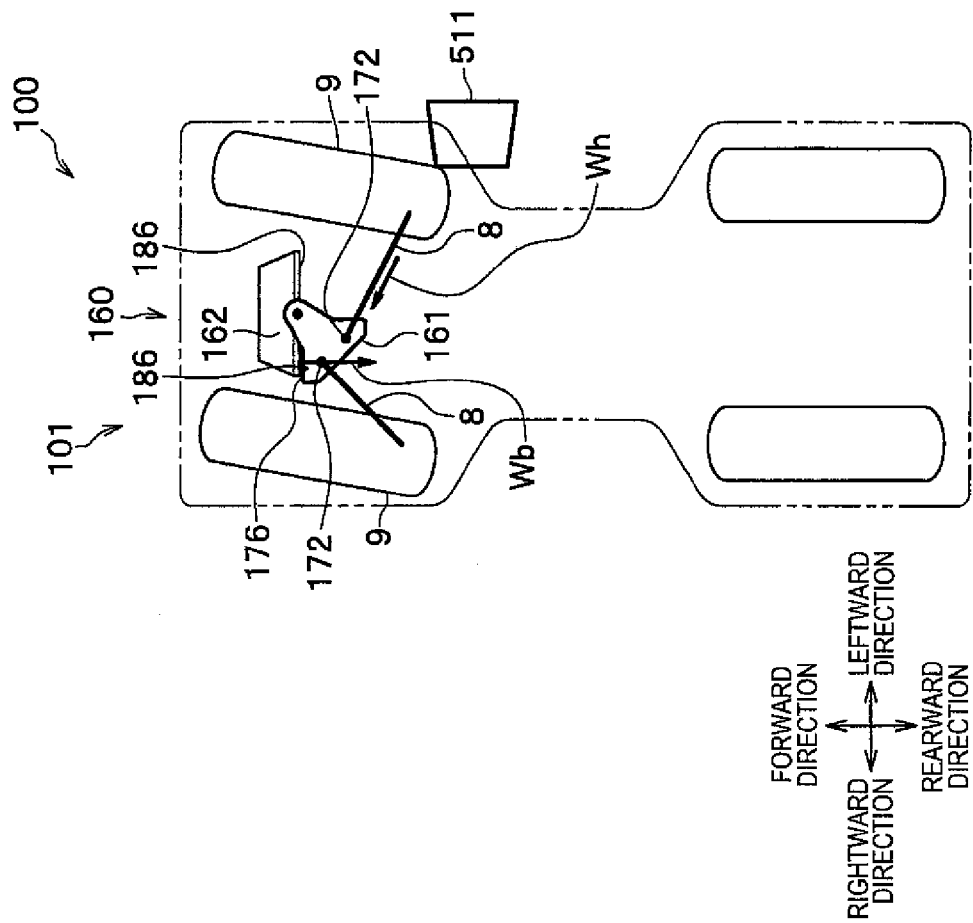

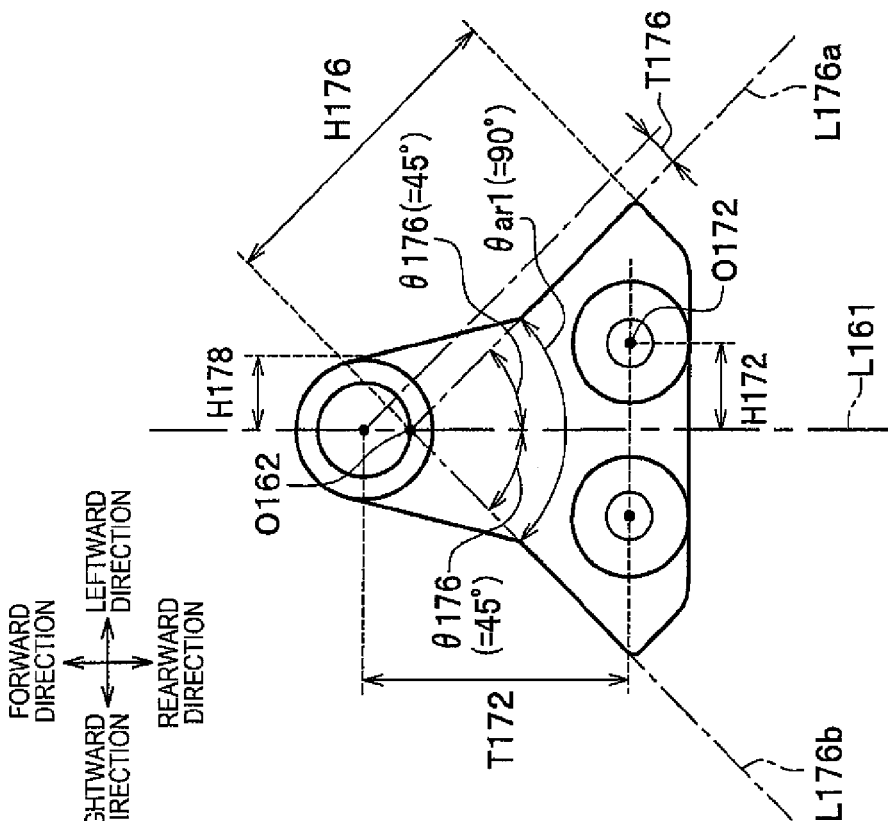
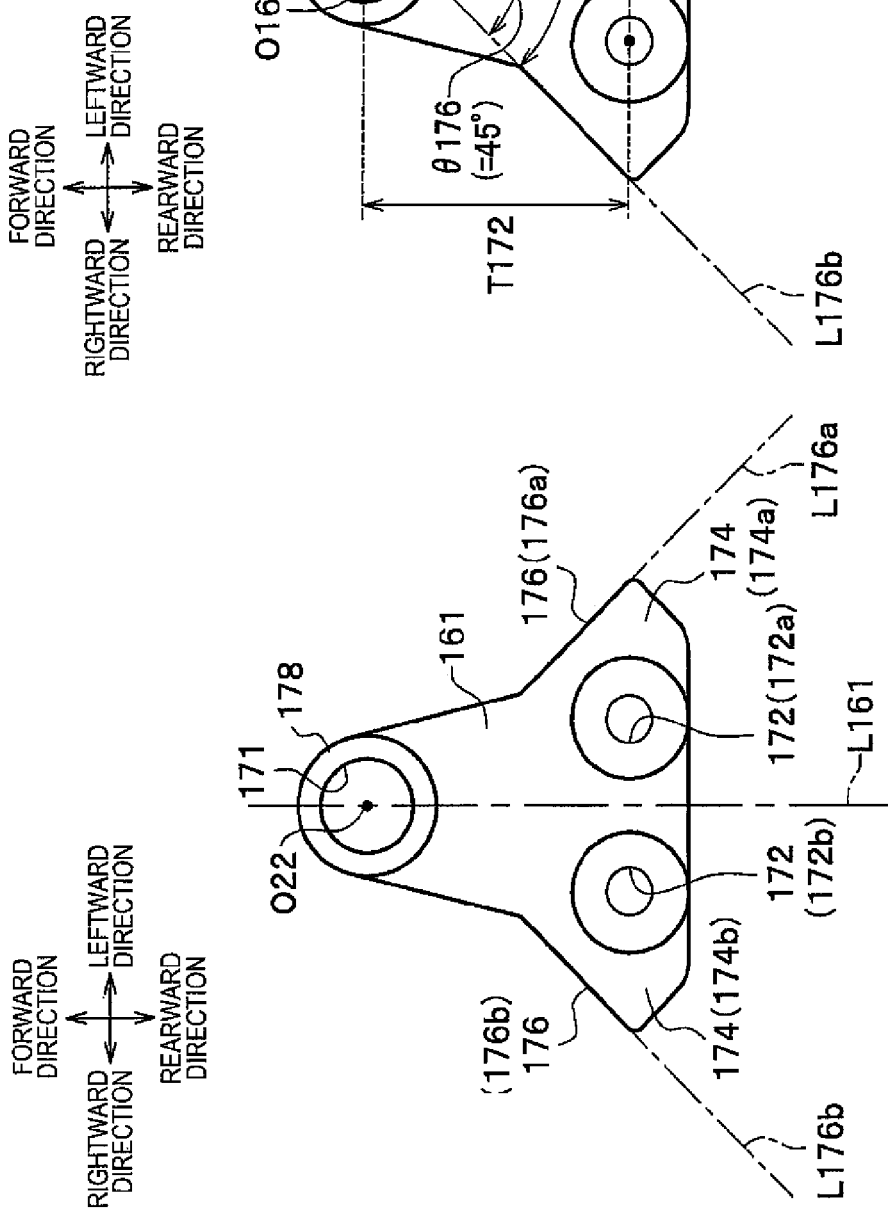

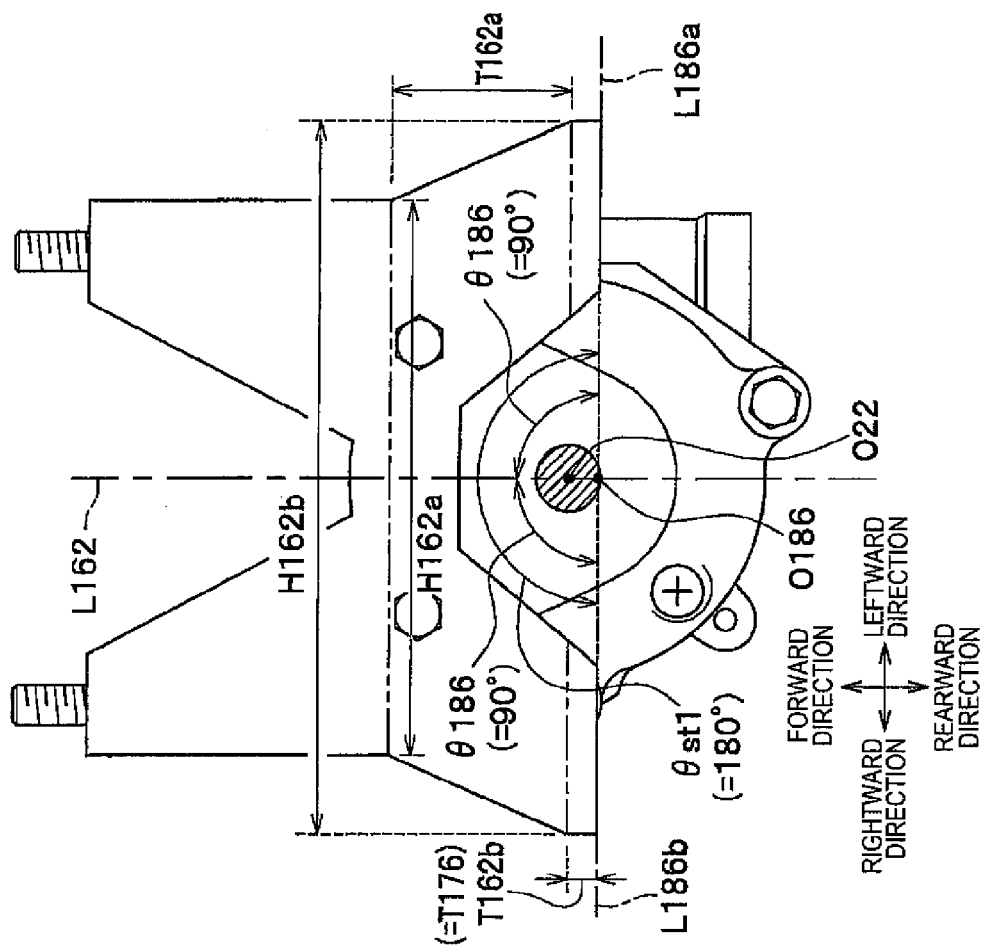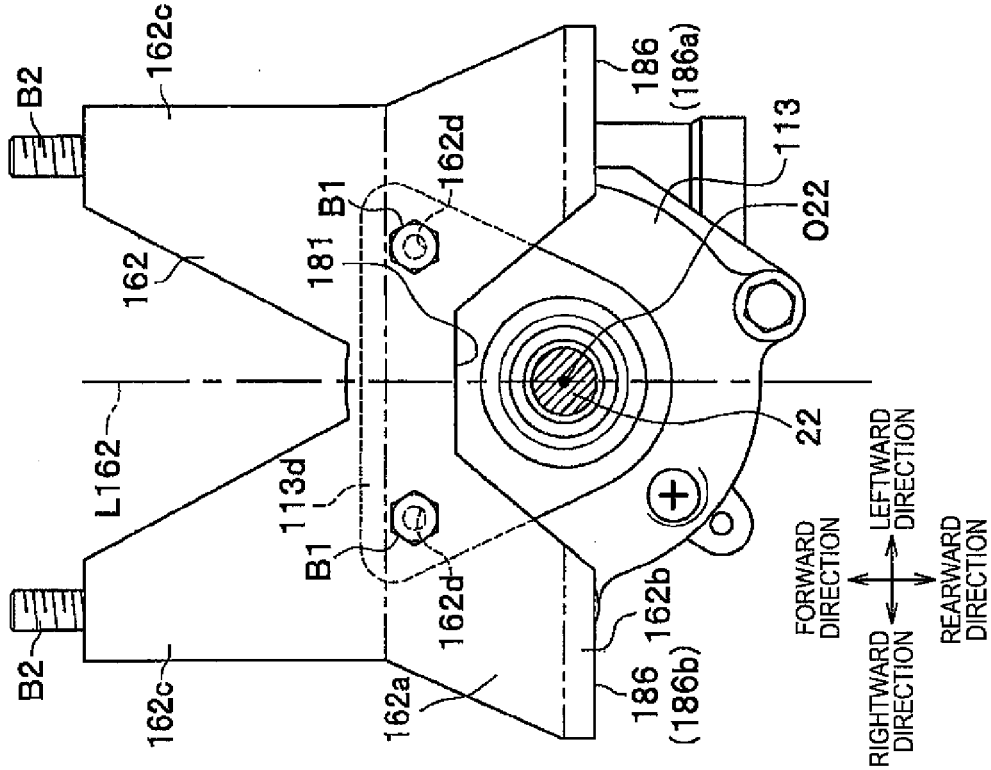

FIG. 11
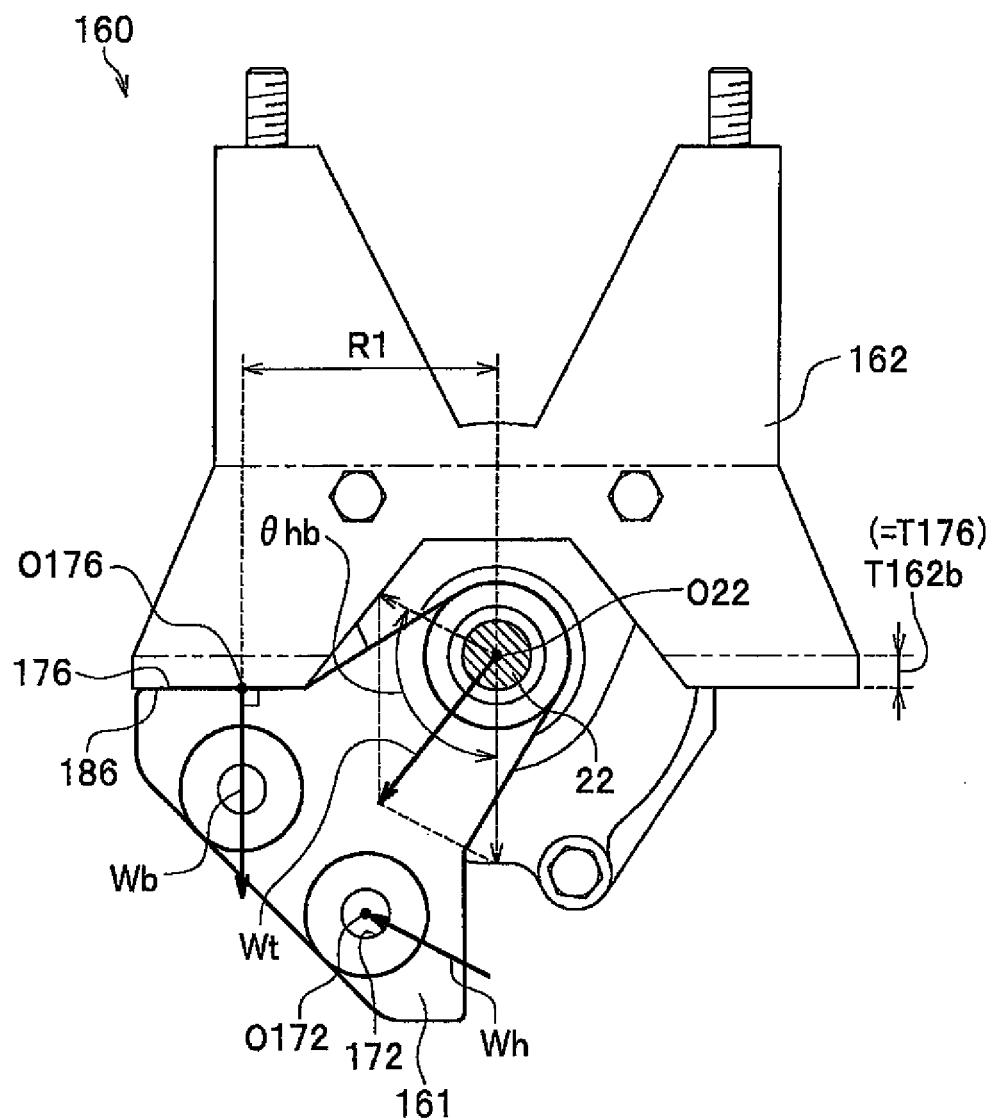
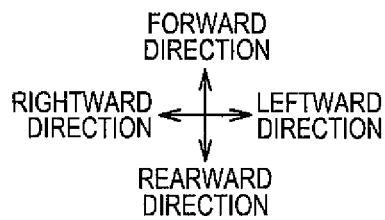

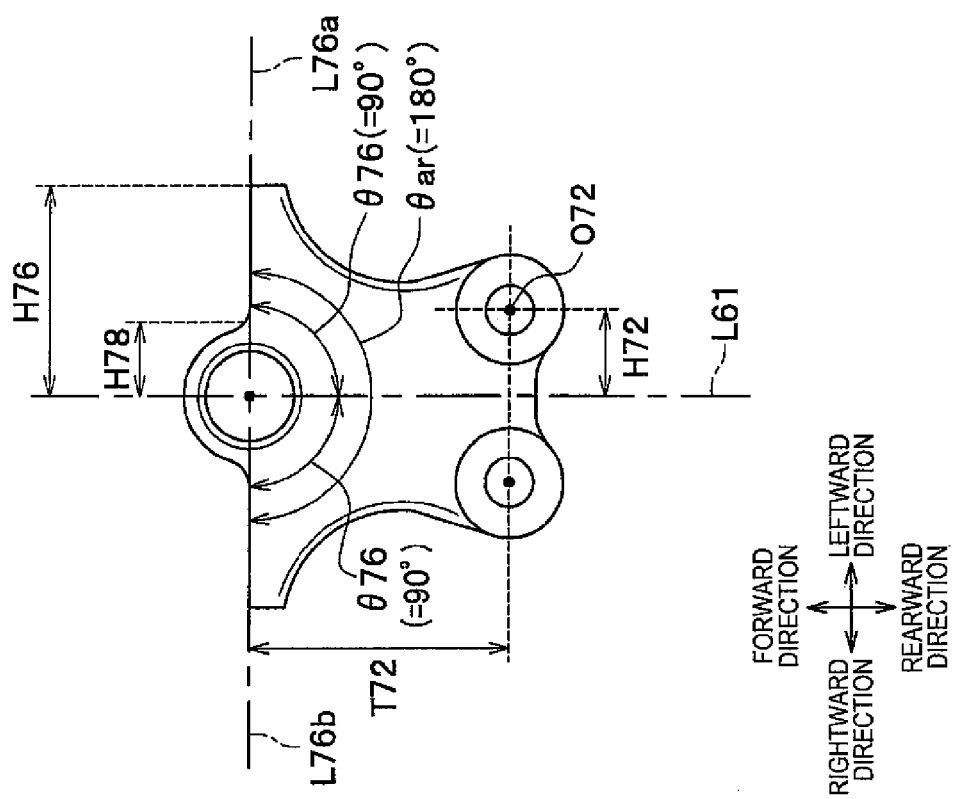
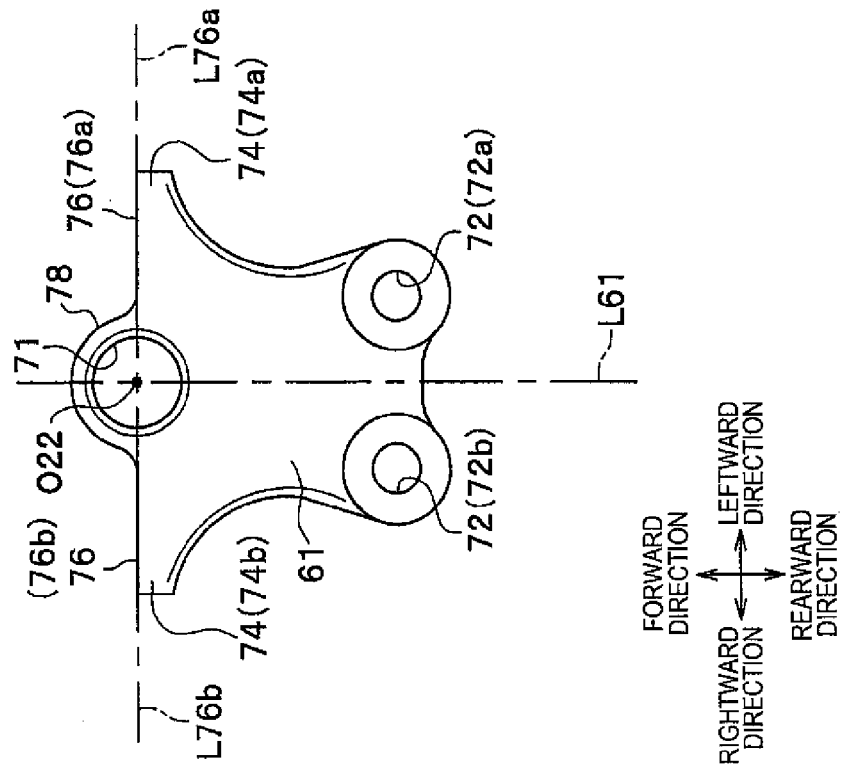

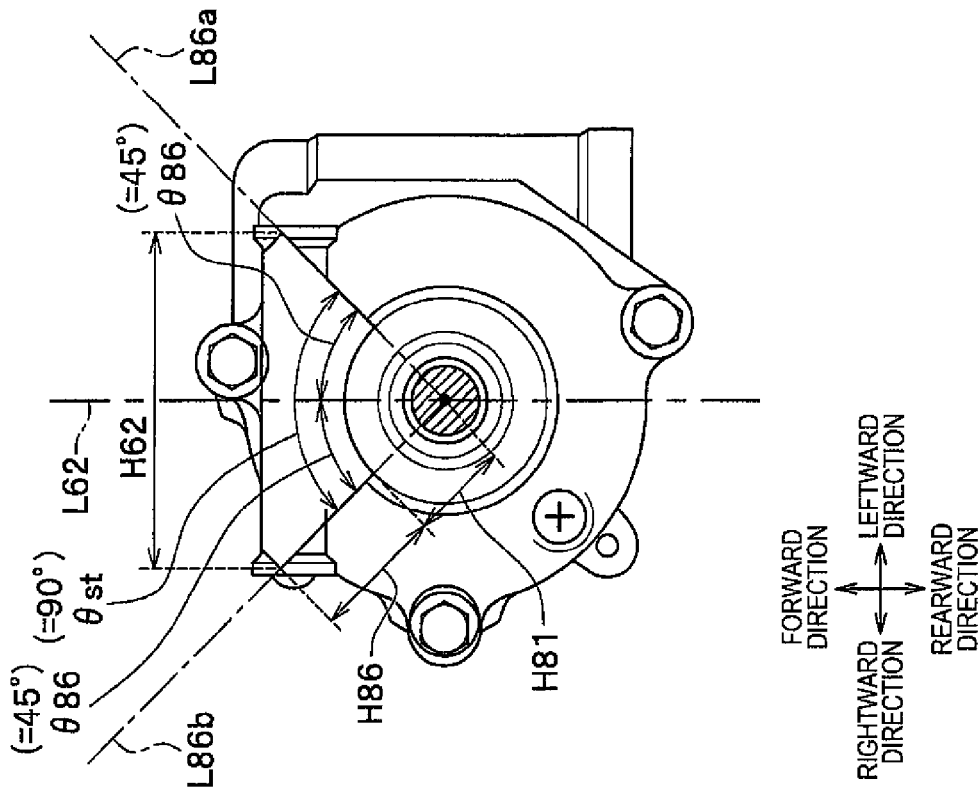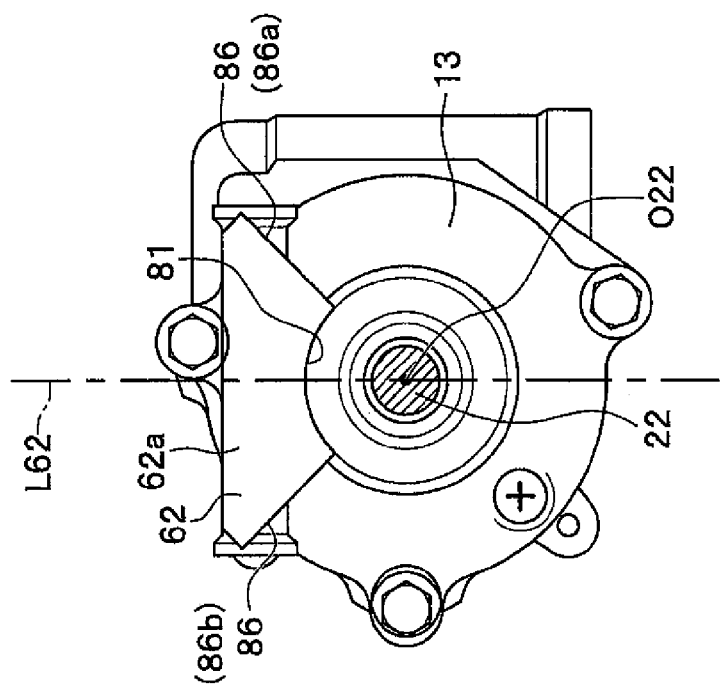

FIG. 33
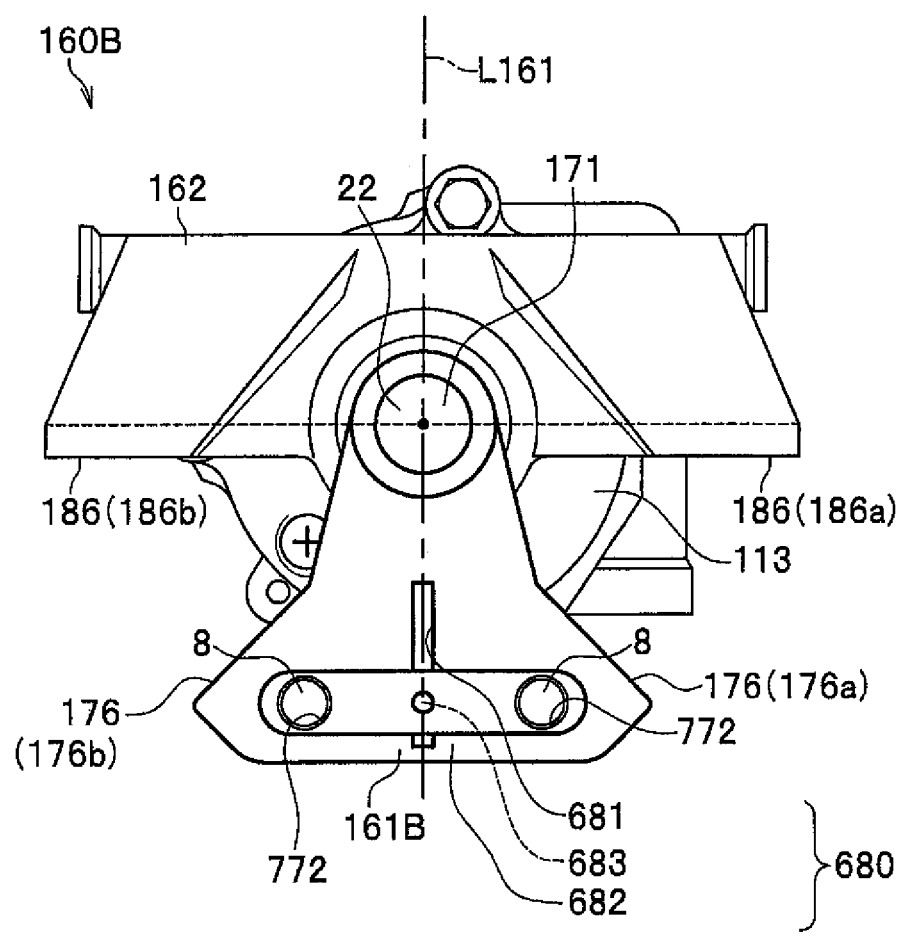
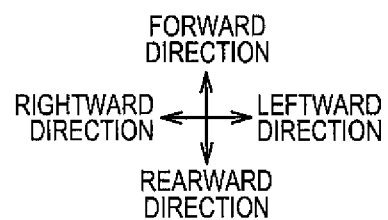

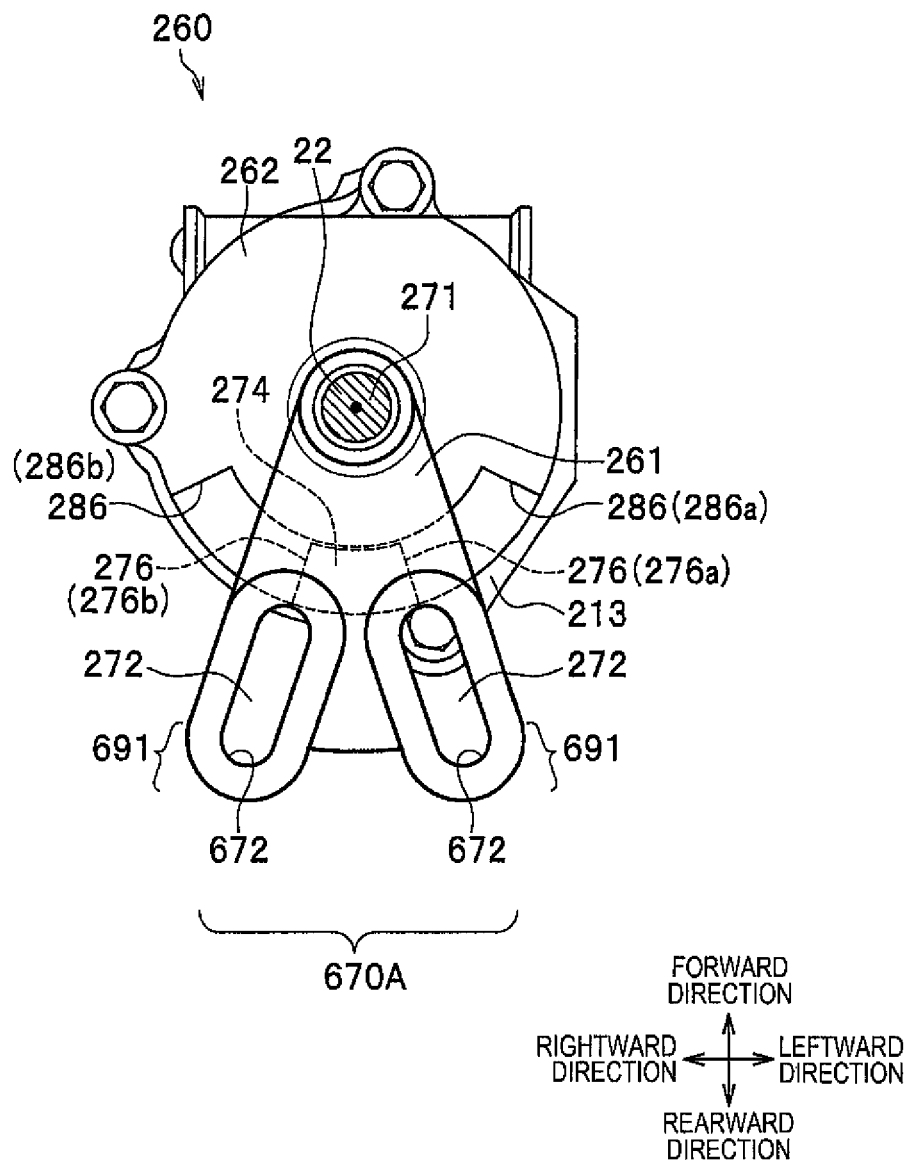

ARM STOPPER MECHANISM AND STEERING APPARATUS USING SAME

CROSS-REFERENCE TO RELATED APPLICATIONS

This application is based on and claims priority under 35 USC §119 from Japanese Patent Applications No. 2014-067247 filed on Mar. 27, 2014, No. 2014-067247 filed on Mar. 27, 2014, No. 2014-067248 filed on Mar. 27, 2014, No. 2014-067249 filed on Mar. 27, 2014, No. 2014-067250 filed on Mar. 27, 2014, No. 2014-067251 filed on Mar. 27, 2014, No. 2014-067252 filed on Mar. 27, 2014, No. 2014-067253 filed on Mar. 27, 2014, No. 2014-067254 filed on Mar. 27, 2014 and No. 2014-067255 filed on Mar. 27, 2014, the entire contents of which are incorporated herein by reference.

BACKGROUND OF THE INVENTION

1. Field of the Invention

The present invention relates to an arm stopper mechanism that restricts the turning angle of a steering arm to which tie rods are respectively attached, and a steering apparatus using the same.

2. Description of Related Art

For example, in a saddle riding type vehicle such as an all terrain vehicle (ATV), a steering apparatus (particularly, a motor-driven power steering apparatus) is installed between a handlebar-side steering shaft and wheel (front wheel)-side steering members. The motor-driven power steering apparatus is an apparatus that applies the generated torque of an electric motor in assisting a steering force which a driver applies to handlebars.

The motor-driven power steering apparatus has built-in members such as an input shaft, a torsion bar, or an output shaft. The input shaft is connected to the handlebar-side steering shaft. The torsion bar is connected to the input and output shafts. A steering arm is attached to the output shaft (for example, refer to JP-A-2007-196927 (FIG. 2)).

The steering arm is the wheel (front wheel)-side steering members. The steering arm turns about the output shaft. The steering arm is provided with a tie rod hole for the attachment of a tie rod. The wheel is connected to the tie rod.

The motor-driven power steering apparatus is required to restrict the turning of the handlebars in order for a vehicle not to roll over in a lateral direction when the driver turns the handlebars to the maximum steering angle or greater in a clockwise direction or a counter-clockwise direction. Even though the driver may not turn the handlebars while the vehicle is traveling on a rough road, an external force caused by a protrusion (a convex portion) or the like on a road surface may be input to the motor-driven power steering apparatus and the handlebars via the wheel (the front wheel), and thus may cause the handlebars to be turned to the maximum steering angle or greater. Even in this case, the motor-driven power steering apparatus is required to restrict the turning of the handlebars in order for the vehicle not to roll over in the lateral direction. The motor-driven power steering apparatus is provided with an arm stopper mechanism as a mechanism for such a function which restricts the turning angle of the steering arm via a stopper.

The stopper is provided to protrude downward from a lower surface of a housing of the motor-driven power steering apparatus. When the driver turns the handlebars to the maximum steering angle or greater in the clockwise direction or the counter-clockwise direction, or when the input of an external force via the wheel (the front wheel) causes the handlebars to be turned to the maximum steering angle or greater, a striking surface provided in the steering arm strikes against a contact surface of the stopper. Accordingly, the arm stopper mechanism restricts the turning angle of the steering arm via the stopper, and thus the turning of the handlebars is restricted.

In this motor-driven power steering apparatus, when an increased bending load is applied to the output shaft, an excessive load may be applied to a bearing that supports the output shaft or the housing at the surroundings of the bearing. Accordingly, in the motor-driven power steering apparatus, it is desirable that a bending load be prevented from being applied to the output shaft.

However, in the related art, as will be described below, since the arm stopper mechanism of the motor-driven power steering apparatus is not configured so as to prevent a bending load from being applied to the output shaft, there is a problem in that a relatively large bending load may be applied to the output shaft.

For example, when one striking surface of the steering arm strikes against one contact surface of the stopper, a bending load vector is a value of a combined vector of an input load vector and a striking load vector. Here, the bending load vector is applied to the output shaft, thereby causing the output shaft to be bent, the input load vector is input from the wheel via the tie rod, and the striking load vector is applied to the contact surface of the steering arm from the stopper.

For this reason, a value of the bending load vector tends to increase as an angle formed by the respective directions of the input load vector and the striking load vector decreases. In contrast, a value of the bending load vector tends to decrease as an angle formed by the respective directions of the input load vector and the striking load vector increases.

Accordingly, for example, when an angle formed by the respective directions of the input load vector and the striking load vector is an acute angle (an angle greater than or equal to 0° and less than 90°), the bending load vector becomes a value greater than a value of the combined vector obtained when the input load vector is orthogonal to the striking load vector. In contrast, when an angle formed by the respective directions of the input load vector and the striking load vector is an obtuse angle (an angle of 90° to 180°), the bending load vector becomes a value smaller than or equal to a value of a combined vector which is obtained when the input load vector is orthogonal to the striking load vector.

When the striking surface of the steering arm is in contact with the contact surface of the stopper, the direction of the input load vector is determined by an attachment direction of the tie rod attached to the tie rod hole. The direction of the striking load vector is perpendicular to the striking surface (or the contact surface of the stopper) of the steering arm. Accordingly, the striking load vector is applied to a center position (hereinafter, referred to as a "striking center position") of a contact portion between the striking surface of the steering arm and the contact surface of the stopper.

Here, a "center line of the entirety of the vehicle" refers to an imaginary straight line that passes through a center point in a lateral direction of the vehicle and extends in a longitudinal direction of the vehicle. A "starting point of contact surfaces" refers to a point at which the respective straight lines imaginarily disposed along two contact surfaces intersect each other on the center line of the entirety of the vehicle.

For example, in the arm stopper mechanism of the related art, an angle formed by two striking surfaces of the steering arm is set to be 180°, and an angle formed by two contact surfaces of the stopper is set to be 90° in such a manner that the angle (an angle between the two contact surfaces, and an angle formed in the stopper (for example, refer to an angle θst in FIG. 19B)) formed by the two contact surfaces of the stopper is smaller than the angle (an angle between the two striking surfaces and an angle formed in the steering arm (for example, refer to an angle θar in FIG. 18B)) formed by the two striking surfaces of the steering arm.

In the arm stopper mechanism of the related art, since an angle formed by the two contact surfaces of the stopper is set to be 90°, two striking center positions are respectively located at 45° rightward and leftward from the "center line of the entirety of the vehicle", having the "respective starting points of the contact surfaces" as their centers.

In the arm stopper mechanism of the related art, when one striking surface of the steering arm strikes against one contact surface of the stopper, the striking load vector is applied to the striking center position in a direction oriented at 45° from the "center line of the entirety of the vehicle". In the arm stopper mechanism of the related art, due to the attachment direction of the tie rod, the input load vector is applied to the surroundings of the tie rod hole in a direction in which an angle formed by the input load vector and the striking load vector becomes an acute angle (an angle greater than or equal to 0° and less than 90°).

In the related art, when configuring the arm stopper mechanism, an angle formed by the respective directions of the input load vector and the striking load vector is not taken into consideration as described above. For this reason, in the related art, in the motor-driven power steering apparatus using the arm stopper mechanism, a relatively large bending load may be applied to the output shaft, and at this time, an excessive load may be applied to the bearing that supports the output shaft or the housing at the surroundings of the bearing.

In this regard, the inventor of the present invention considers that since the bending load vector is a combined vector of the input load vector and the striking load vector, when the arm stopper mechanism is configured to cause the input load vector and the striking load vector to cancel out each other, it is possible to reduce occurrence of bending load.

The inventor of the present invention considers that when the arm stopper mechanism is configured to be opposite to the arm stopper mechanism of the related art in a relationship between an angle formed by the two contact surfaces of the stopper and an angle formed by the two striking surfaces of the steering arm (that is, in such a manner that an angle formed by the two contact surfaces of the stopper is greater than an angle formed by the two striking surfaces of the steering arm), and the angle formed by the two contact surfaces of the stopper is set to be greater than or equal to the angle (90°) of the arm stopper mechanism of the related art, it is possible to reduce occurrence of bending load.

SUMMARY OF THE INVENTION

The present invention is made in light of the problems. A main object of the present invention is to provide an arm stopper mechanism that prevents a bending load from being applied to an output shaft, and a steering apparatus using the arm stopper mechanism.

According to a first aspect of the present invention to achieve the object, provided is an arm stopper mechanism including a steering arm which turn about an output shaft of a steering apparatus, and to which two tie rods respectively connected to wheels are attached; and a stopper that is provided around the output shaft, and restricts the turning angle of the steering arm. When a center line refers to an imaginary straight line that passes through the output shaft and extends in a longitudinal direction of a vehicle, the steering arm, in a neutral state, includes an output shaft hole which is provided on the center line, and into which the output shaft is fitted; two tie rod holes which are respectively provided to be positioned rightward and leftward from the center line and rearward from the output shaft hole, and to which the tie rods are respectively attached; and two striking surfaces which are respectively provided to be positioned rightward and leftward from the center line and rearward from the output shaft hole, and which strike against the stopper. The stopper includes two contact surfaces that respectively provided to be positioned rightward and leftward from the center line and in a turning direction of the striking surfaces of the steering arm, and are respectively brought into contact with the striking surfaces. An angle (an angle between the two contact surfaces and an angle formed in the stopper) formed by the two contact surfaces of the stopper is greater than an angle (an angle between the two striking surfaces and an angle formed in the steering arm) formed by the two striking surfaces of the steering arm, and is greater than or equal to 90°.

A bending load vector is a combined vector of an input load vector and a striking load vector. For this reason, when the input load vector and the striking load vector are applied to cancel out each other, it is possible to reduce occurrence of bending load. When an angle formed by a direction of the input load vector and a direction of the striking load vector is set to increase, the input load vector and the striking load vector are applied to cancel out each other. When an angle formed by a center line of the steering arm and the striking surface is set to decrease, or an angle formed by a center line of the stopper and the contact surface is set to increase, it is possible to obtain a configuration that an angle formed by a direction of the input load vector and a direction of the striking load vector is increased.

In the arm stopper mechanism according to the first aspect of the present invention, the angle formed by the two contact surfaces of the stopper is set to be greater than the angle formed by the two striking surfaces of the steering arm, and greater than or equal to 90°. In the arm stopper mechanism with this configuration, the direction of the input load vector and the striking load vector can be applied to cancel out each other. As a result, in the arm stopper mechanism, it is possible to reduce a value of the bending load vector applied to the output shaft, and it is possible to prevent a bending load from being applied to the output shaft. Accordingly, in the arm stopper mechanism, it is possible to reduce a load applied to bearings that support the output shaft, and a housing at the surroundings of the bearings.

In the arm stopper mechanism according to the first aspect of the present invention, the angle formed by the two contact surfaces of the stopper is preferably greater than or equal to 180°.

In the arm stopper mechanism, the steering arm turns about the output shaft in a region in which the stopper is not present. Accordingly, in the arm stopper mechanism, a circumferential angle of 360° about the output shaft 22 is divided into the angle formed by the two contact surfaces of the stopper; the angle formed by the two striking surfaces of the steering arm; and a total angle of clockwise and counter-clockwise maximum steering angles of the steering arm.

For this reason, in the arm stopper mechanism, when the angle formed by the two contact surfaces of the stopper is set to increase, the angle formed by the two striking surfaces of the steering arm decreases, and thus it is possible to reduce the size of the steering arm.

In the arm stopper mechanism with this configuration, since the angle formed by the two contact surfaces of the stopper is set to be greater than or equal to 180°, the angle formed by the two striking surfaces of the steering arm decreases further. As a result, in the arm stopper mechanism with this configuration, it is possible to further reduce the size of the steering arm.

In the arm stopper mechanism with this configuration, since the size of the steering arm is further reduced, a portion receiving the striking load vector (that is, a center position of a contact portion between the striking surface of the steering arm and the contact surface of the stopper) can be brought close to the vicinity of the tie rod hole to which the input load vector is applied. For this reason, the arm stopper mechanism with this configuration can efficiently reduce occurrence of vibration.

In the arm stopper mechanism according to the first aspect of the present invention, when summing the angle formed by the two contact surfaces of the stopper and the angle formed by the two striking surfaces of the steering arm, a total value of the angles is preferably smaller than or equal to 270°.

When the arm stopper mechanism with this configuration satisfies these conditions, it is possible to secure 90° or greater total angle of the clockwise and counter-clockwise maximum steering angles of the steering arm.

In the arm stopper mechanism according to the first aspect of the present invention, it is preferable that the entirety of a main body of the steering arm for the attachment of the tie rods have a plate shape, and when seen from below, the steering arm has a shape in which a folding fan is deployed at an acute angle and portions of a folding fan are respectively bent outward from the respective middle portions of opposite wings of the folding fan. In addition, it is preferable that the output shaft hole be disposed on a center axis of the folding fan, and the two tie rod holes be respectively disposed at arbitrary positions in an outer circumferential edge (verge) of the folding fan. It is preferable that the two striking surfaces of the steering arm be respectively provided in side portions of the main body of the steering arm.

In the arm stopper mechanism with this configuration, the striking surfaces are respectively provided in the side portions of the main body of the steering arm. In the arm stopper mechanism with this configuration, the input load vector and the striking load vector are applied to cancel out each other. In the arm stopper mechanism with this configuration, it is possible to prevent a bending load from being applied to the output shaft.

In the arm stopper mechanism with this configuration, it is preferable that the stopper be provided to protrude downward from the steering apparatus, and when seen from below, the stopper have a shape in which a trapezoidal portion with a substantially trapezoidal shape be joined to a rectangular portion with a substantially rectangular shape. In addition, the trapezoidal portion and the rectangular portion are preferably disposed in such a manner that a center point of the output shaft coincides with a center point of a lower base of the trapezoidal portion and a center point of one of long sides of the rectangular portion. It is preferable that a short side of the rectangular portion preferably have the same width as a separation distance between the striking surface and a parallel plane that passes through the center point of the output shaft hole of the steering arm and is parallel with the striking surface, and the long side not joined to the trapezoidal portion function as the contact surfaces.

In the arm stopper mechanism with this configuration, since the stopper has a configuration suitable for the steering arm, it is possible to reduce occurrence of bending load.

In the arm stopper mechanism according to the first aspect of the present invention, it is preferable that the entirety of a main body of the steering arm for the attachment of the tie rods have a plate shape, and when seen from below, the entirety of the main body has a folding fan shape deployed at an acute angle. It is preferable that the output shaft hole be disposed on a center axis of the folding fan, and the two tie rod holes be respectively disposed in the vicinities of opposite wings in an outer circumferential edge of the folding fan. In addition, it is preferable that the two striking surfaces of the steering arm be respectively provided in side portions of a protruding portion that protrudes upward from the vicinity of a center of an upper surface of the main body of the steering arm.

In the arm stopper mechanism with this configuration, the striking surfaces are provided in the side portions of the protruding portion that protrudes upward from the vicinity of the center of the upper surface of the main body of the steering arm. In the arm stopper mechanism with this configuration, the input load vector and the striking load vector are applied to cancel out each other. In the arm stopper mechanism with this configuration, it is possible to prevent a bending load from being applied to the output shaft. In addition, in the arm stopper mechanism with this configuration, since the steering arm is configured in such a manner that the striking surfaces do not project in the turning direction, it is possible to reduce the size of the steering arm.

In the arm stopper mechanism with this configuration, it is preferable that the stopper be provided to protrude downward from the steering apparatus, and when seen from below, the stopper have a substantially circular shape which is obtained when a circular arc-shaped portion is cut away from the stopper, the circular arc-shaped portion having the center point of the output shaft as its center, and that cut-away end surfaces function as the contact surfaces, respectively.

In the arm stopper mechanism with this configuration, since the stopper has a configuration suitable for the steering arm, it is possible to reduce occurrence of bending load.

According to a second aspect of the present invention, provided is a steering apparatus that includes the arm stopper mechanism according to the first aspect of the present invention.

In the steering apparatus according to the second aspect of the present invention, since the steering apparatus is provided with the arm stopper mechanism according to the first aspect of the present invention, it is possible to prevent a bending load from being applied to the output shaft.

According to the present invention, it is possible to prevent a bending load from being applied to the output shaft.

BRIEF DESCRIPTION OF THE DRAWINGS

FIGS. 5A and 5B schematically illustrate a relationship in operation between the steering arm of the arm stopper mechanism according to the first embodiment and the front wheels, when seen from below.

FIG. 6 is a description view illustrating load vectors applied to the steering arm of the arm stopper mechanism according to the first embodiment.

FIGS. 8A and 8B are schematic configuration views of the steering arm of the arm stopper mechanism according to the first embodiment, when seen from below.

FIGS. 9A and 9B are schematic configuration views of a stopper of the arm stopper mechanism according to the first embodiment, when seen from below.

FIG. 11 is a description view illustrating the load vectors applied to main portions of the arm stopper mechanism according to the first embodiment.

FIGS. 18A and 18B are schematic configuration views of a steering arm of the arm stopper mechanism according to the comparative example, when seen from below.

FIGS. 19A and 19B are schematic configuration views of a stopper of the arm stopper mechanism according to the comparative example, when seen from below.

Example 2

Figure 22:
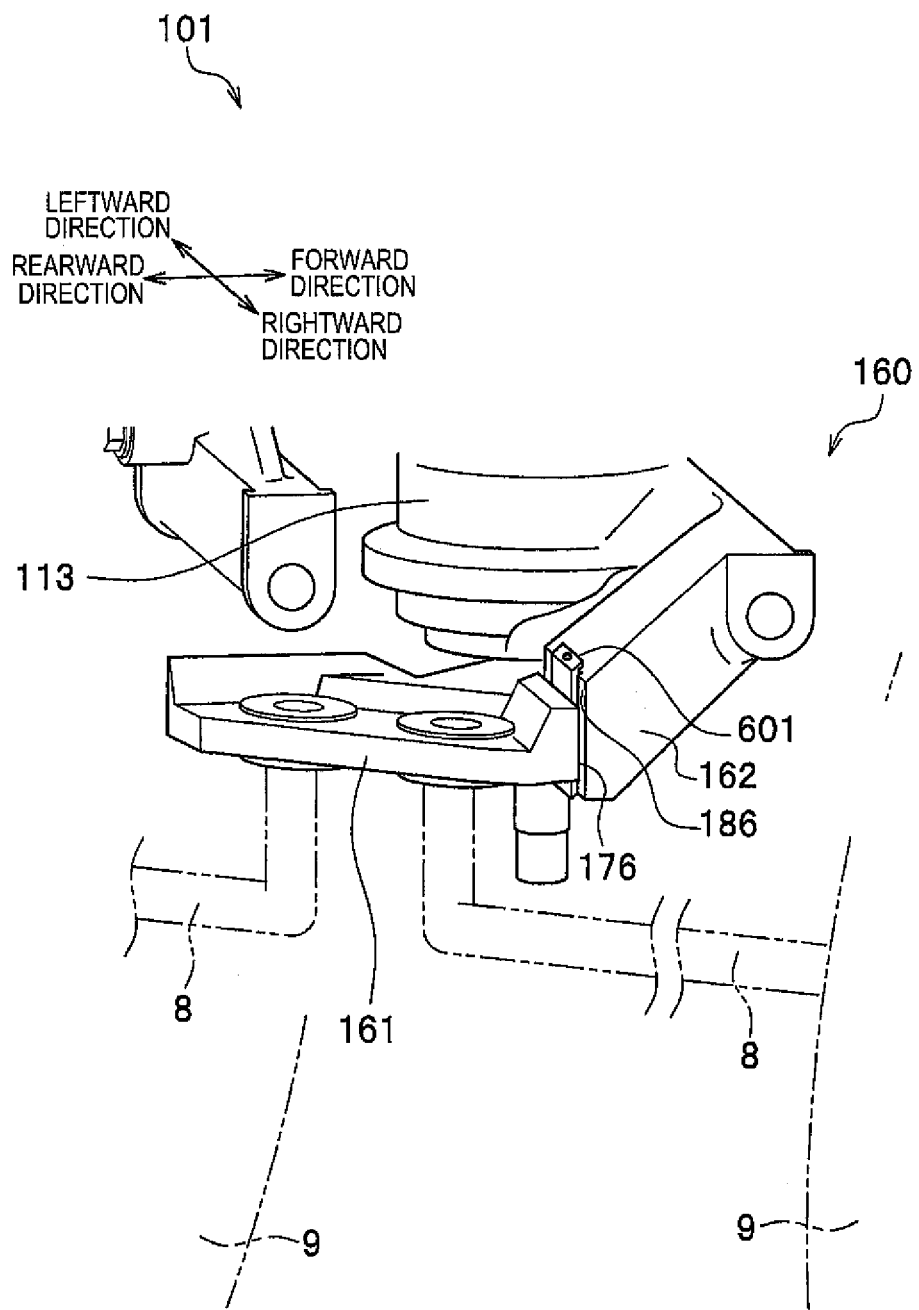

FIG. 22 is a schematic configuration view (1) of the main portions of the arm stopper mechanism according to the first embodiment.

Figure 23:
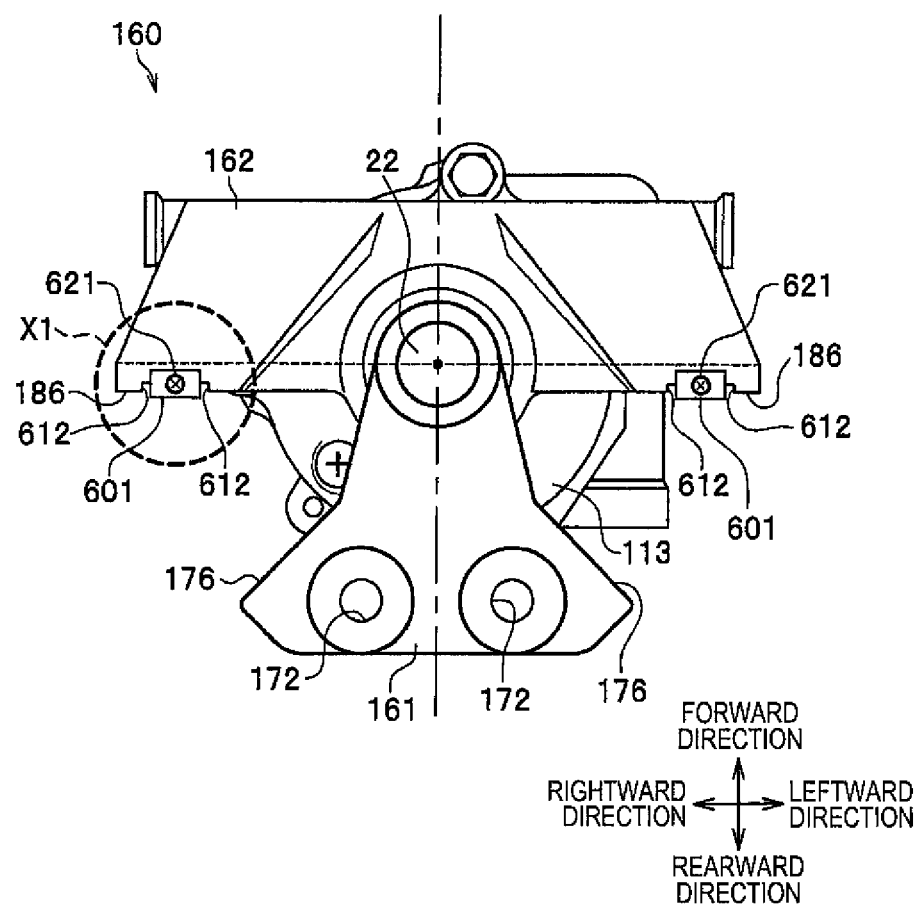

FIG. 23 is a schematic configuration view (2) of the main portions of the arm stopper mechanism according to the first embodiment.

Figure 24:
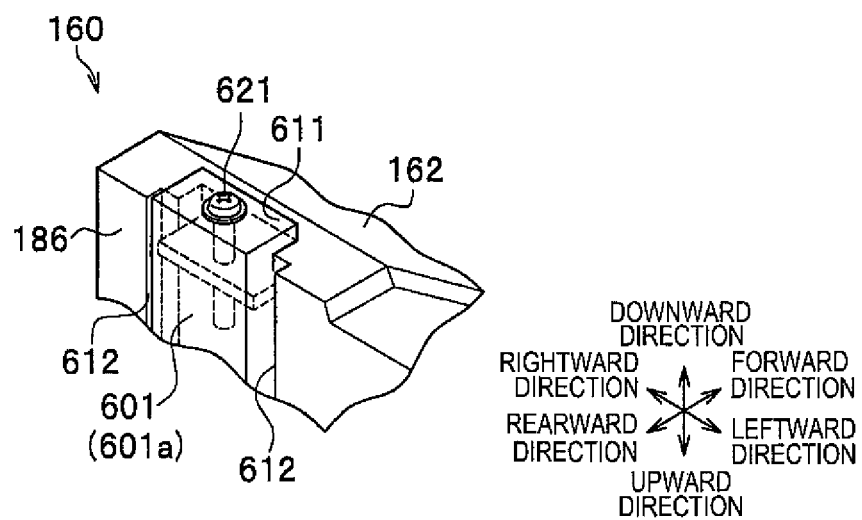

FIG. 24 is a schematic configuration view (3) of the main portions of the arm stopper mechanism according to the first embodiment.

Figure 25:
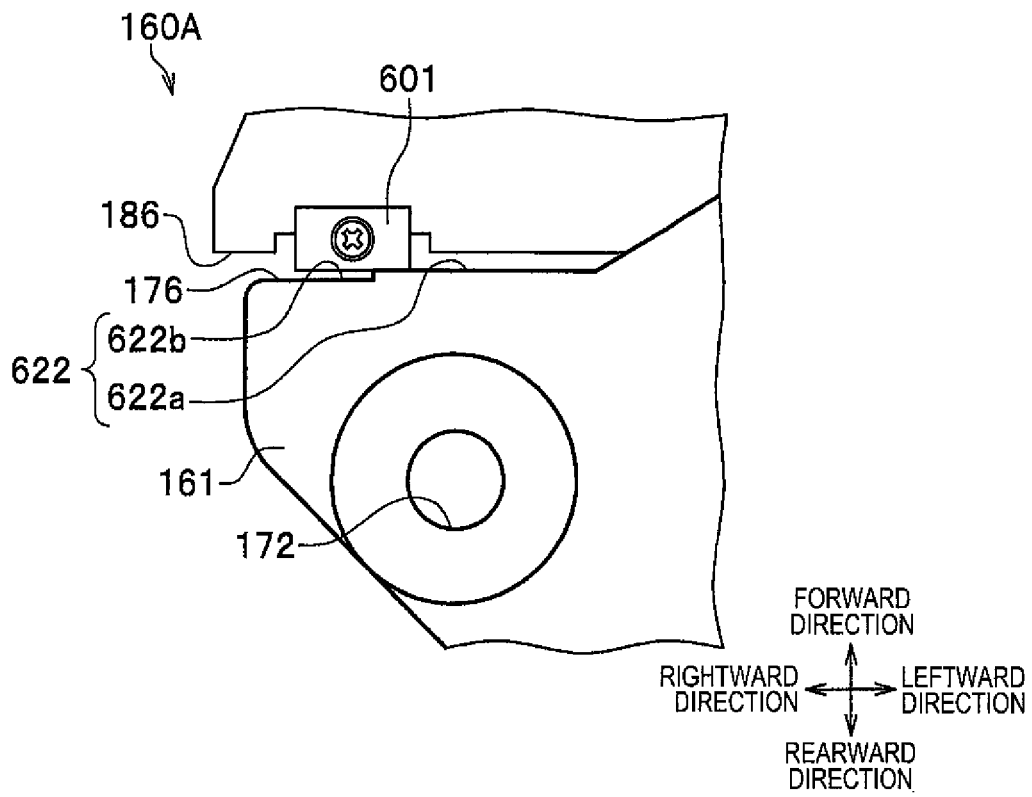

FIG. 25 is a schematic configuration view (1) of main portions of an arm stopper mechanism according to a modification example of the first embodiment.

Figure 26:
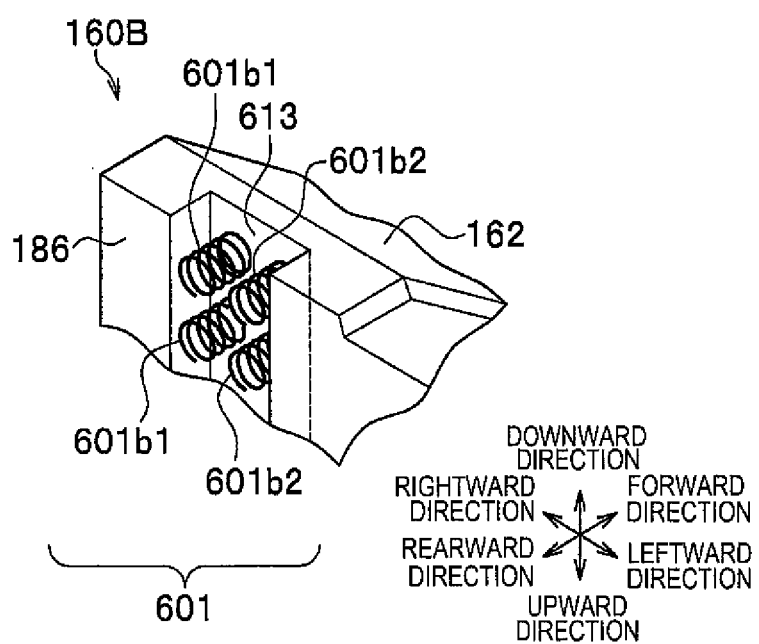

FIG. 26 is a schematic configuration view (2) of the main portions of the arm stopper mechanism according to the modification example of the first embodiment.

Figure 27:
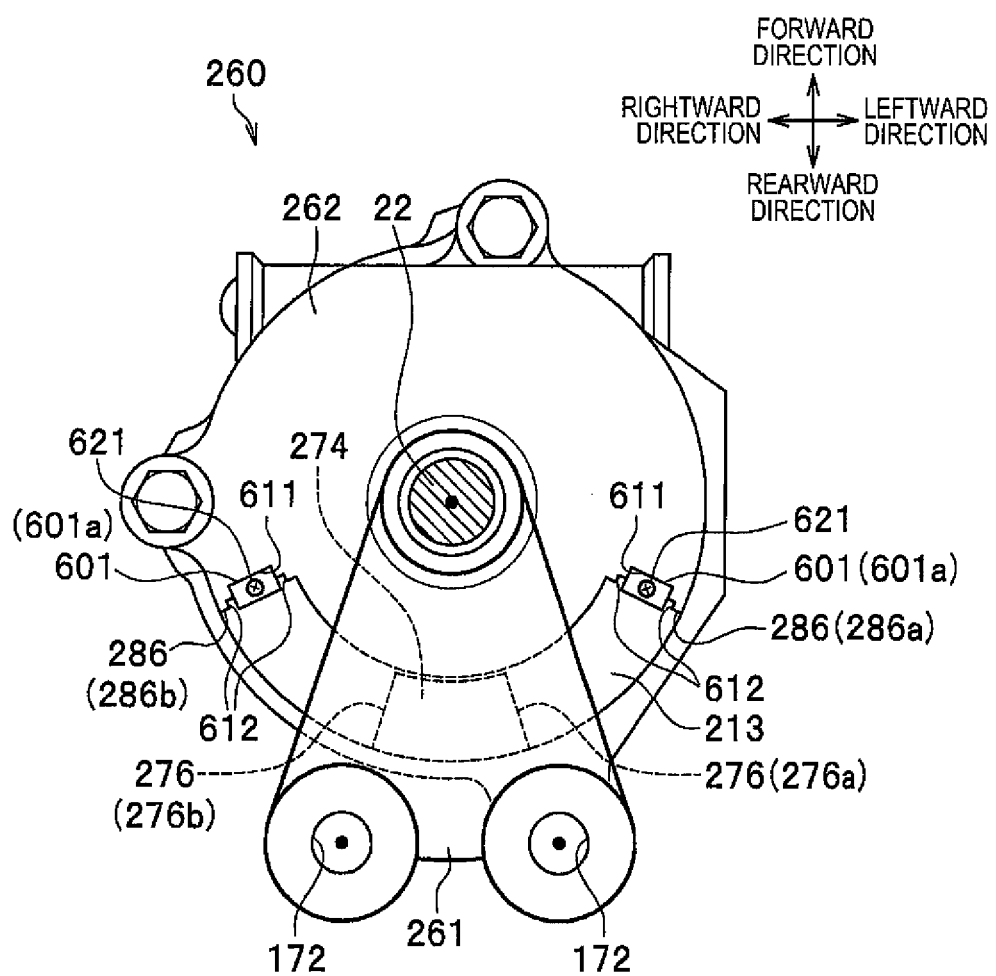

FIG. 27 is a schematic configuration view of the main portions of the arm stopper mechanism according to the second embodiment.

Example 3

Figure 28:
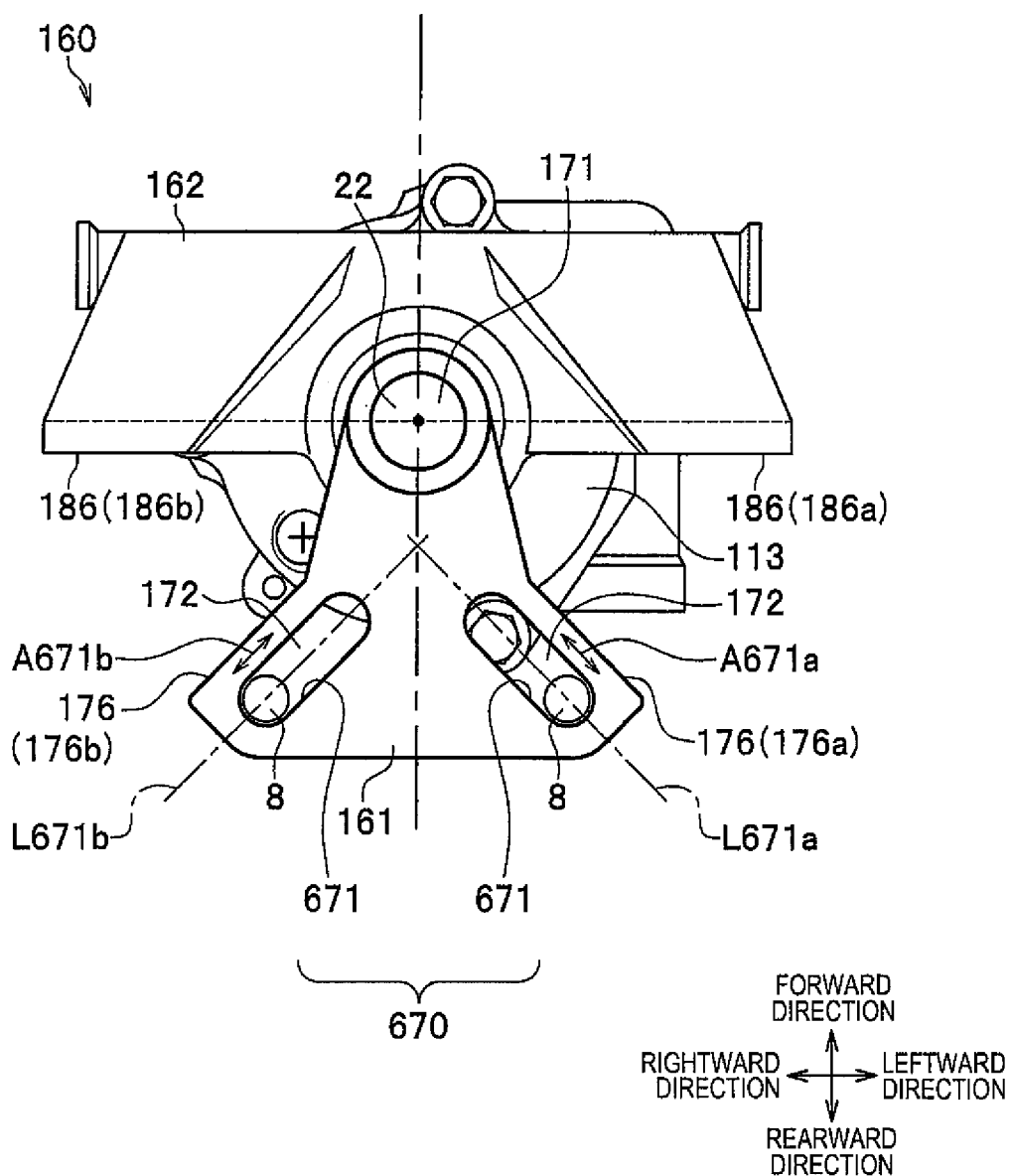

FIG. 28 is a schematic configuration view of an attachment position varying mechanism provided in the arm stopper mechanism according to the first embodiment.

Figure 29:
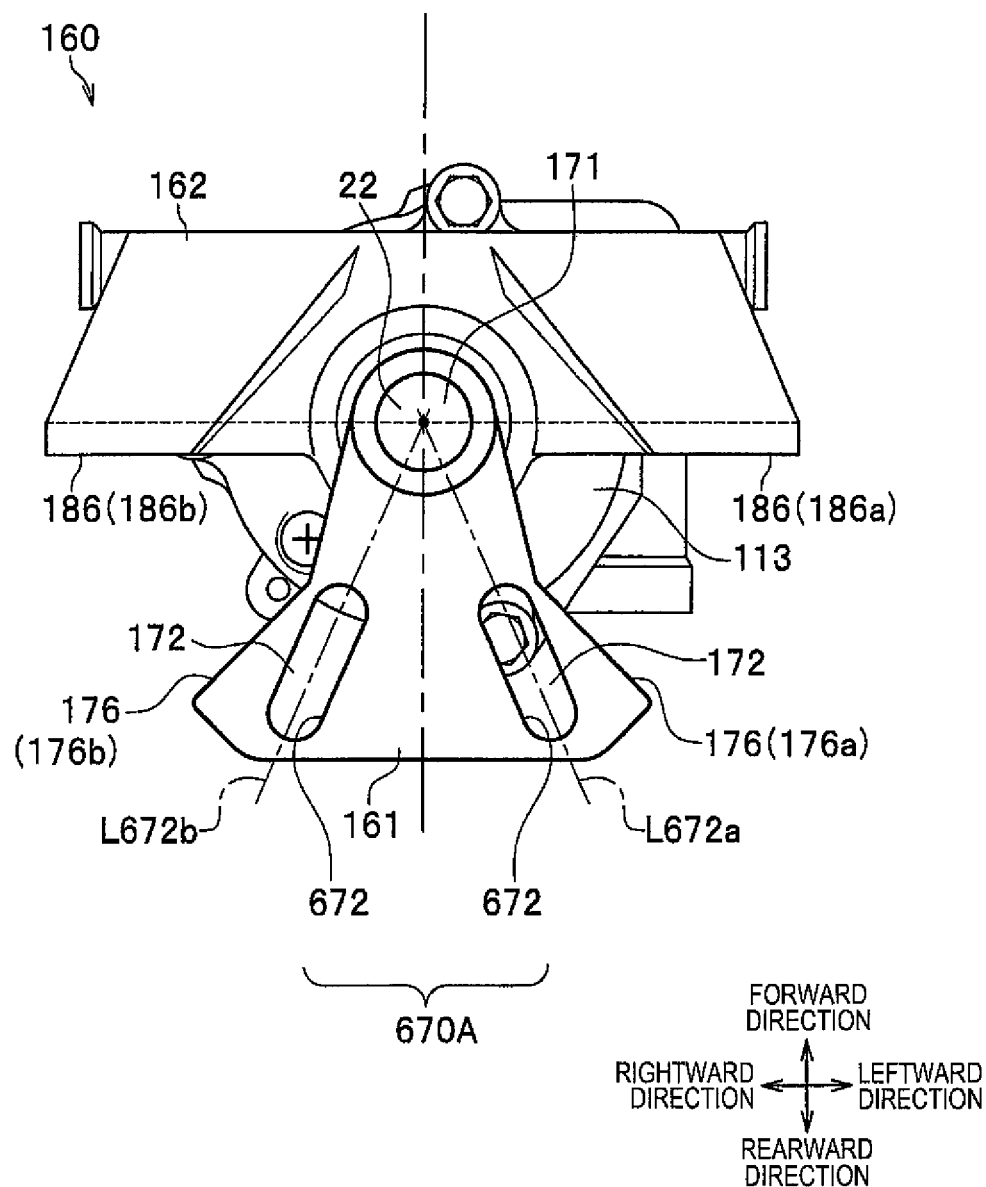

FIG. 29 is a schematic configuration view of a first modification example of the attachment position varying mechanism provided in the arm stopper mechanism according to the first embodiment.

Figure 30:
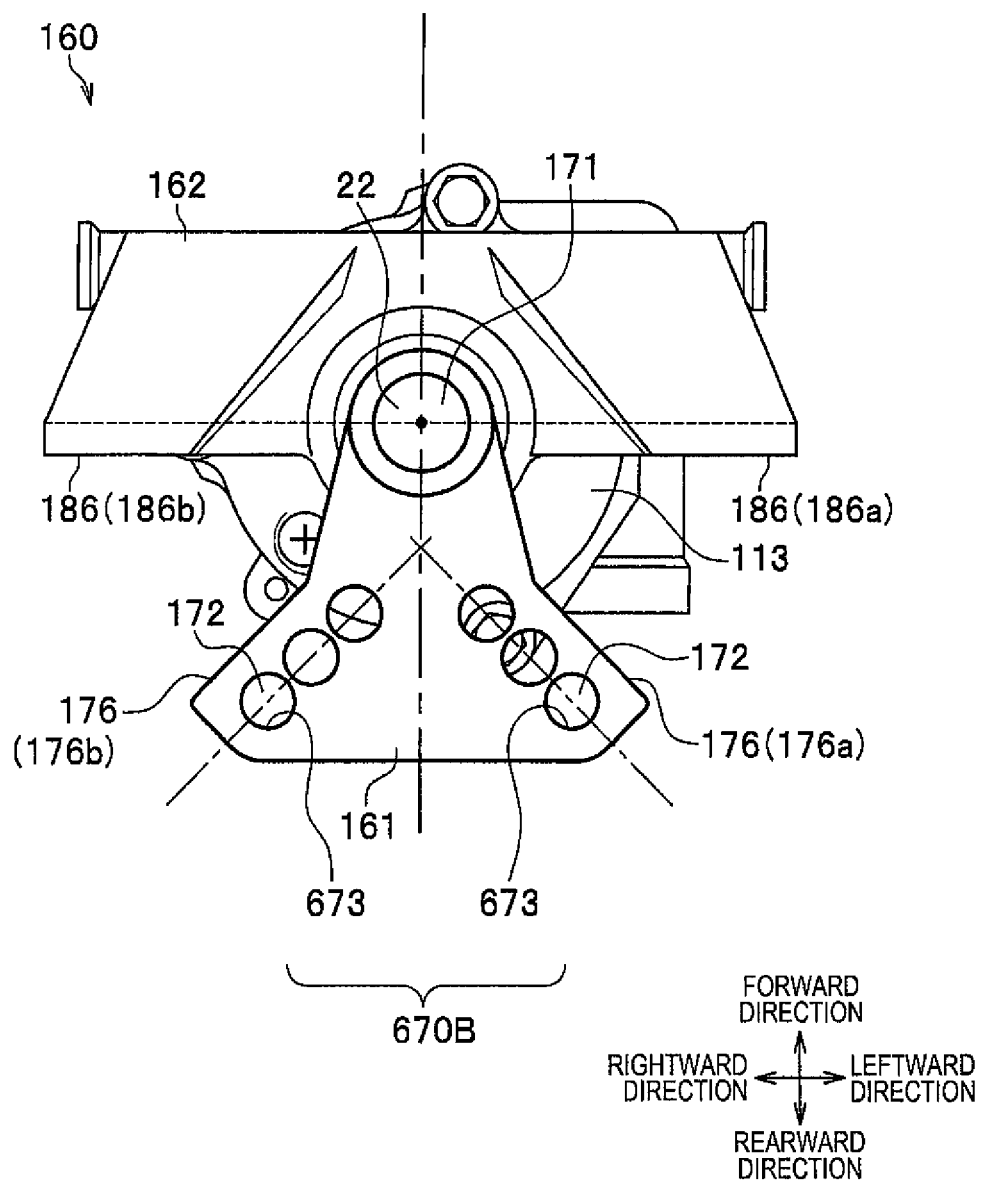

FIG. 30 is a schematic configuration view of a second modification example of the attachment position varying mechanism provided in the arm stopper mechanism according to the first embodiment.

Figure 31:
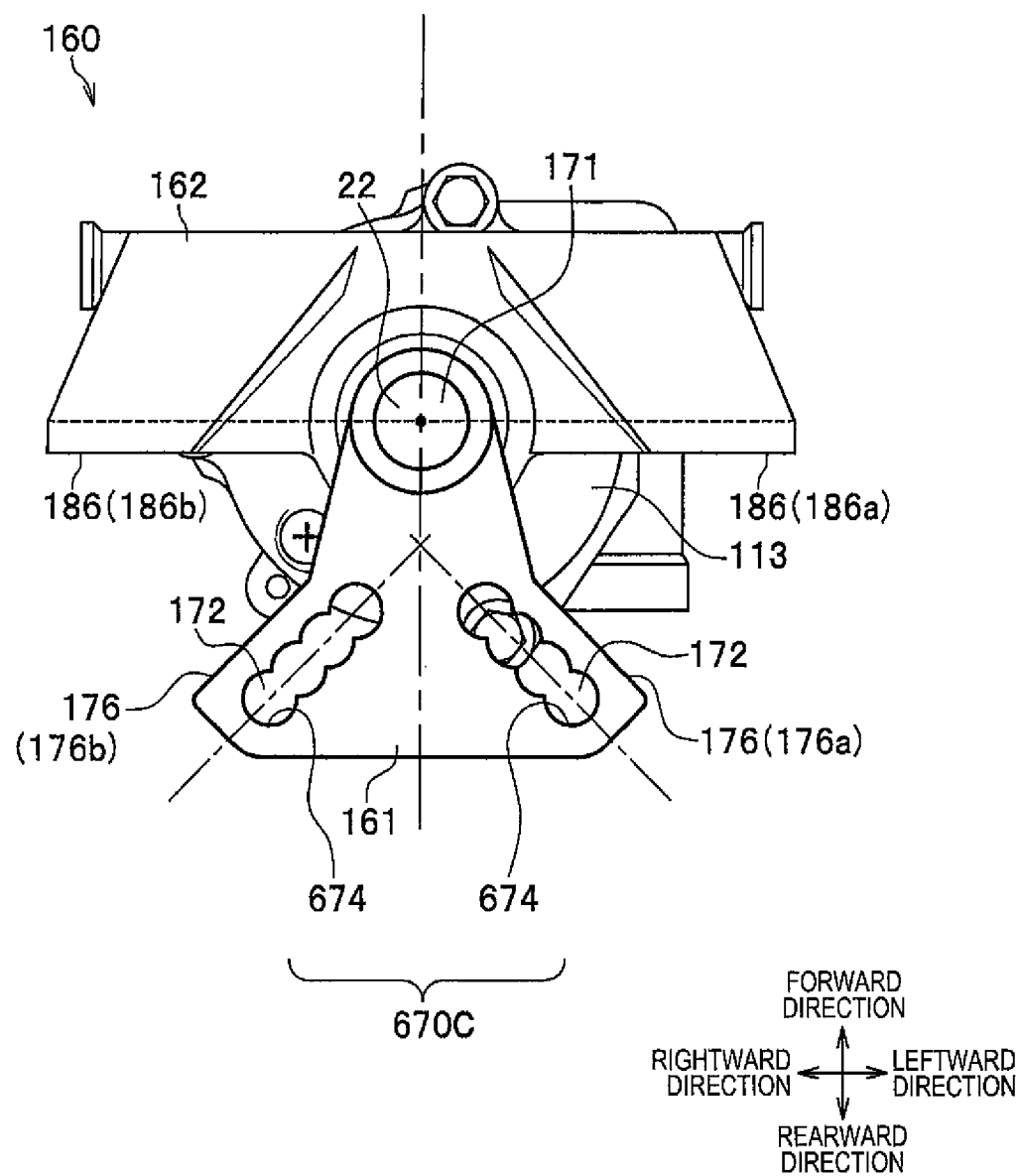

FIG. 31 is a schematic configuration view of a third modification example of the attachment position varying mechanism provided in the arm stopper mechanism according to the first embodiment.

Figure 32:
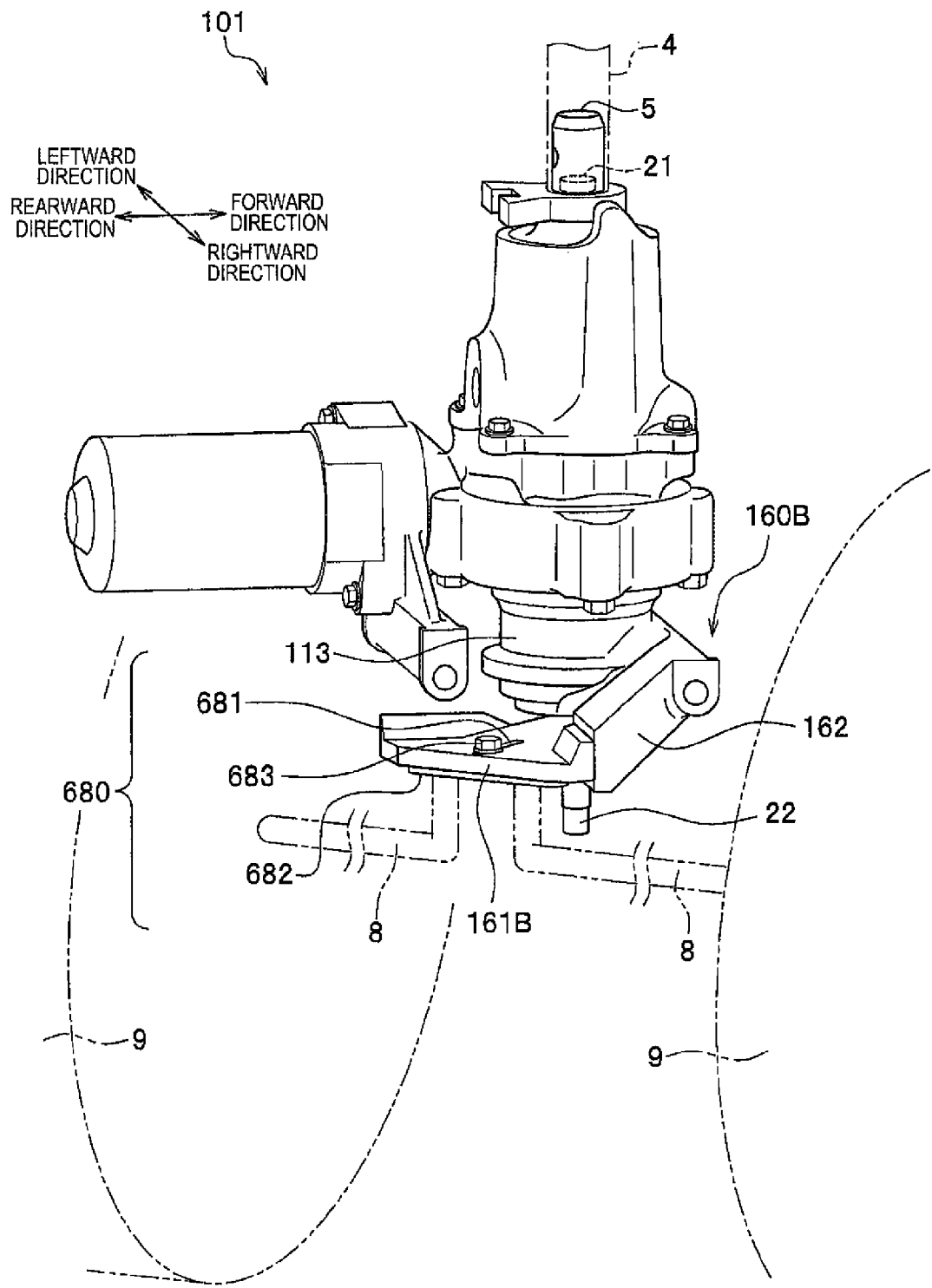

FIG. 32 is a schematic configuration view (1) of a fourth modification example of the attachment position varying mechanism provided in the arm stopper mechanism according to the first embodiment.

FIG. 33 is a schematic configuration view (2) of the fourth modification example of the attachment position varying mechanism provided in the arm stopper mechanism according to the first embodiment.

Figure 34A:
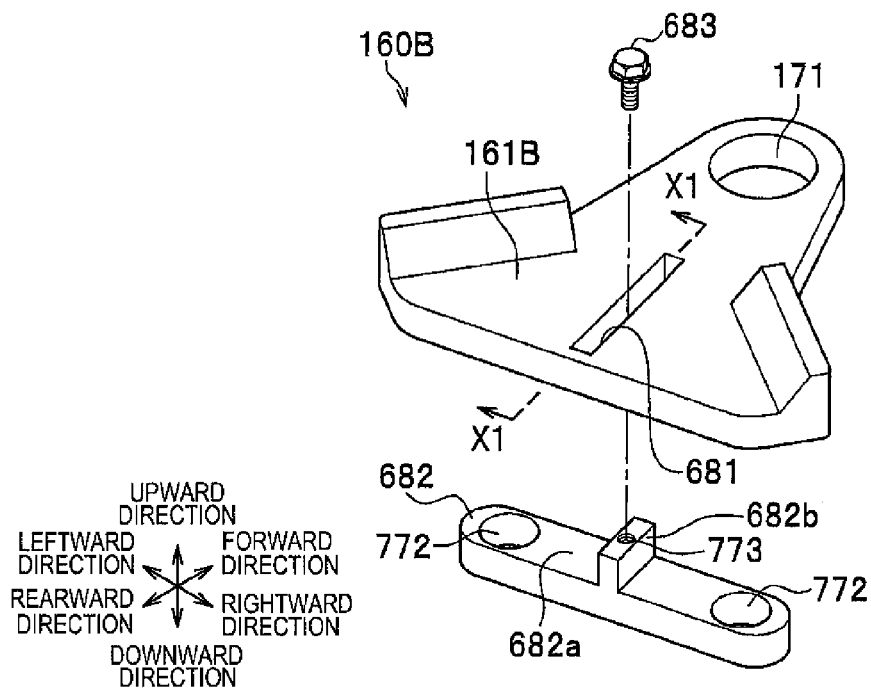
Figure 34B:
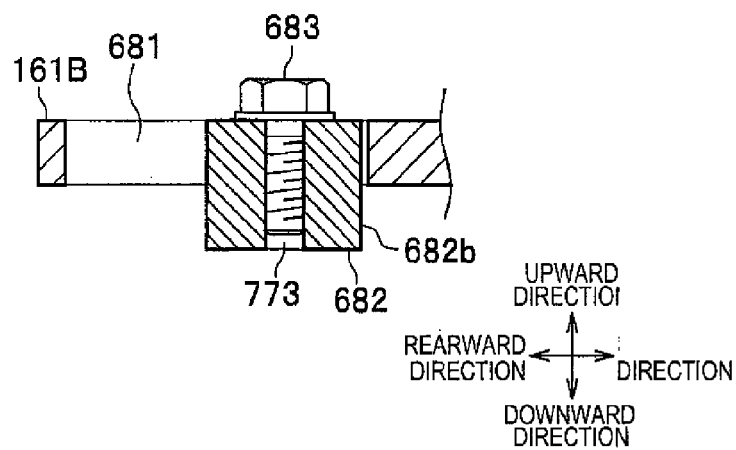

FIGS. 34A and 34B are schematic configuration views (3) of the fourth modification example of the attachment position varying mechanism provided in the arm stopper mechanism according to the first embodiment.

FIG. 35 is a schematic configuration view of an attachment position varying mechanism provided in the arm stopper mechanism according to the second embodiment.

Figure 36:
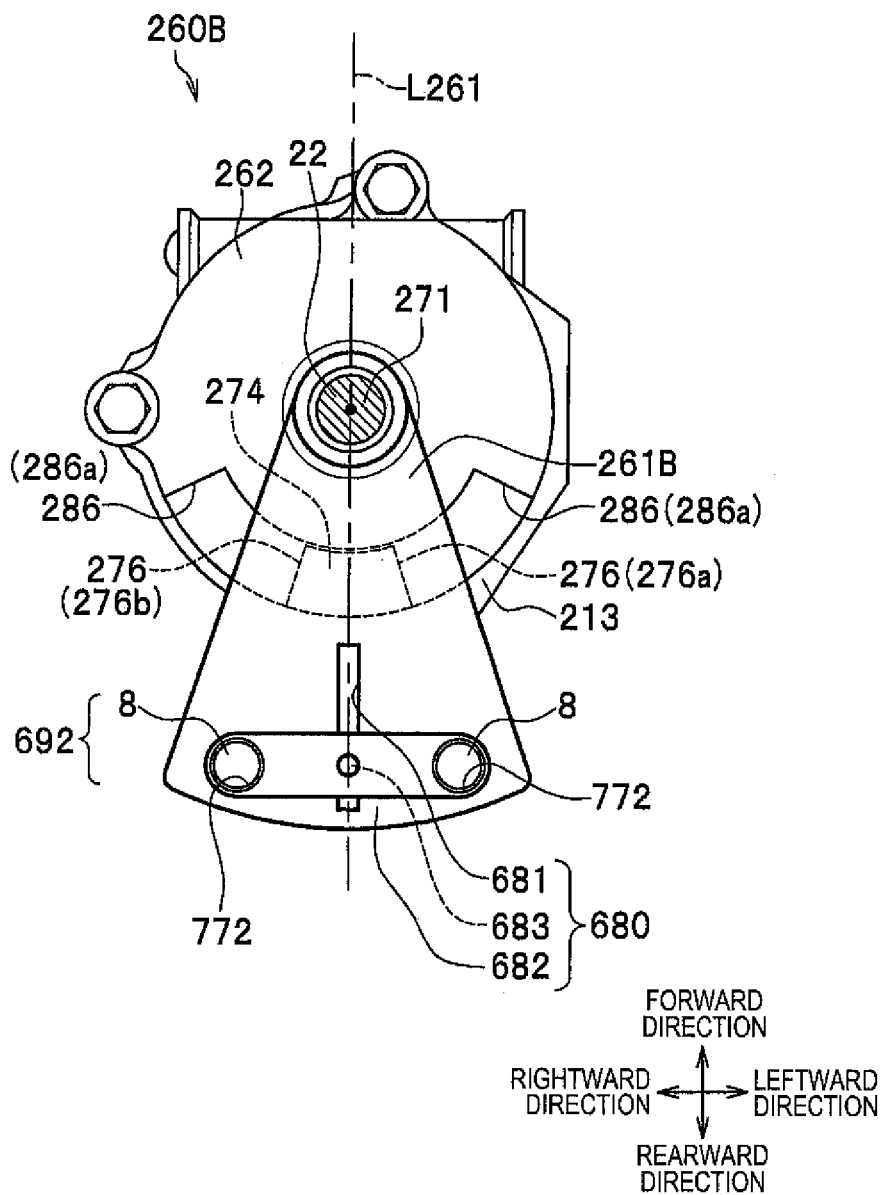

FIG. 36 is a schematic configuration view of a modification example of the attachment position varying mechanism provided in the arm stopper mechanism according to the second embodiment.

Example 4

Figure 37:
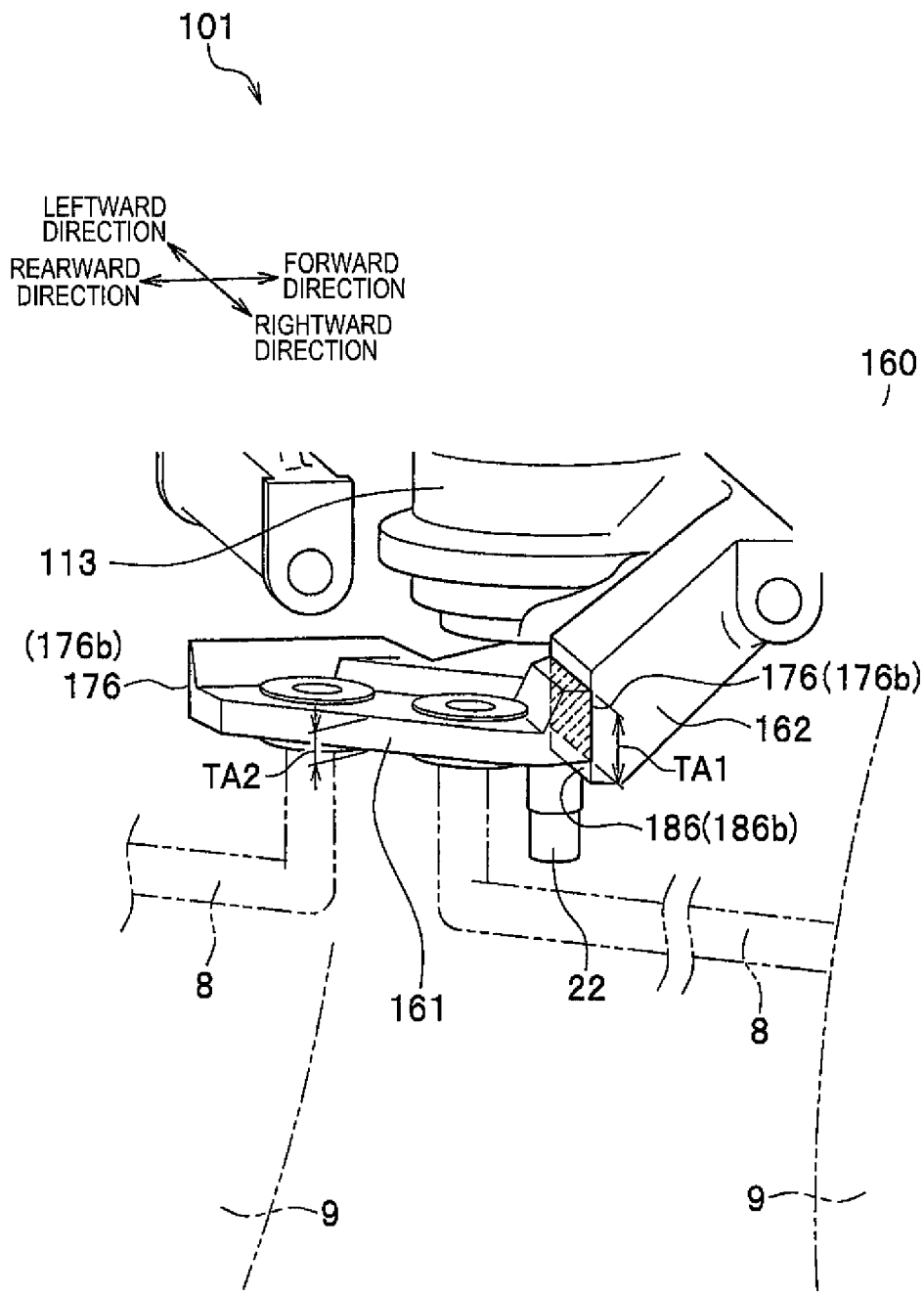

FIG. 37 is a schematic configuration view of the motor-driven power steering apparatus provided with the arm stopper mechanism according to the first embodiment, when seen from a side.

Example 5

Figure 38:
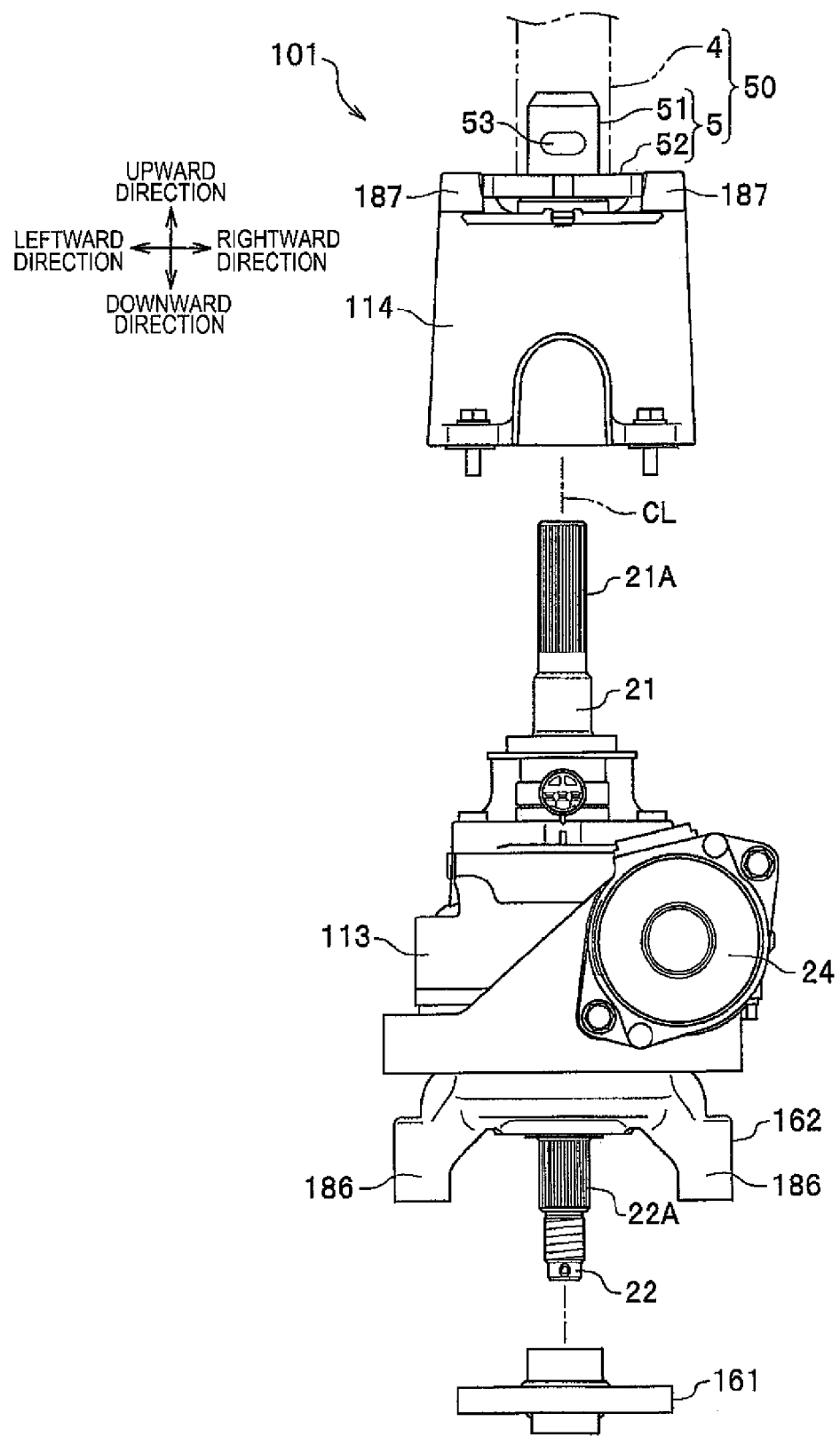

FIG. 38 is an exploded view of the motor-driven power steering apparatus illustrating a manner in which an input shaft and an output shaft are respectively connected to a steering shaft member and the steering arm, when seen from the rear.

Figure 39A:
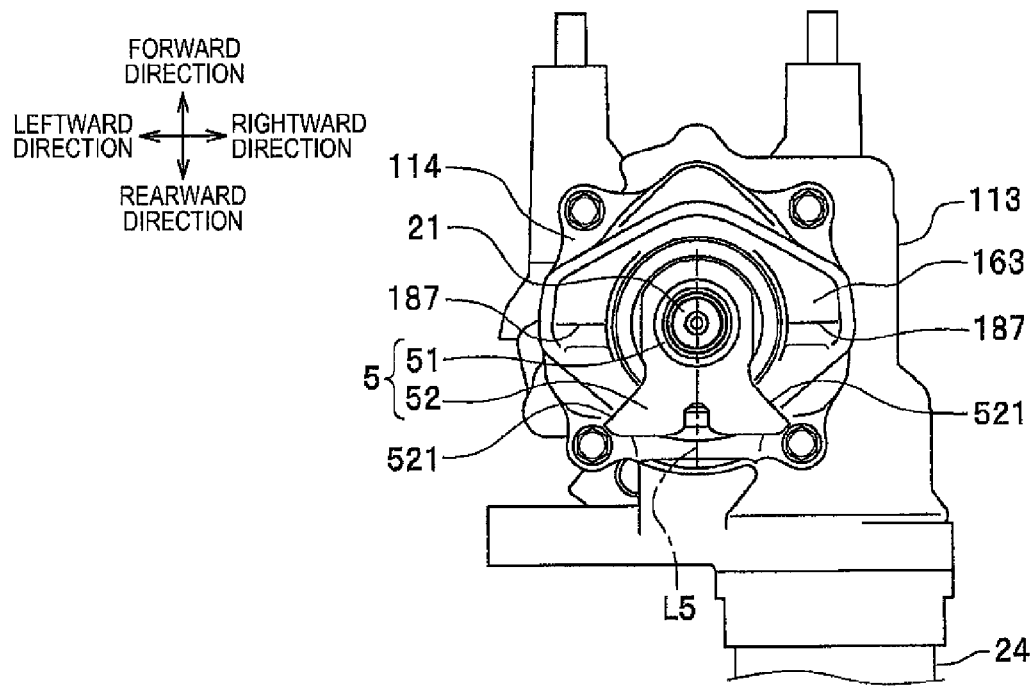
Figure 39B:
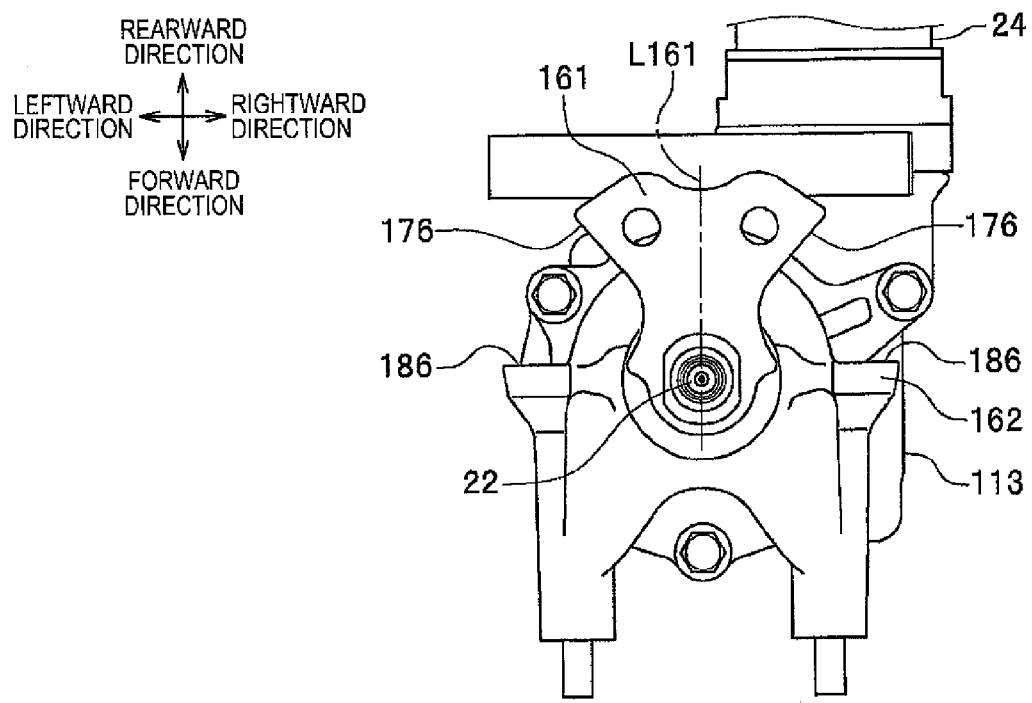

FIG. 39A is a top view of FIG. 38, and FIG. 39B is a bottom view of FIG. 38.

Figure 40:
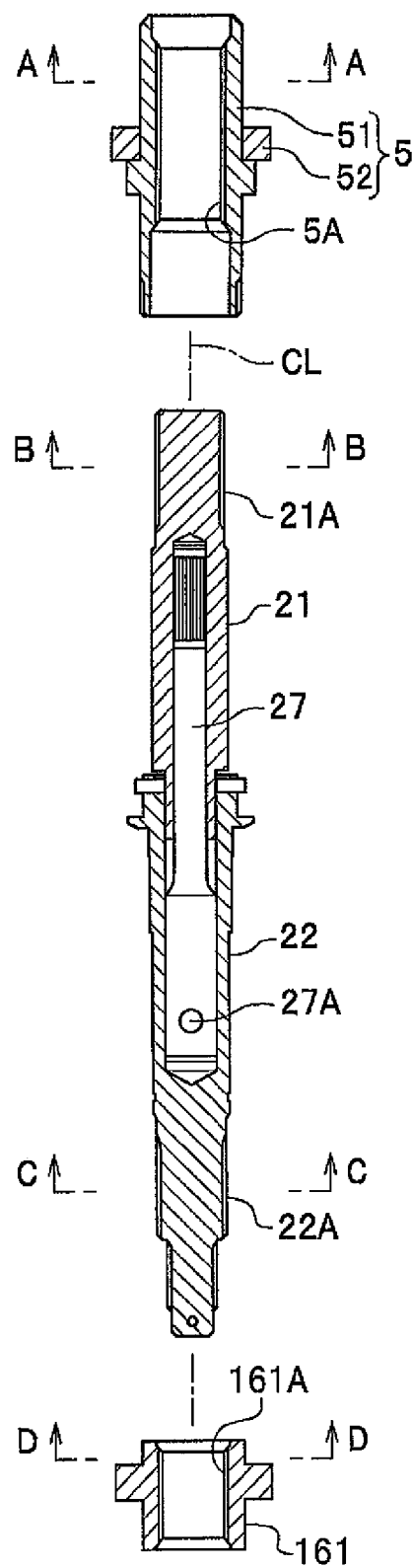

FIG. 40 is an exploded vertical cross-sectional view illustrating a joint, the input shaft, the output shaft connected to the input shaft via a torsion bar, and the steering arm, all of which are detached and illustrated in FIG. 38.

Figure 41:
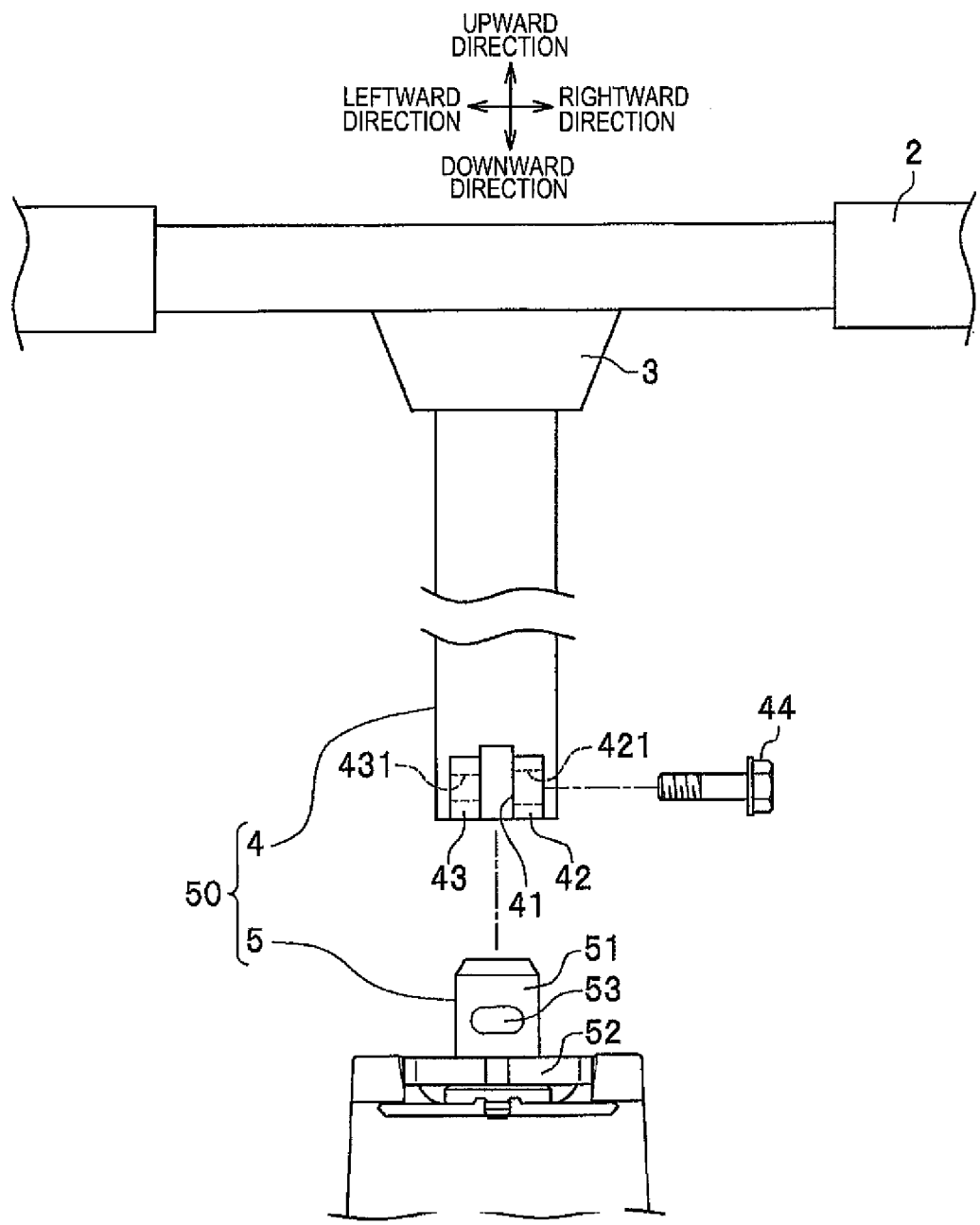

FIG. 41 is an exploded view illustrating a manner in which a steering shaft is attached to the joint, when seen from the rear.

Figure 42:
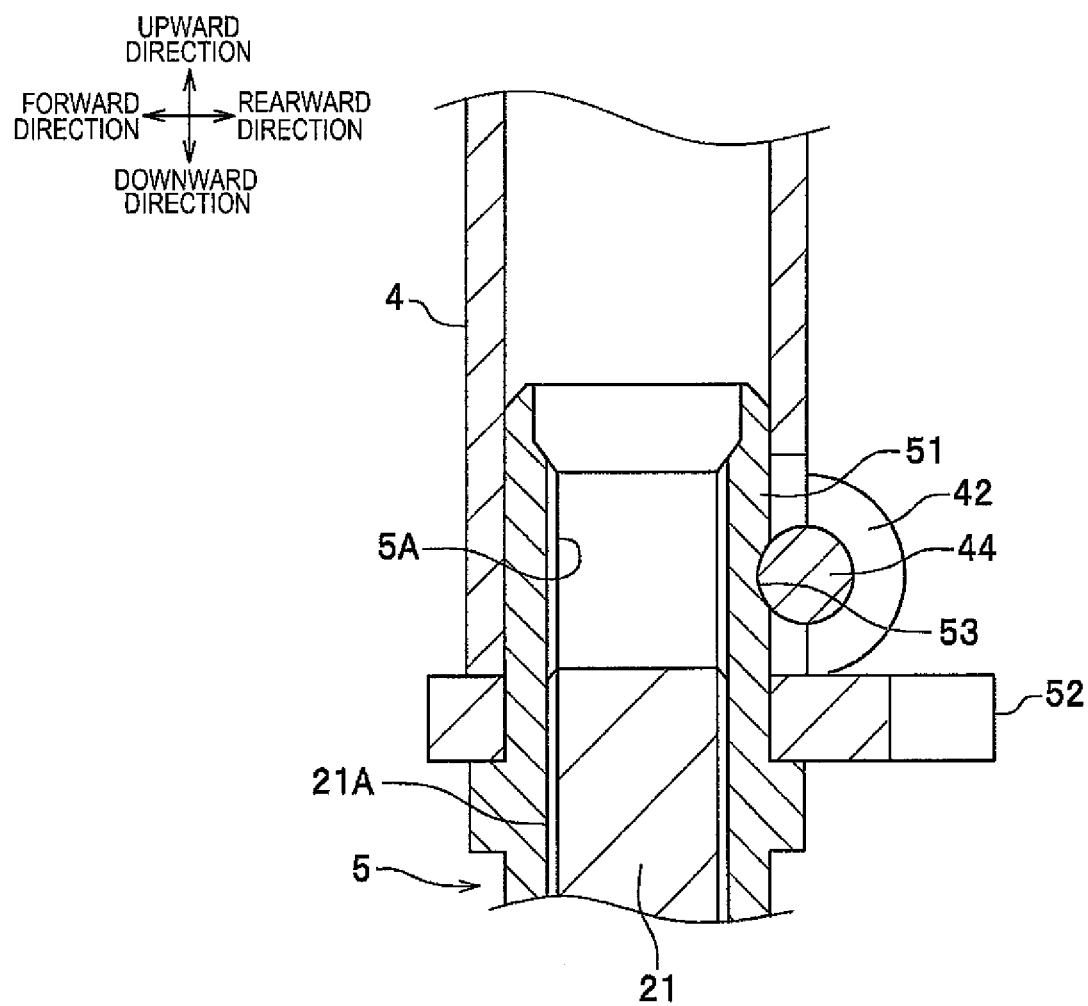

FIG. 42 is a cross-sectional view illustrating a state in which the steering shaft is attached to the joint.

Figure 43A:
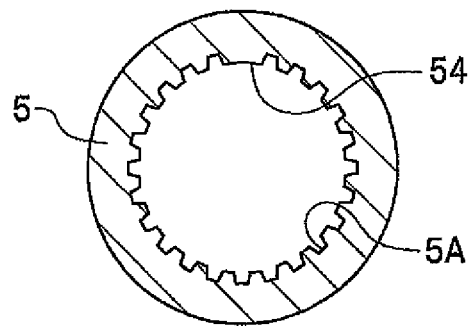
Figure 43B:
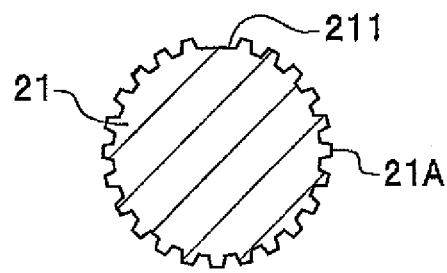
Figure 43C:
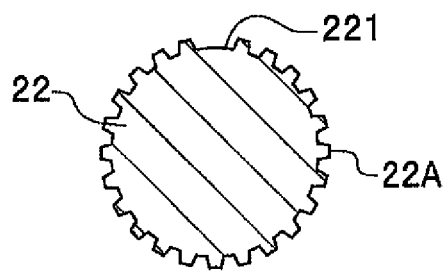
Figure 43D:
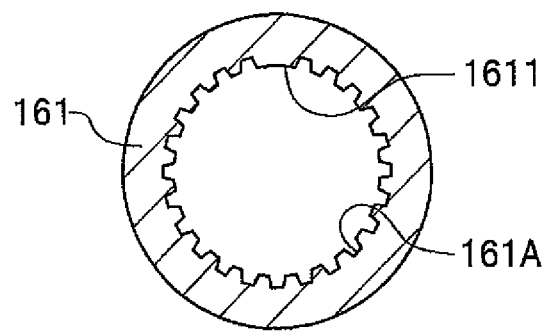

FIG. 43A is a cross-sectional view taken along line A-A in FIG. 40, FIG. 43B is a cross-sectional view taken along line B-B in FIG. 40, FIG. 43C is a cross-sectional view taken along line C-C in FIG. 40, and FIG. 43D is a cross-sectional view taken along line D-D in FIG. 40.

Figure 44A:
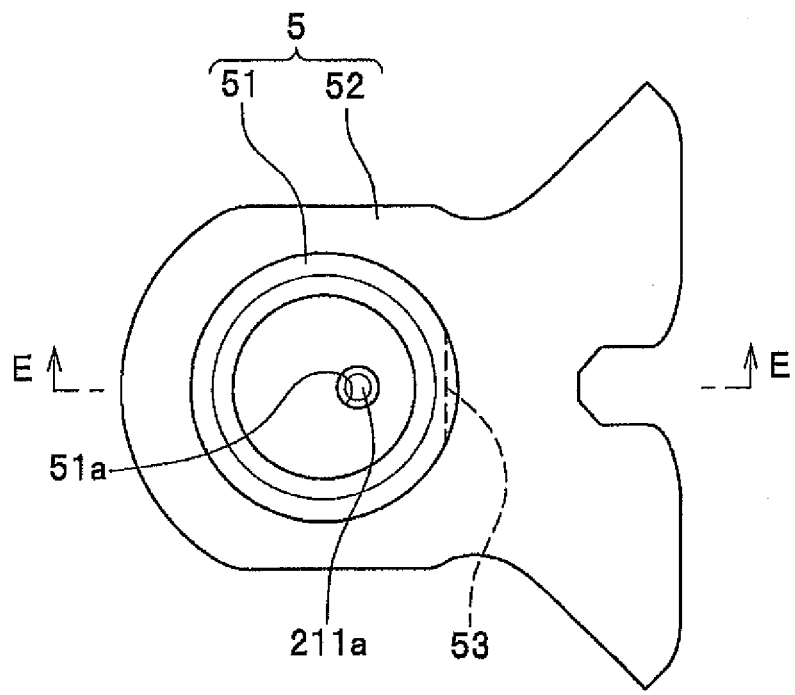
Figure 44B:
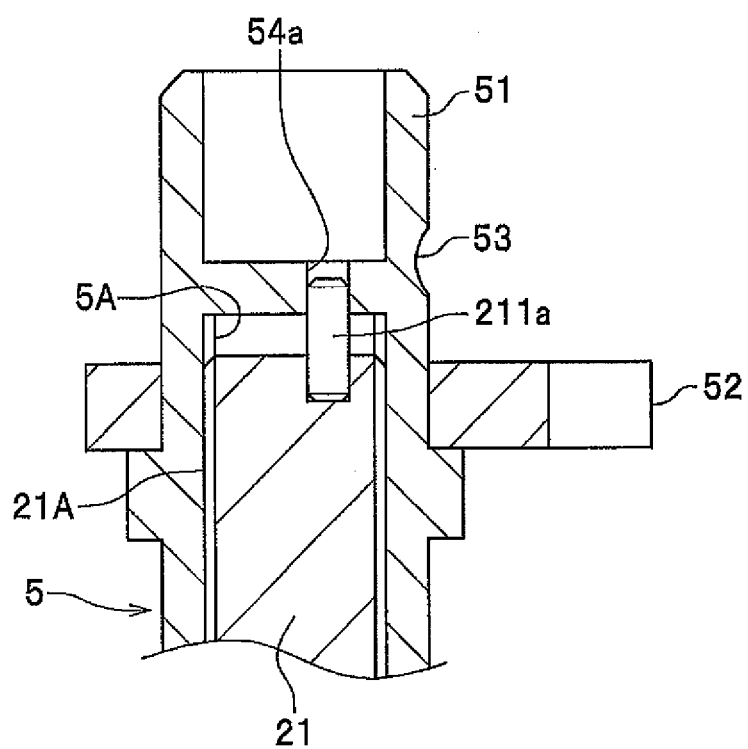

FIG. 44A is a plan view illustrating a steering shaft member engaging portion and an input shaft engaging portion according to the modification example, and FIG. 44B is a cross-sectional view taken along line E-E in FIG. 44A.

Figure 45A:
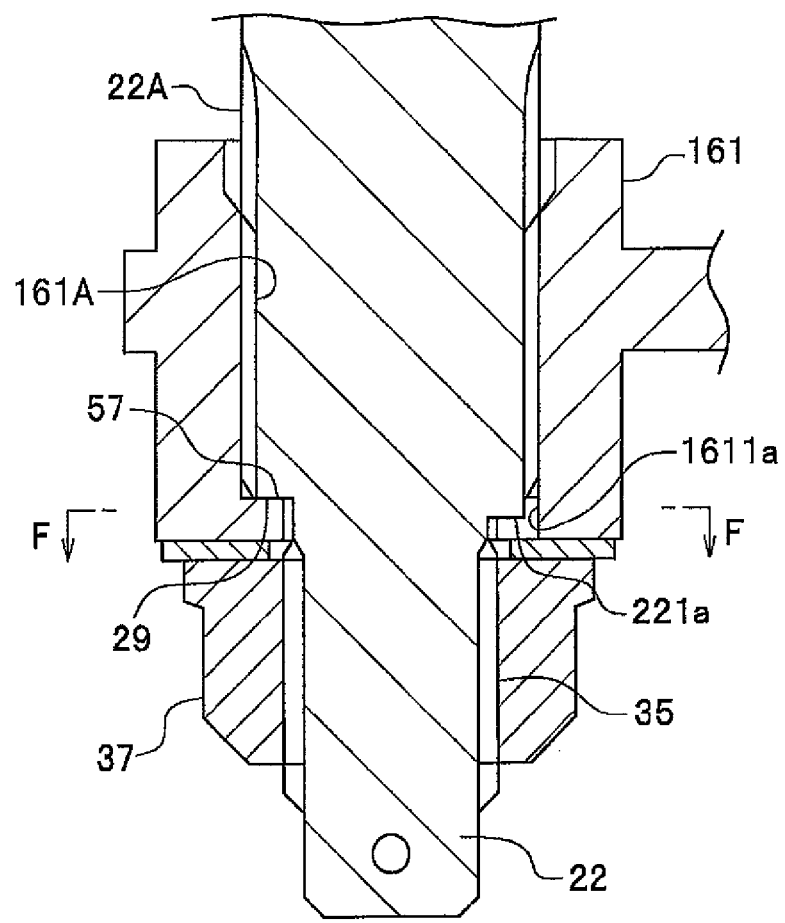
Figure 45B:
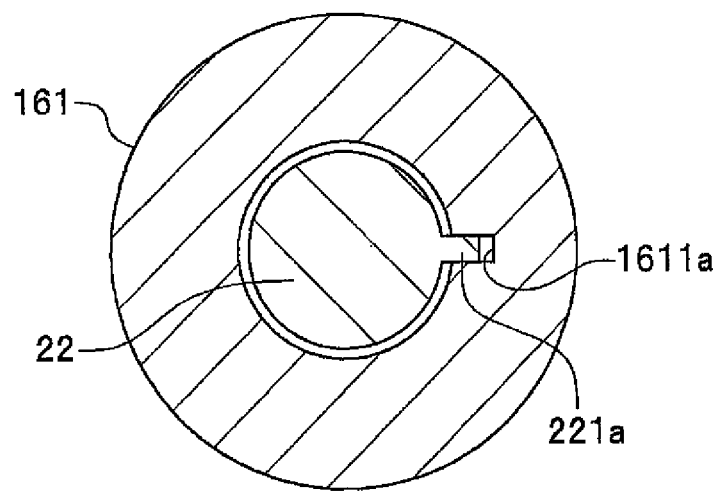

FIG. 45A is a vertical cross-sectional view illustrating an output shaft engaging portion and a steering arm engaging portion according to the modification example, and FIG. 45B is a cross-sectional view taken along line F-F in FIG. 45A.

Example 6

Figure 46A:
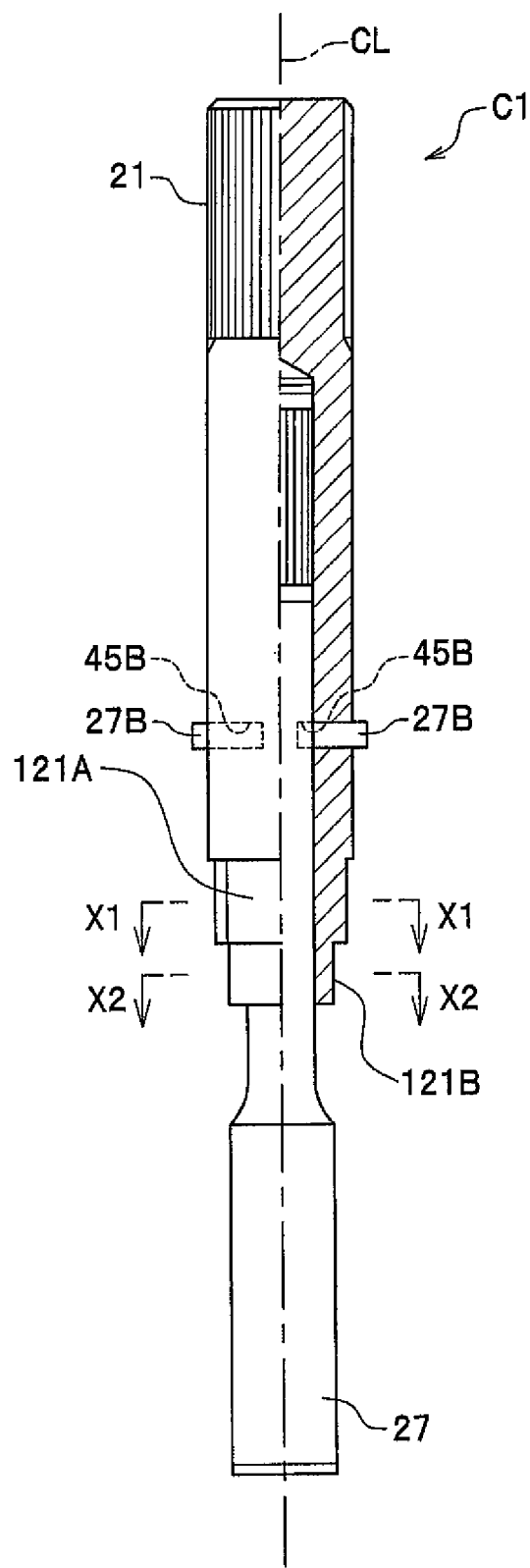
Figure 46B:
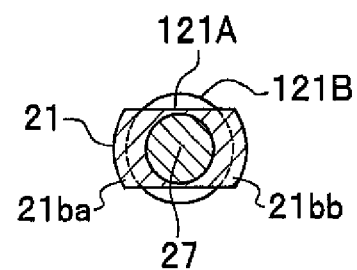
Figure 46C:
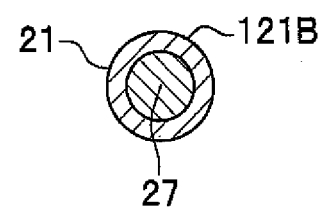

FIGS. 46A-C are schematic configuration views (1) of portions when the motor-driven power steering apparatus according to the first embodiment is assembled.

Figure 47:
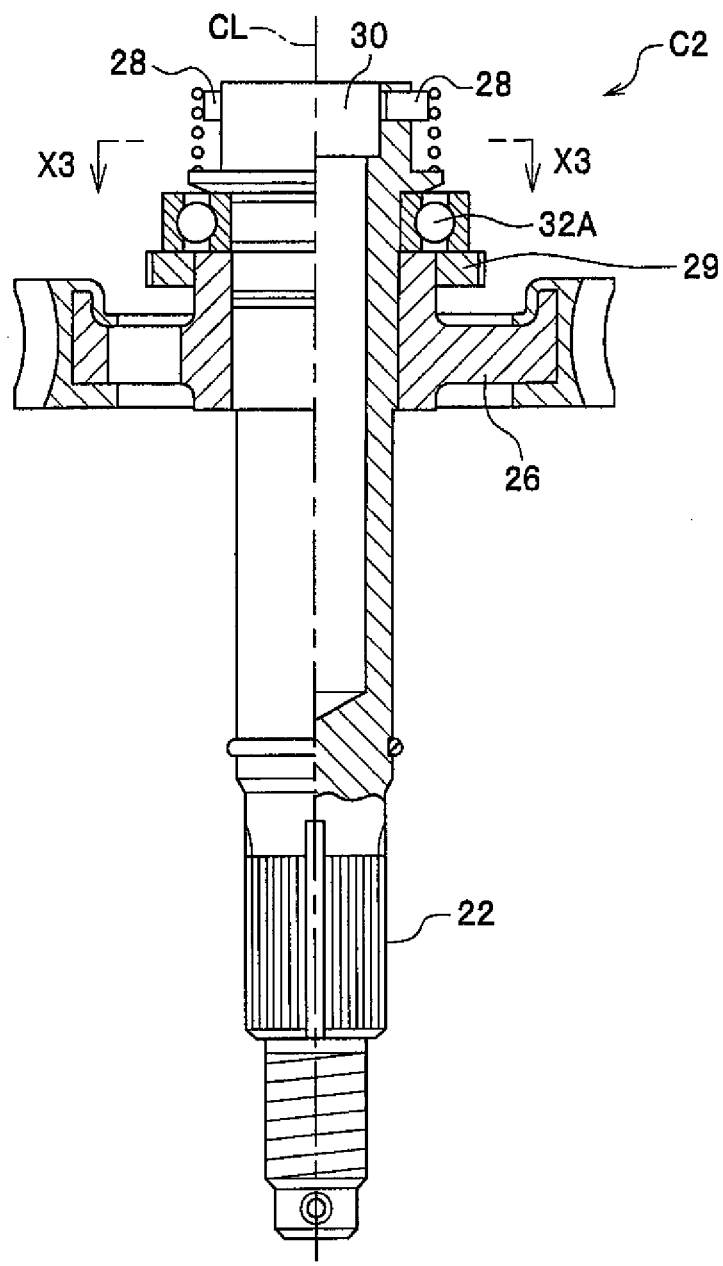

FIG. 47 is a schematic configuration view (2) of portions when the motor-driven power steering apparatus according to the first embodiment is assembled.

Figure 48A:
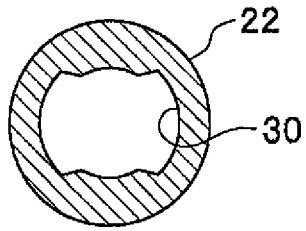
Figure 48B:
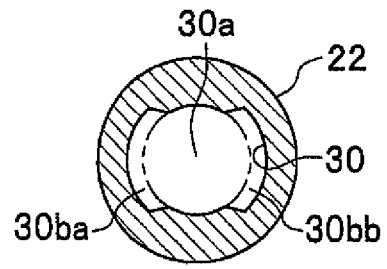

FIGS. 48A-B are schematic configuration views (3) of portions when the motor-driven power steering apparatus according to the first embodiment is assembled.

Figure 49:
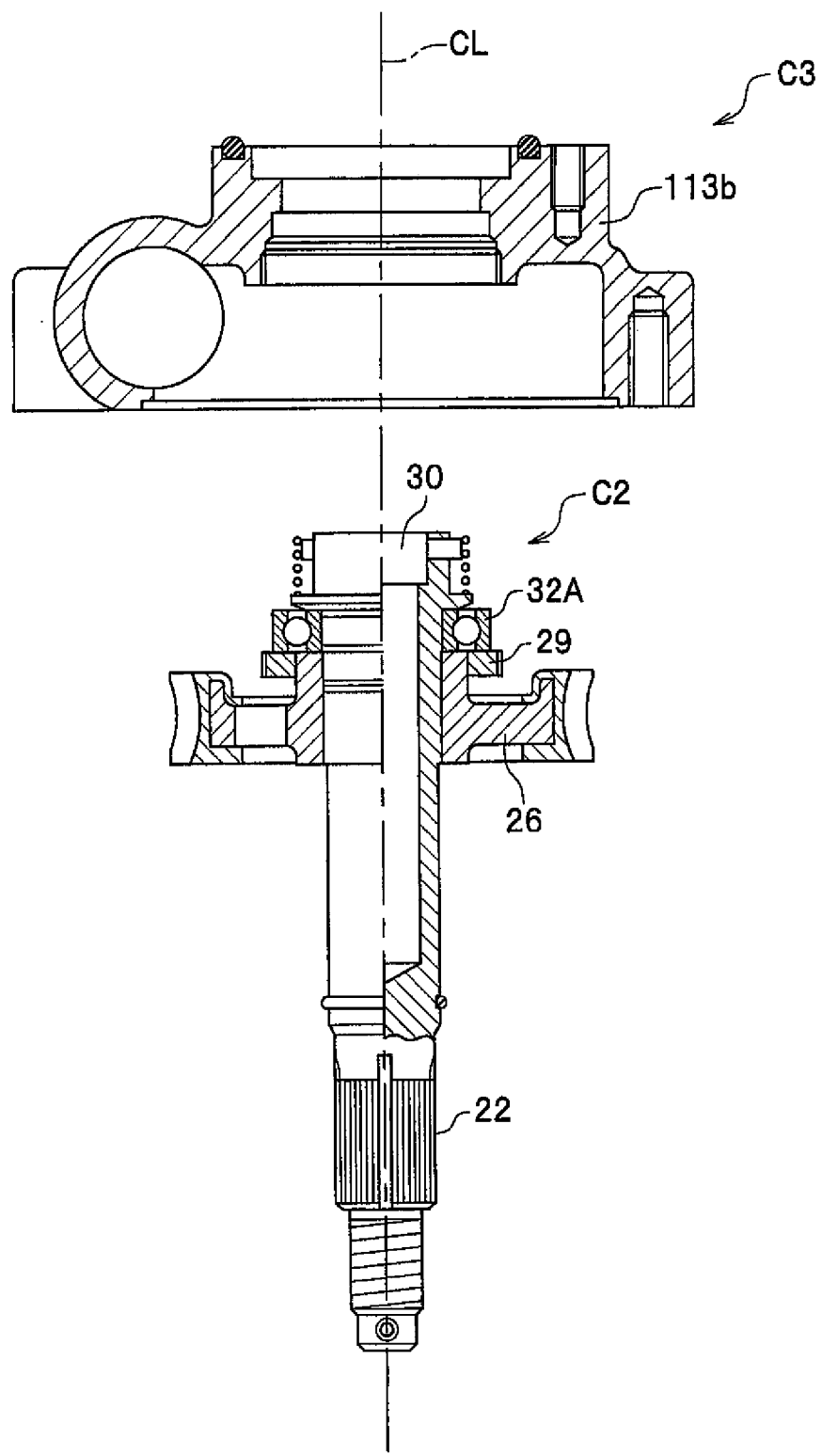

FIG. 49 is a schematic configuration view (4) of portions when the motor-driven power steering apparatus according to the first embodiment is assembled.

Figure 50:
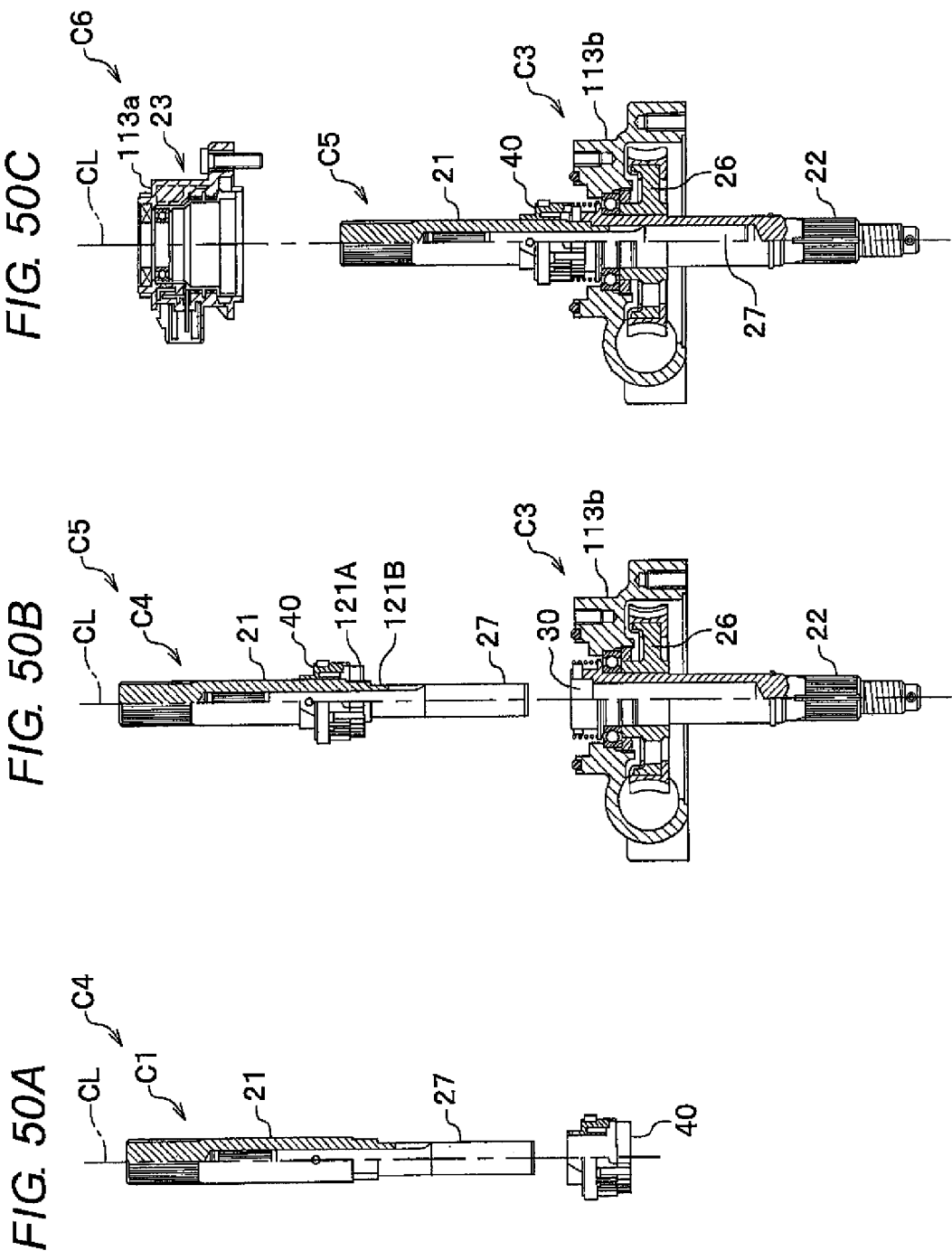

FIGS. 50A, 50B and 50C are schematic configuration views (5) of portions when the motor-driven power steering apparatus according to the first embodiment is assembled.

Figure 51:
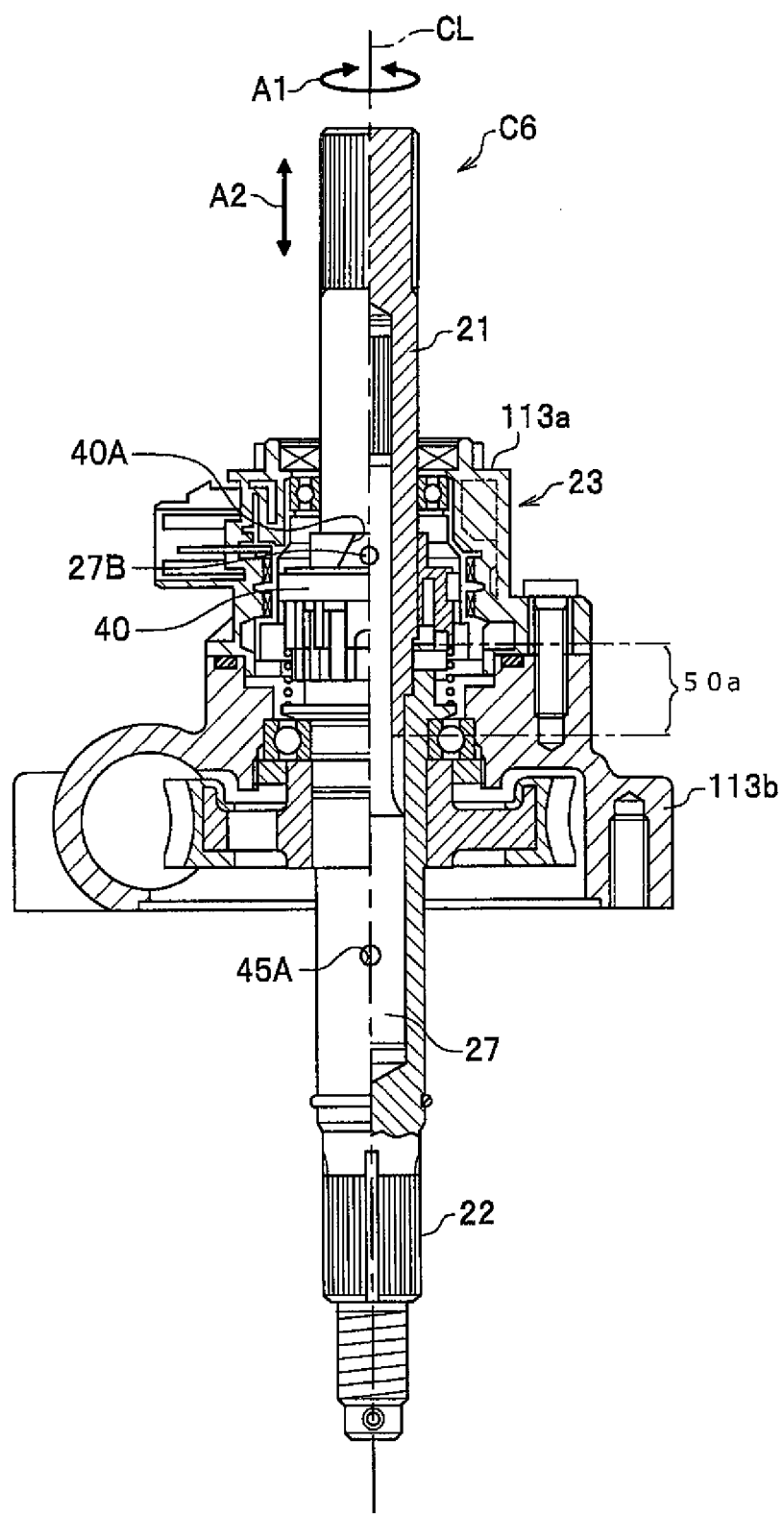

FIG. 51 is a schematic configuration view (6) of the portions when the motor-driven power steering apparatus according to the first embodiment is assembled.

Figure 52:
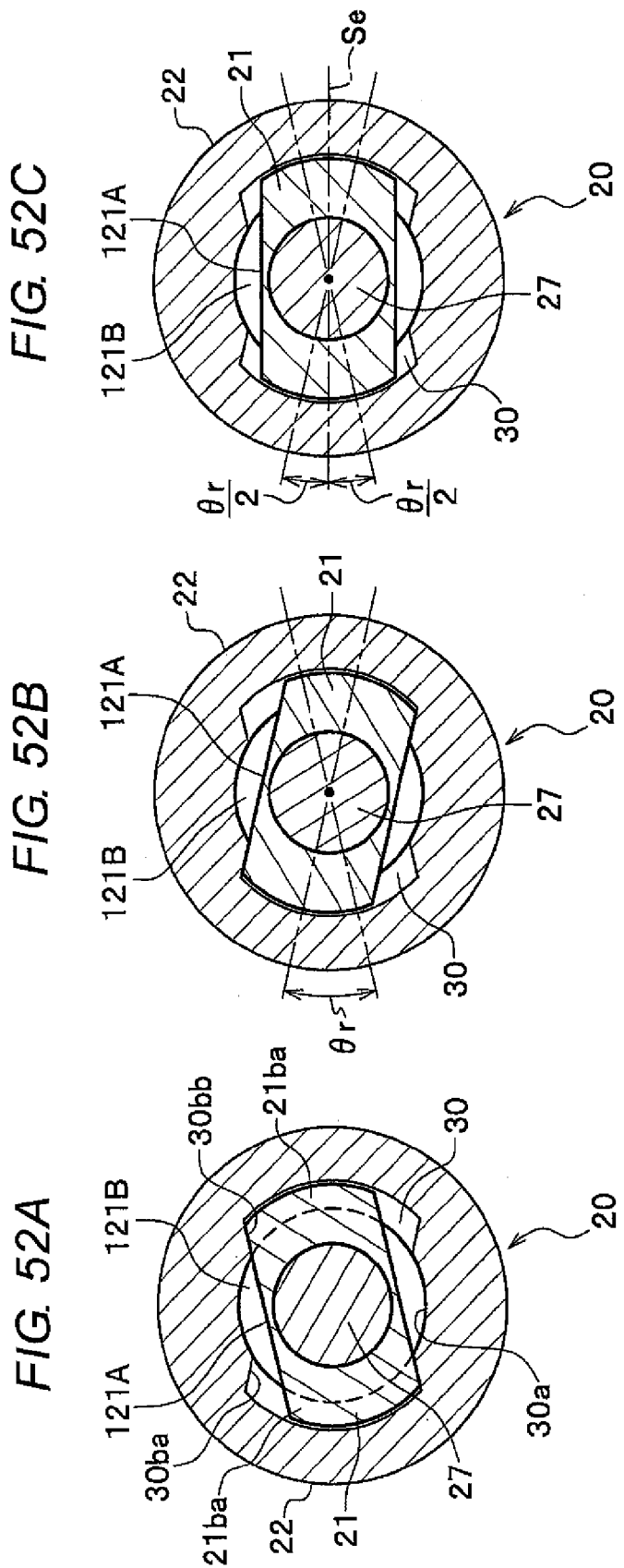

FIGS. 52A, 52B and 52C are schematic configuration views (7) of the portions when the motor-driven power steering apparatus according to the first embodiment is assembled.

Figure 53:
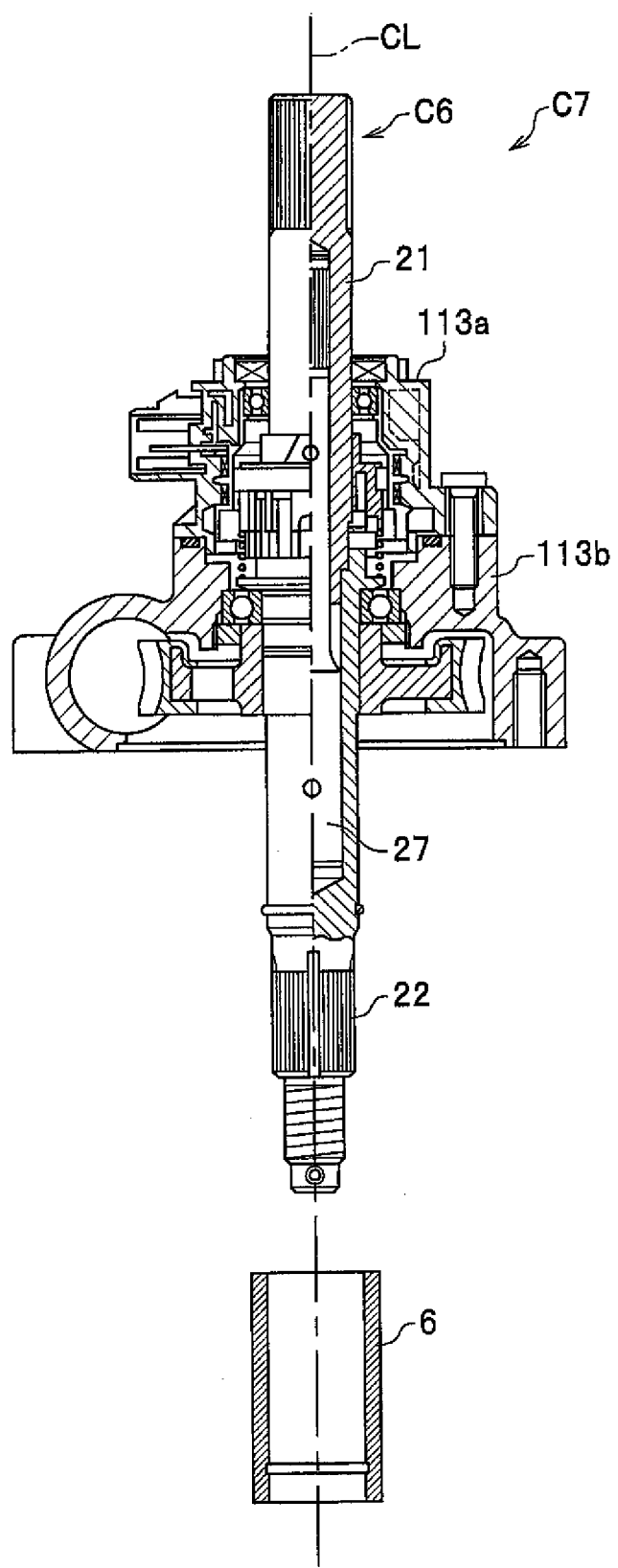

FIG. 53 is a schematic configuration view (8) of the portions when the motor-driven power steering apparatus according to the first embodiment is assembled.

Figure 54:
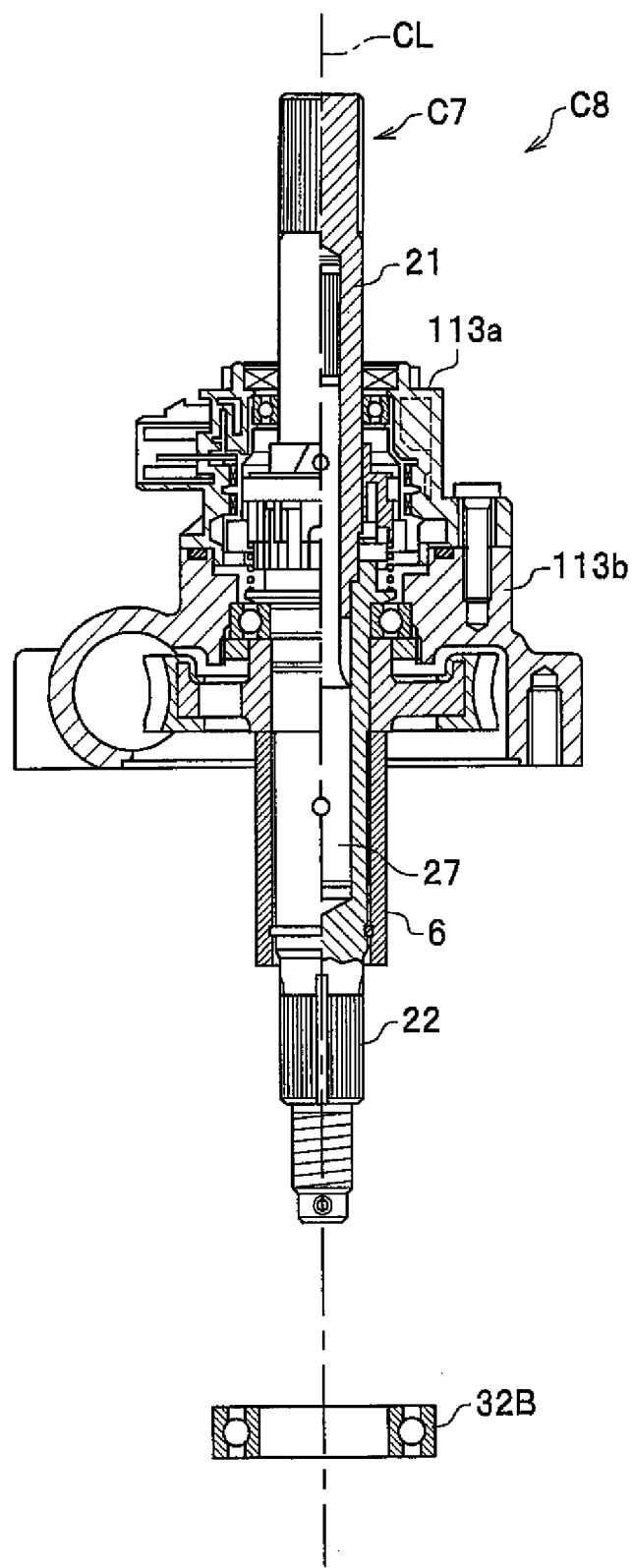

FIG. 54 is a schematic configuration view (9) of the portions when the motor-driven power steering apparatus according to the first embodiment is assembled.

Figure 55:
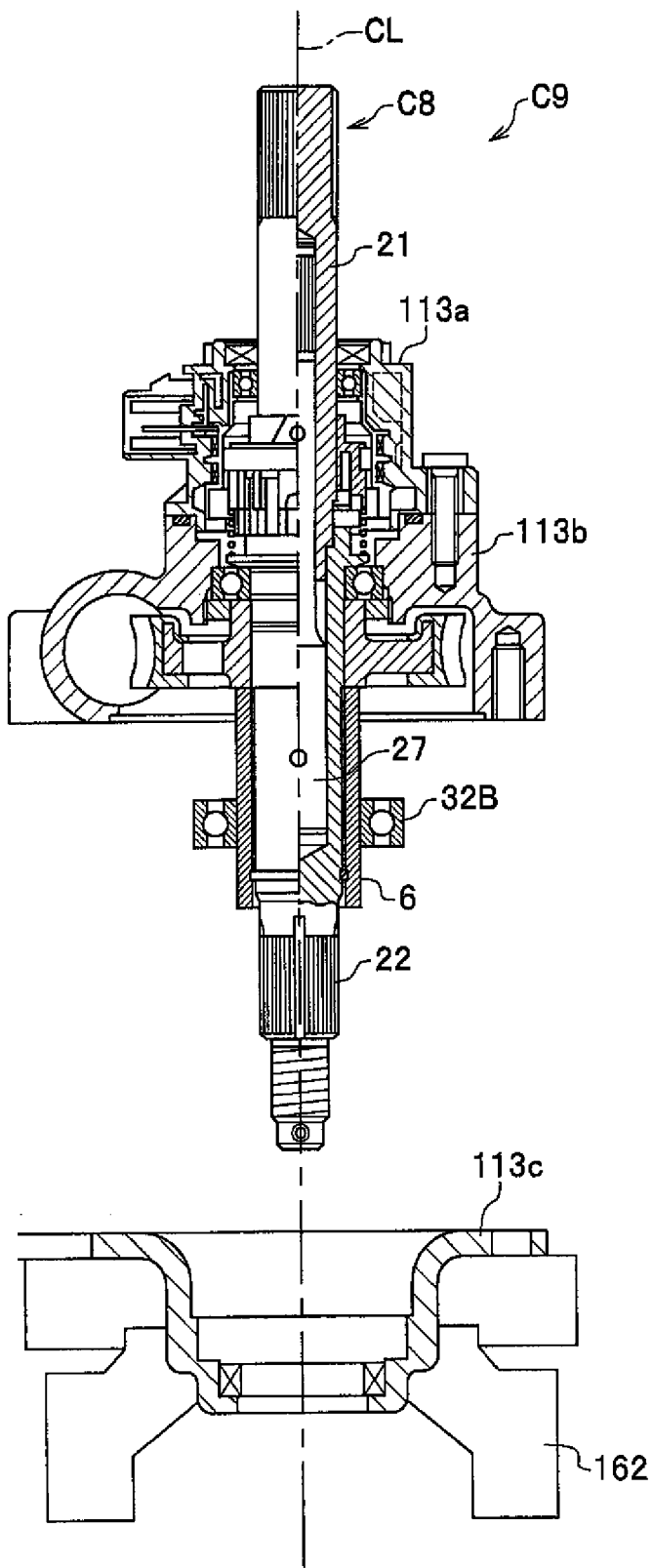

FIG. 55 is a schematic configuration view (10) of the portions when the motor-driven power steering apparatus according to the first embodiment is assembled.

Figure 56:
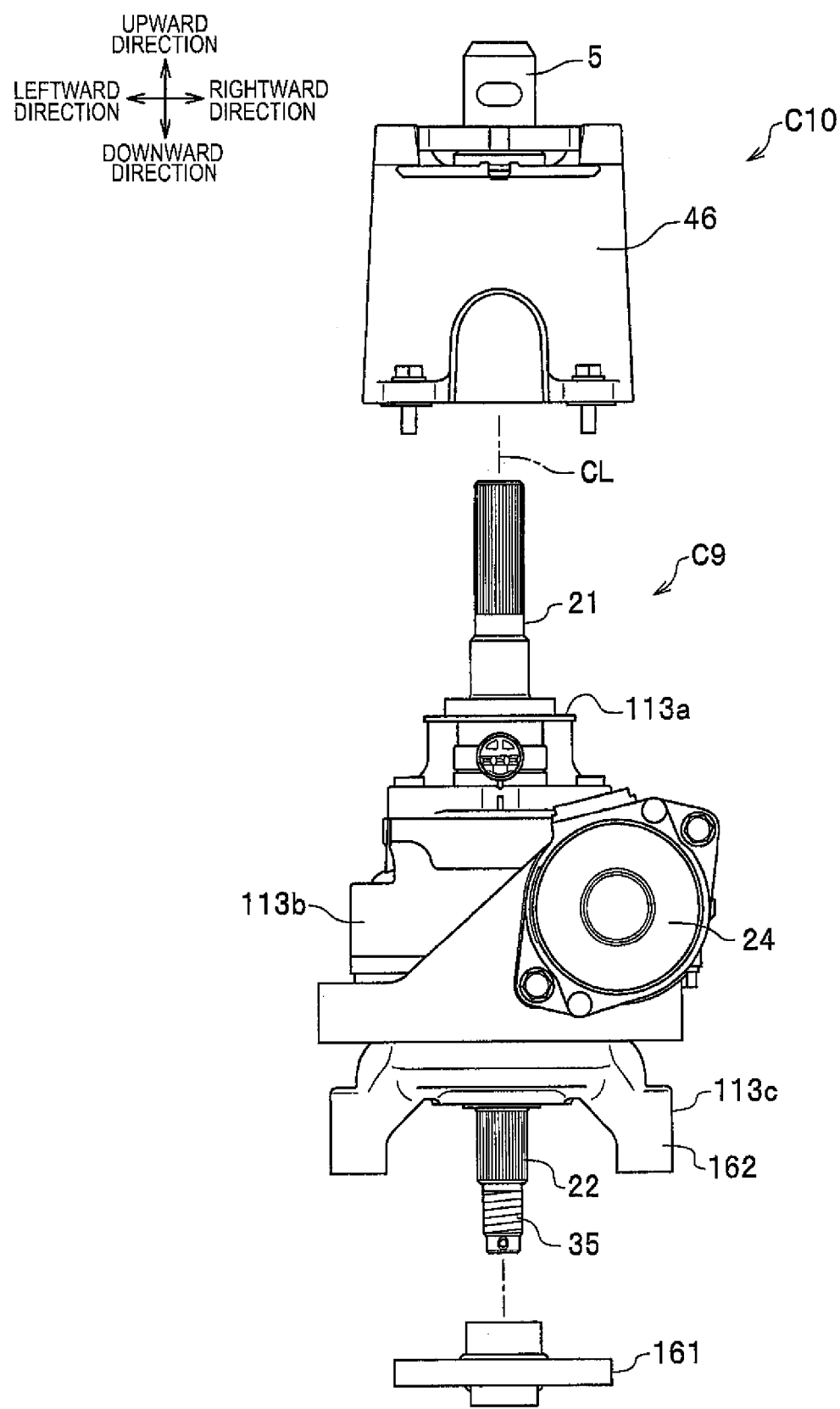

FIG. 56 is a schematic configuration view (11) of the portions when the motor-driven power steering apparatus according to the first embodiment is assembled.

Figure 57:
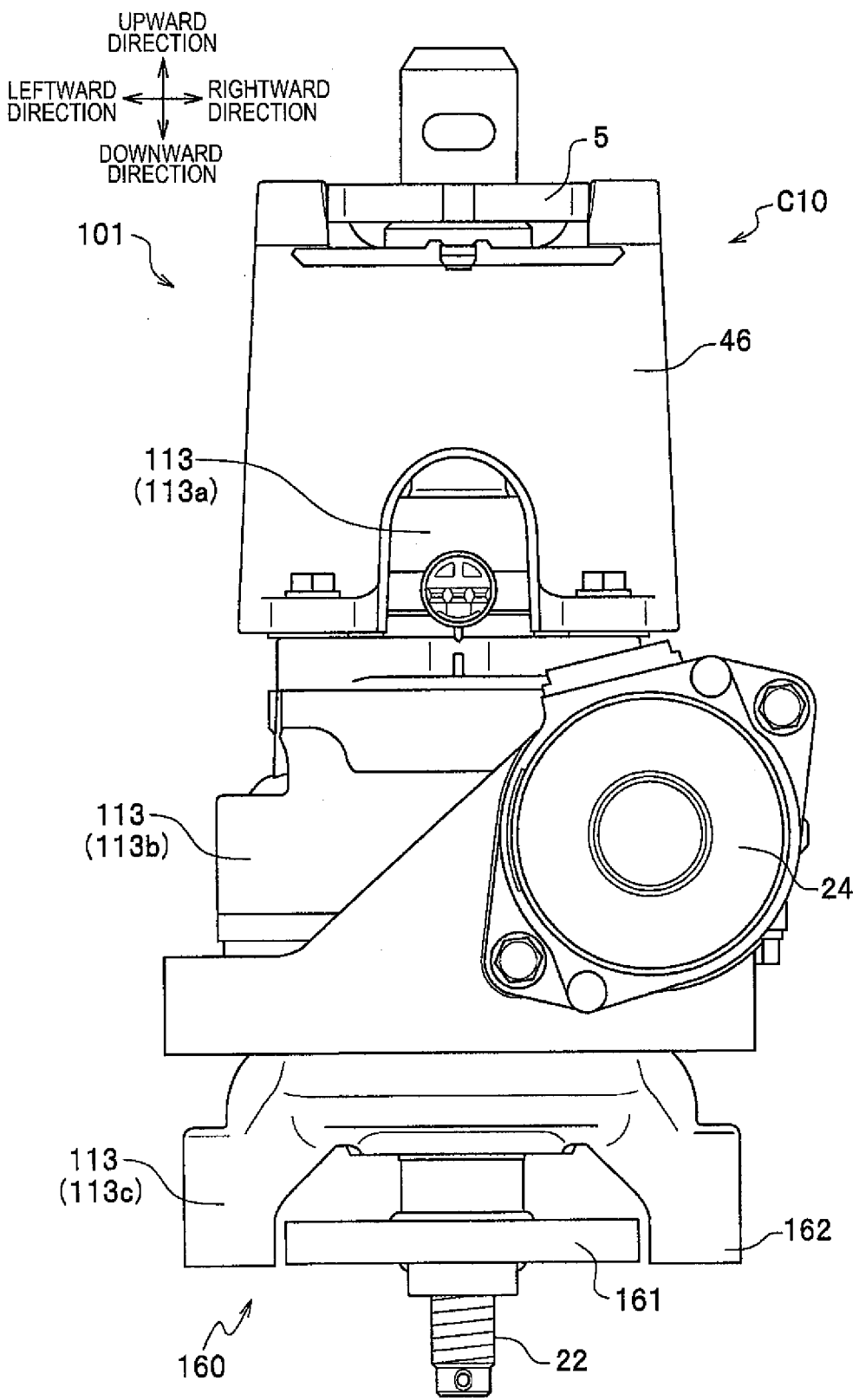

FIG. 57 is a schematic configuration view (12) of the portions when the motor-driven power steering apparatus according to the first embodiment is assembled.

Figure 58:
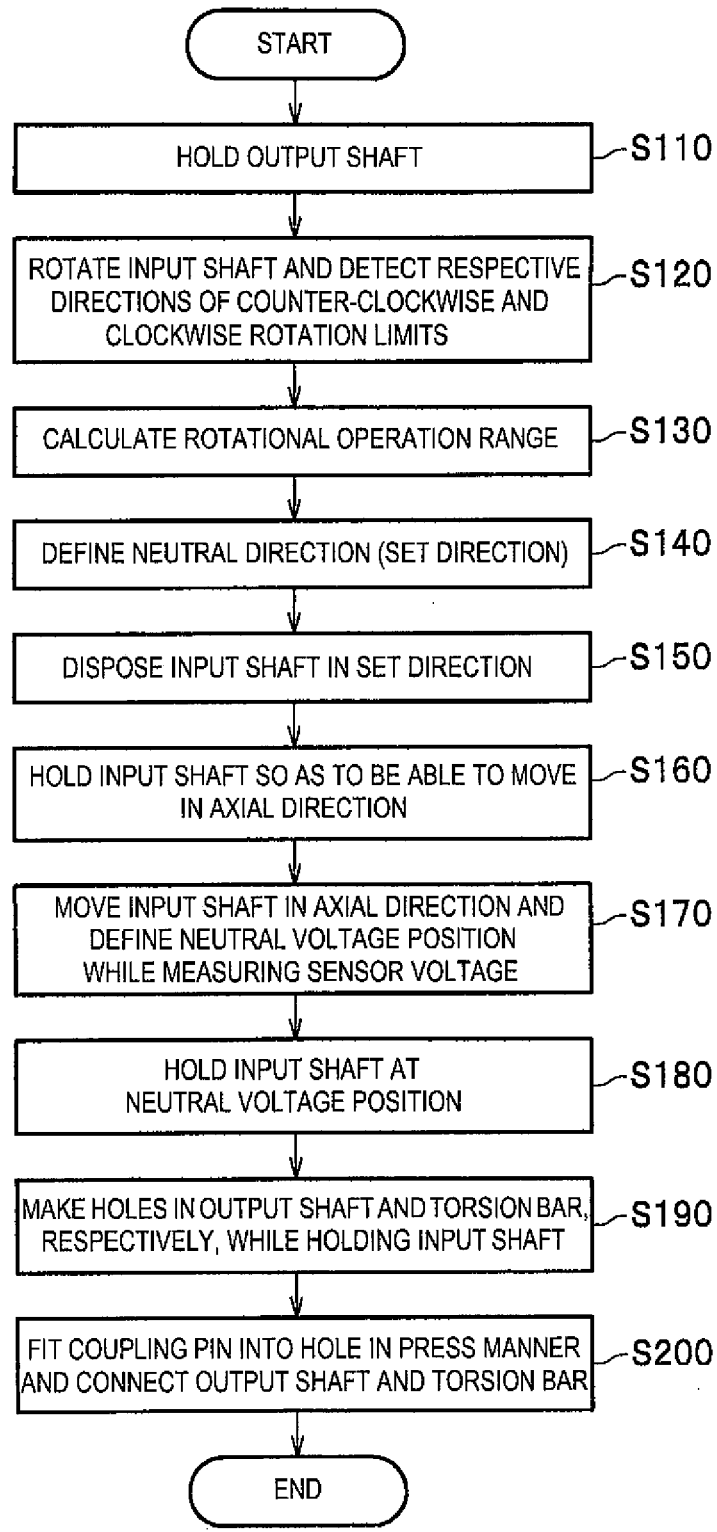

FIG. 58 is a flowchart illustrating main assembly steps of the motor-driven power steering apparatus according to the first embodiment.

Figure 59:
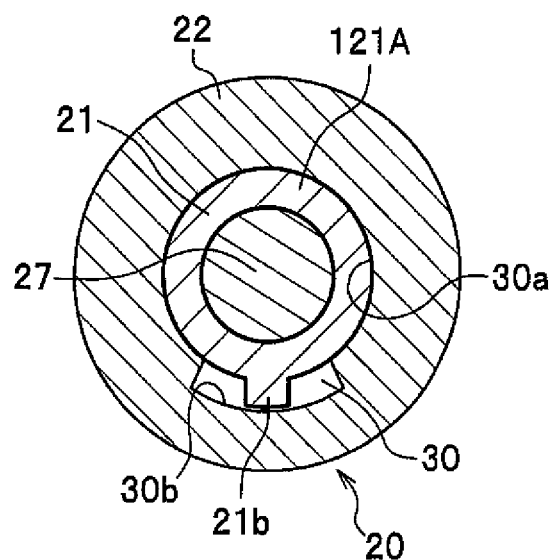

FIG. 59 is a schematic configuration view (1) of a rotation restriction portion according to a modification example.

Figure 60:
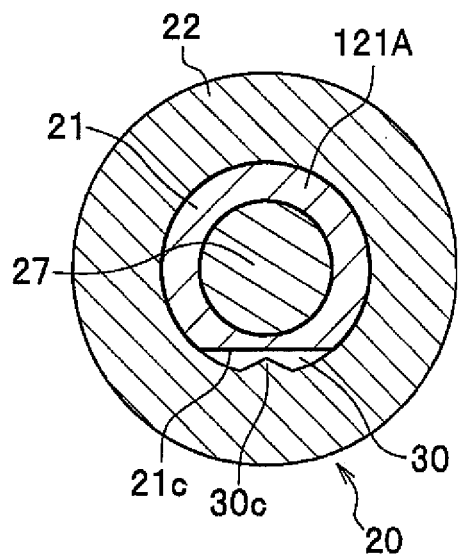

FIG. 60 is a schematic configuration view (2) of the rotation restriction portion according to a modification example.

Example 7

Figure 61:
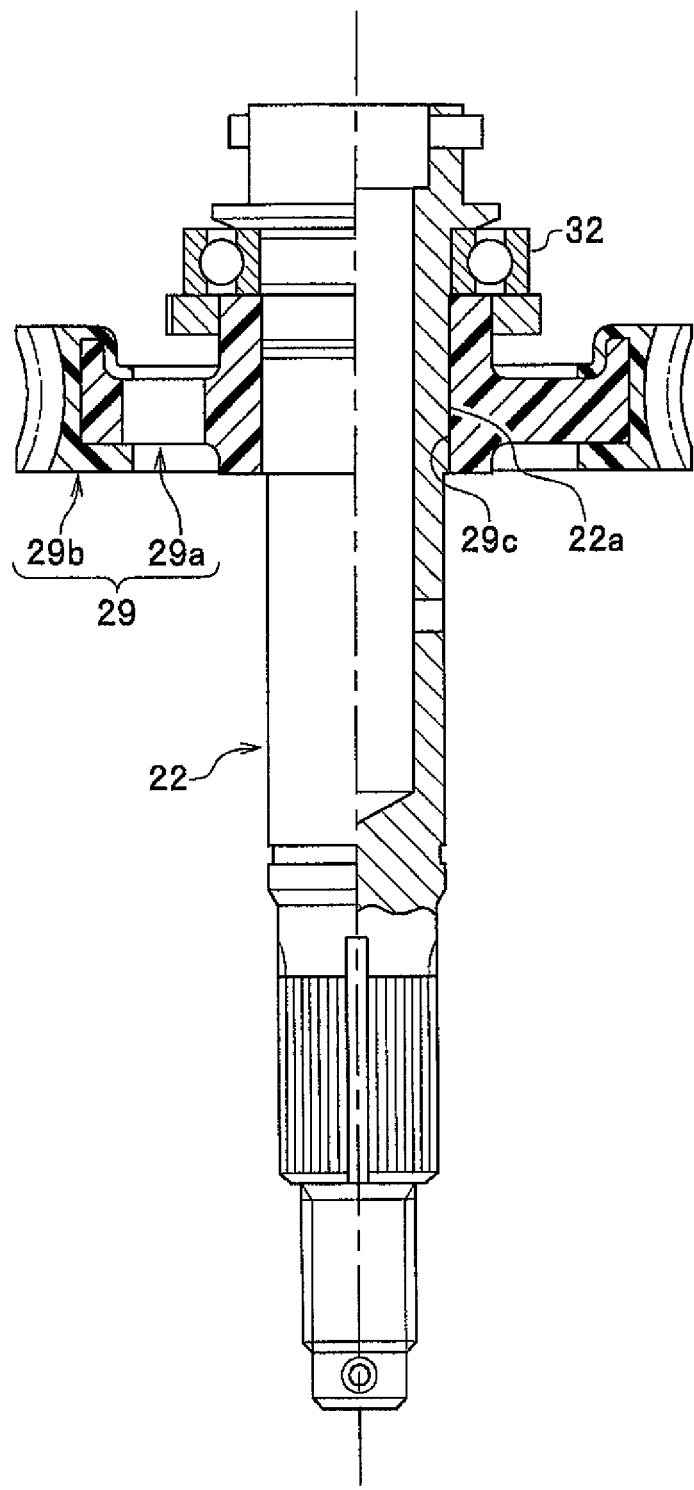

FIG. 61 is a vertical cross-sectional view of the output shaft and a worm wheel according to the first embodiment.

Figure 62:
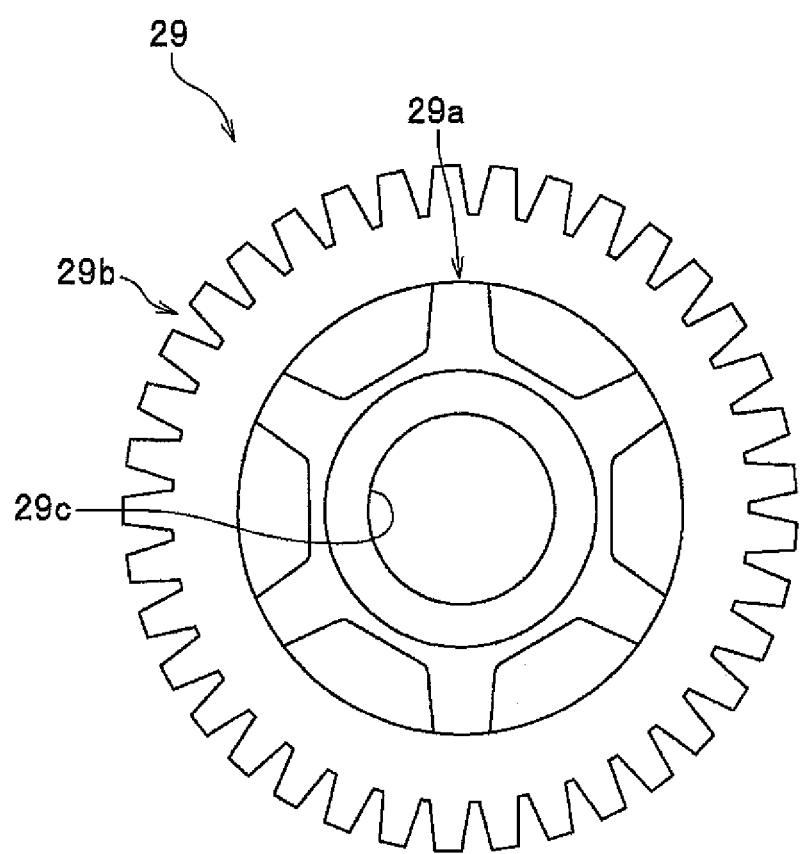

FIG. 62 is a plan view of the worm wheel according to the first embodiment.

Example 8

Figure 63A:
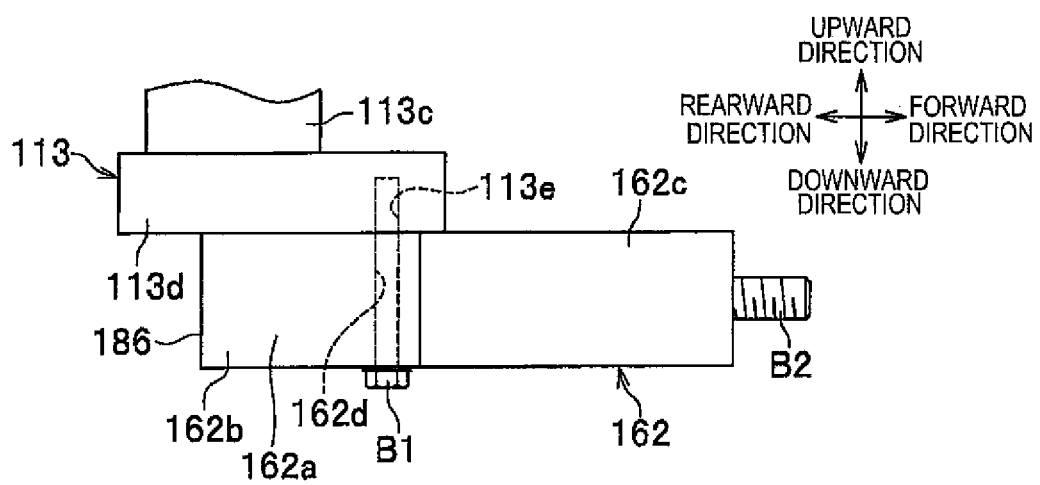
Figure 63B:
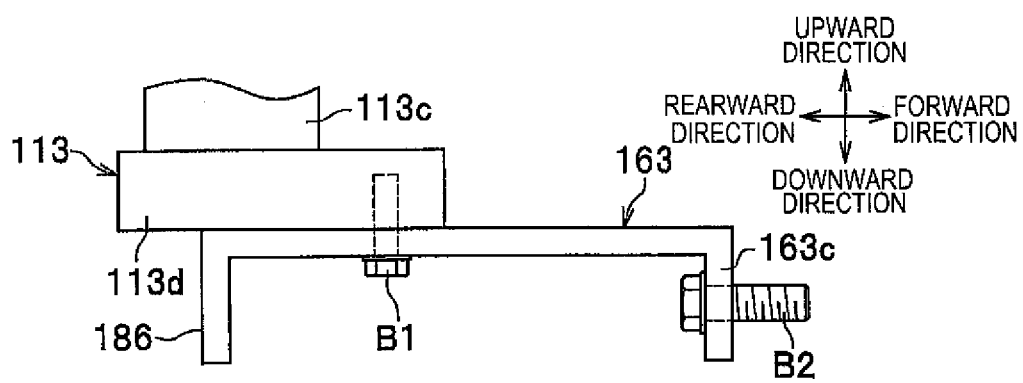

FIG. 63A is a side view illustrating the stopper according to the first embodiment, and FIG. 63B is a side view illustrating a modification example of the stopper according to the first embodiment.

Figure 64A:
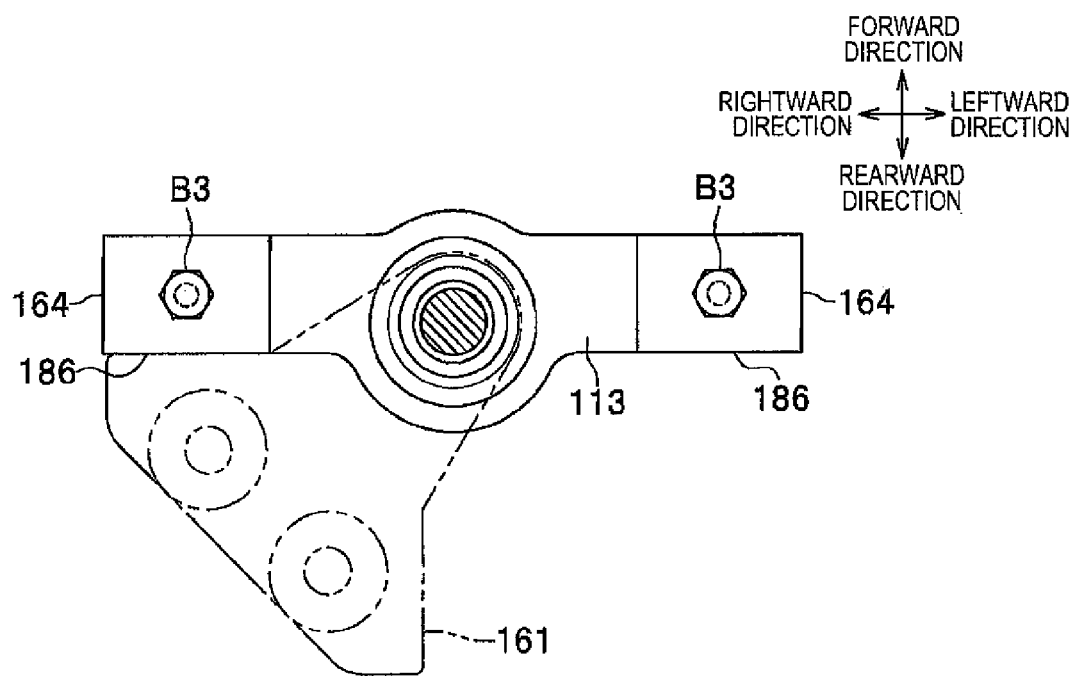
Figure 64B:
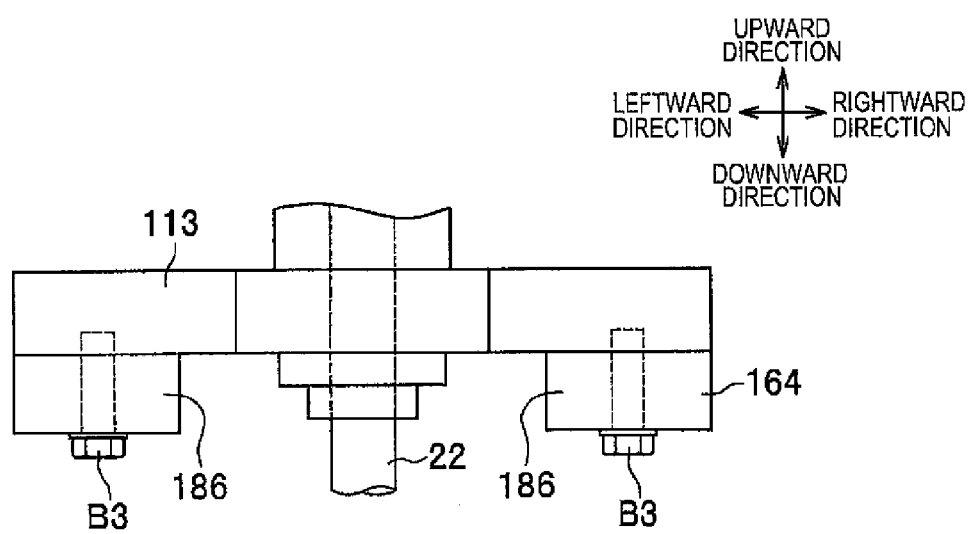

FIGS. 64A and 64B are views illustrating a modification example of the stopper according to the first embodiment, FIG. 64A is a side view, and FIG. 64B is a rear view.

Example 9

Figure 65:
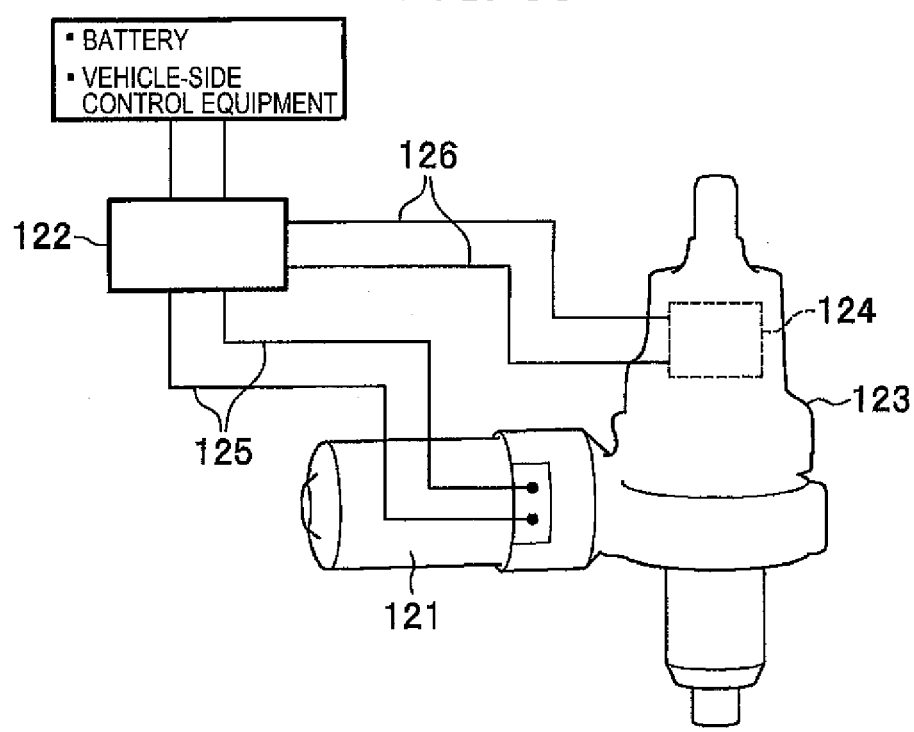

FIG. 65 is a configuration view of a power steering apparatus illustrating an example of the disposition of a controller of the related art.

DETAILED DESCRIPTION OF THE INVENTION

Hereinafter, embodiments of the present invention (hereinafter, referred to as the "embodiments") will be described in detail with reference to the accompanying drawings. The drawings are schematically illustrated merely to the extent that the present invention can be sufficiently understood. Thus, the present invention is not limited to only examples illustrated. In each of the drawings, the same reference numbers are respectively assigned to common configuration elements or similar configuration elements, and the descriptions thereof will be omitted.

Here, an "upward" direction, a "downward" direction, a "forward" direction, a "backward" direction, a "leftward" direction and a "rightward" direction are defined based upon the orientation of the vehicle. There are views illustrating the configuration of the vehicle when seen from below among the drawings. In these drawings, the "rightward" and "leftward" directions are seen as if being reversed. However, since the "rightward" and "leftward" directions are defined based on when the vehicle is seen from below, the "rightward" and "leftward" directions are as illustrated in the drawings.

First Embodiment

Hereinafter, the configuration of an arm stopper mechanism 160 (refer to FIG. 2) according to a first embodiment will be described. Here, the characteristics of the arm stopper mechanism 160 according to the first embodiment will be described in the following sequence for easy understanding of the characteristics of the arm stopper mechanism 160.

1: Respective Schematic Configurations of Saddle-type Vehicle and Motor-driven Power Steering Apparatus 2: Schematic Configuration between Steering Arm and Wheels (Front Wheels)

Figure 1:
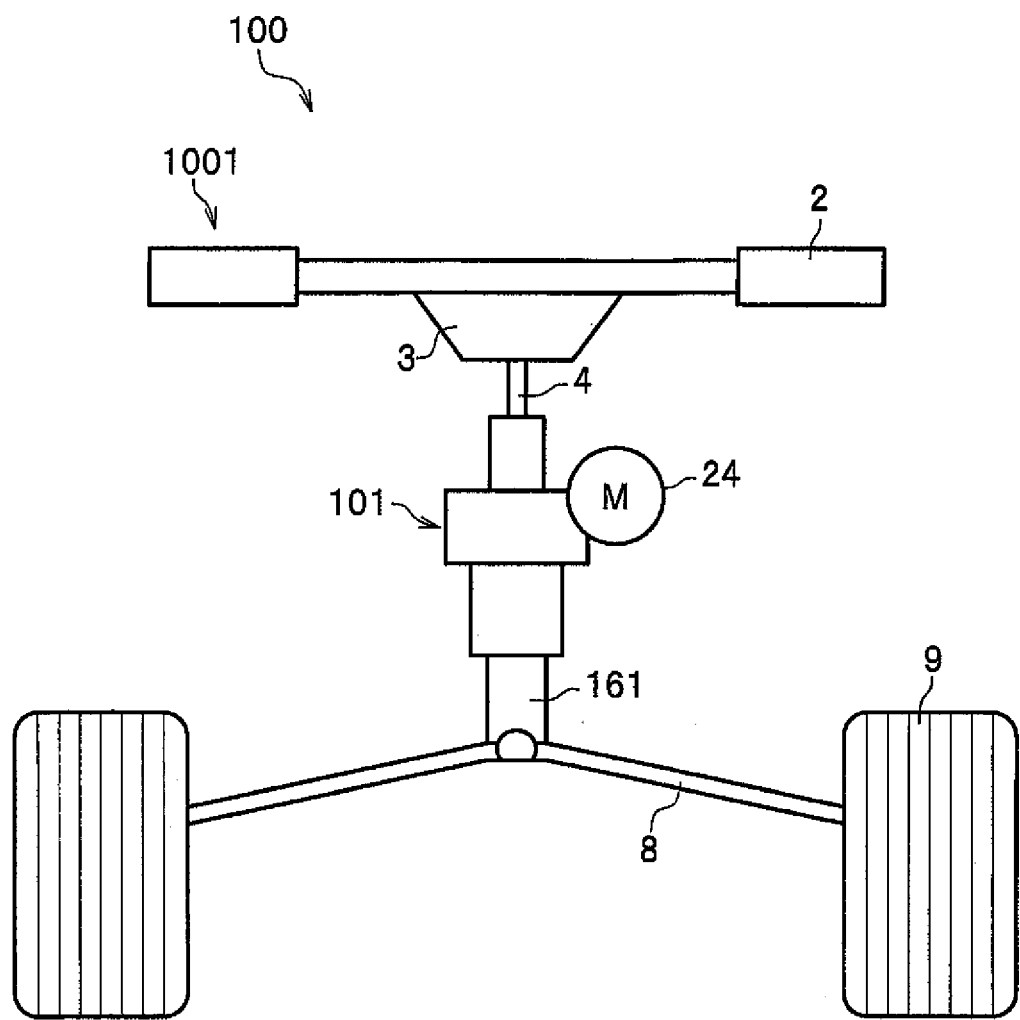
FIG. 1 is a schematic view illustrating a schematic configuration of a saddle riding type vehicle.

3: Load Vector Applied to Steering Arm 4-1: Configuration of Arm Stopper Mechanism According to Comparative Example 4-2: Load Vectors Applied to Main Portions of Arm Stopper Mechanism According to Comparative Example 5: Relationship between Input Load Vector, Striking Load Vector, and Bending Load Vector 6-1: Configuration of Arm Stopper Mechanism According to First Embodiment 6-2: Load Vectors Applied to Main Portions of Arm Stopper Mechanism According to First Embodiment 7: Schematic Configuration of Main Portions of Arm Stopper Mechanism According to First Embodiment 8: Schematic Configuration of Attachment Position Varying Mechanism Provided in Arm Stopper Mechanism According to First Embodiment 9-1: Schematic Configuration of First Modification Example of Attachment Position Varying Mechanism Provided in Arm Stopper Mechanism According to First Embodiment 9-2: Schematic Configuration of Second Modification Example of Attachment Position Varying Mechanism Provided in Arm Stopper Mechanism According to First Embodiment 9-3: Schematic Configuration of Third Modification Example of Attachment Position Varying Mechanism Provided in Arm Stopper Mechanism According to First Embodiment 9-4: Schematic Configuration of Fourth Modification Example of Attachment Position Varying Mechanism Provided in Arm Stopper Mechanism According to First Embodiment 10: Internal Configuration of Steering Apparatus According to First Embodiment 11: Respective Schematic Configurations of Portions at Assembly of Steering Apparatus According to First Embodiment 1: Respective Schematic Configurations of Saddle Riding Type Vehicle and Motor-Driven Power Steering Apparatus First, the schematic configuration of a saddle riding type vehicle 100 will be described with reference to FIG. 1. FIG. 1 is a schematic view illustrating the schematic configuration of the saddle riding type vehicle 100. The saddle riding type vehicle 100 is equipped with a motor-driven power steering apparatus 101 that is provided with an arm stopper mechanism 160 according to the first embodiment.

As illustrated in FIG. 1, the saddle riding type vehicle 100 is an all terrain vehicle (ATV) such as a buggy vehicle or a snowmobile, and has a steering mechanism 1001. In the steering mechanism 1001, a steering shaft 4 is fixed to a handle stay 3 that is provided with handlebars 2 which are steering handlebars. The steering shaft 4 is rotatably supported by a vehicle-side support member (not illustrated). The power steering apparatus (here, the motor-driven power steering apparatus) 101 is installed between the steering shaft 4 and a steering arm 161 that transmits a steering force to right and left wheels (front wheels) 9 connected to right and left tie rods 8. The motor-driven power steering apparatus 101 is an apparatus that applies the generated torque of an electric motor 24 in assisting a steering force which a driver applies to the handlebars 2. The motor-driven power steering apparatus 101 is provided with an arm stopper mechanism 160 according to the first embodiment.

Figure 2:
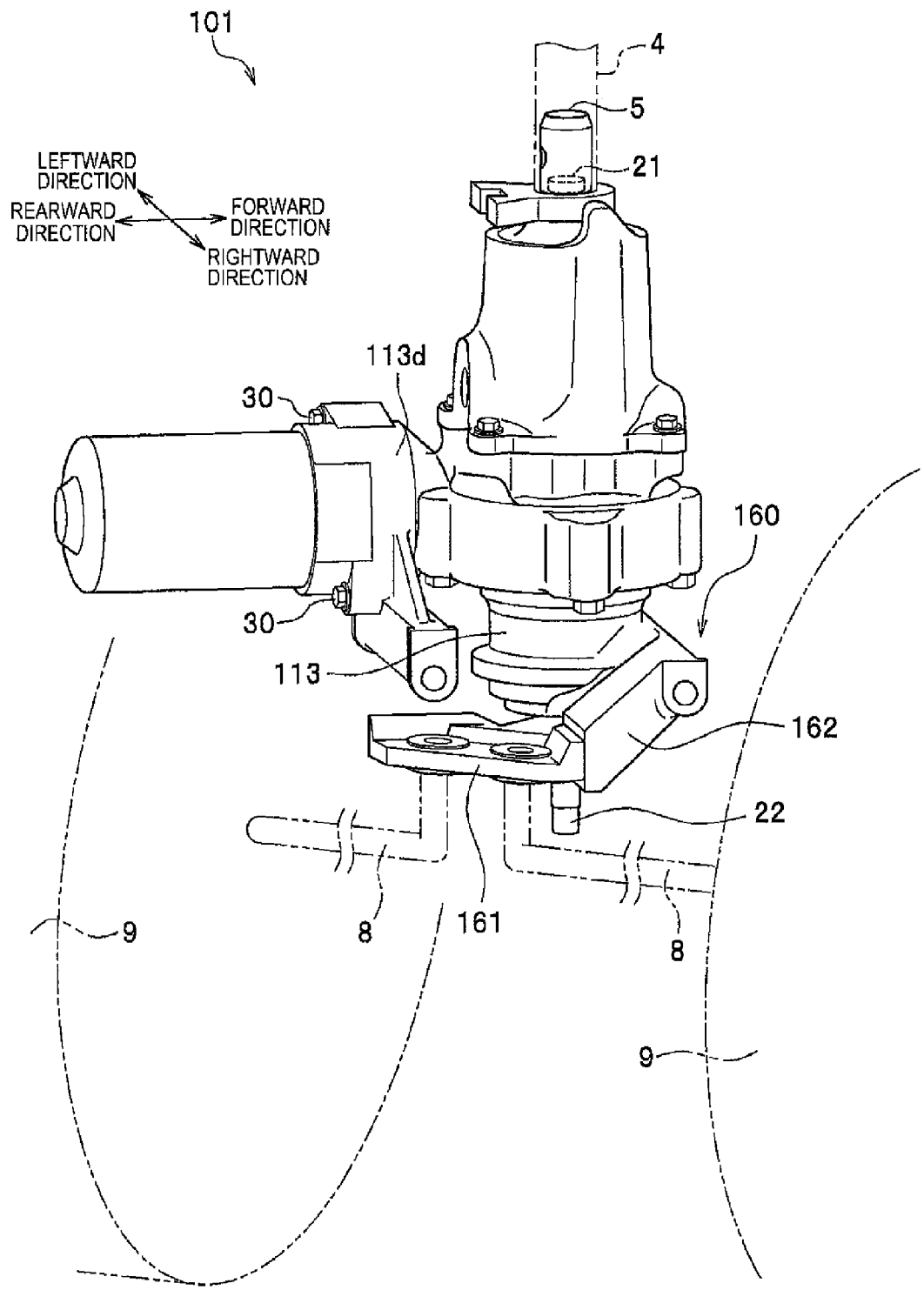
FIG. 2 is a schematic configuration view of a motor-driven power steering apparatus provided with an arm stopper mechanism according to a first embodiment, when seen from a side.
Figure 3:
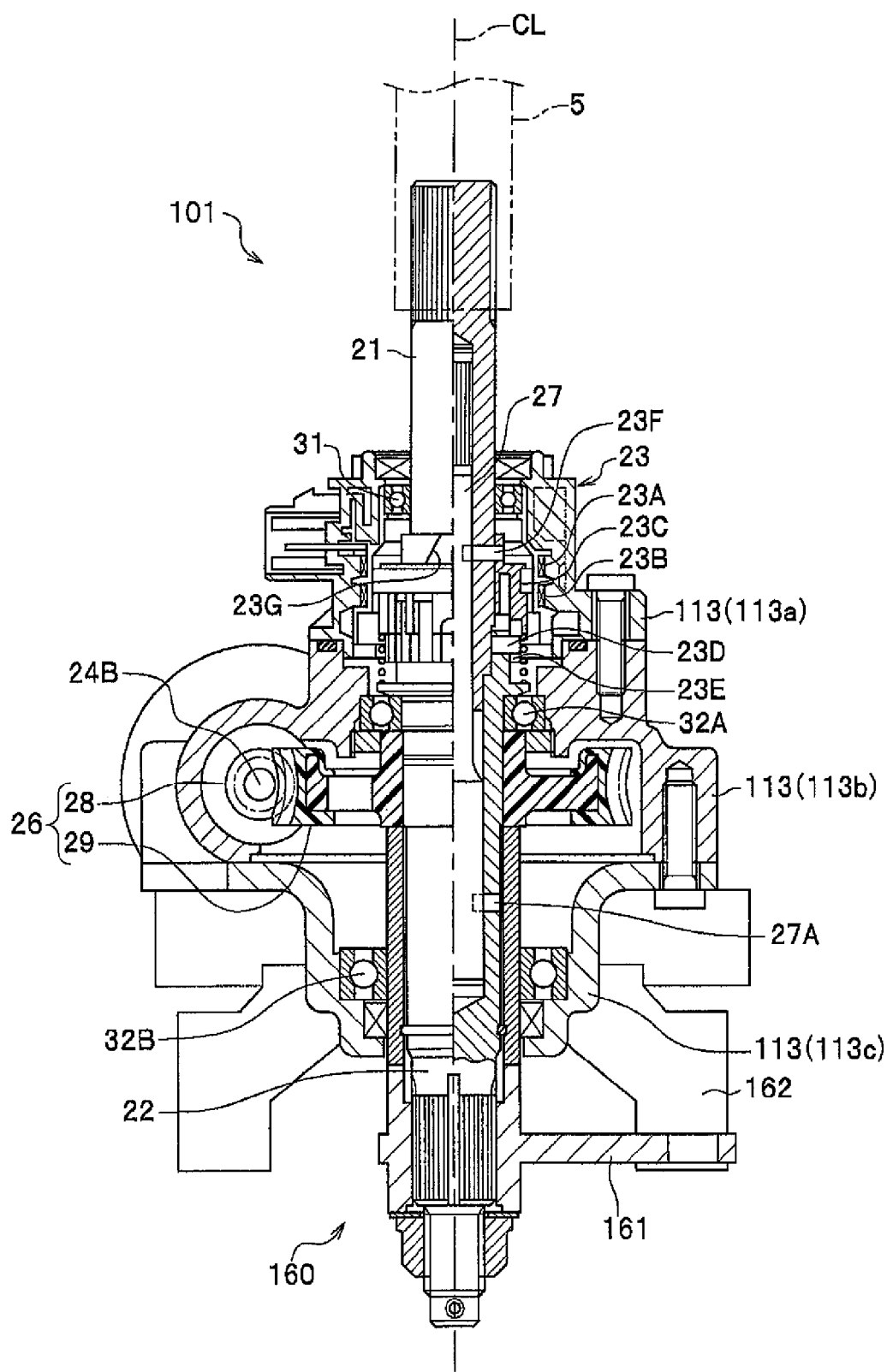
FIG. 3 is a schematic internal configuration view of the motor-driven power steering apparatus provided with the arm stopper mechanism according to the first embodiment.

Subsequently, the schematic configuration of the motor-driven power steering apparatus 101 will be described with reference to FIGS. 2 and 3. FIG. 2 is a schematic configuration view of the motor-driven power steering apparatus 101 provided with the arm stopper mechanism 160 according to the first embodiment, when seen from a side. FIG. 3 is a schematic internal configuration view of the motor-driven power steering apparatus 101.

As illustrated in FIG. 2, the motor-driven power steering apparatus 101 has built-in members such as an input shaft 21, a torsion bar 27 (refer to FIG. 3), an output shaft 22, and bearings 31, 32A, and 32B. The input shaft 21 is connected to the handlebar-side steering shaft 4 via a joint 5. The torsion bar 27 (refer to FIG. 3) connects the input shaft 21 and the output shaft 22. The input shaft 21 is turnably supported by the bearing 31. The output shaft 22 is turnably supported by the bearings 32A and 32B. A housing 113 of the motor-driven power steering apparatus 101 includes a first housing 113a, a second housing 113b, and a third housing 113c which are disposed in sequence from the top. The bearing 31 is fitted into the first housing 113a. The bearing 32A is fitted into the second housing 113b. The bearing 32B is fitted into the third housing 113c. A steering arm 161 is attached to the vicinity of a lower end of the output shaft 22.

The steering arm 161 is a steering member of the wheels (the front wheels) 9. The tie rod 8 is attached to the steering arm 161, and the wheel 9 is connected to the tie rod 8. The tie rod 8 is disposed to extend in a lateral direction of the vehicle. One end of the tie rod 8 is connected to the steering arm 161 in the vicinity of the center of the vehicle in the lateral direction, and the other end is connected to the wheel (the front wheel) 9. The steering arm 161 is spline-fitted to the output shaft 22, and turns about the output shaft 22.

The motor-driven power steering apparatus 101 is required to restrict the turning of the handlebars 2 in order for the vehicle not to roll over in the lateral direction when the driver turns the handlebars 2 to the maximum steering angle or greater in a clockwise direction or a counter-clockwise direction, or when, while the vehicle is traveling on a rough road, an external force caused by a protrusion (a convex portion) or the like on a road surface is input to the handlebars 2 via the wheel (the front wheel) 9, and thus causes the handlebars 2 to be turned to the maximum steering angle or greater. The motor-driven power steering apparatus 101 is provided with the arm stopper mechanism 160 as a mechanism for such a function which restricts the turning angle of the steering arm 161 using a stopper 162.

The stopper 162 is provided to protrude downward from a lower surface of the housing 113 of the motor-driven power steering apparatus 101. When the driver turns the handlebars 2 to the maximum steering angle or greater in the clockwise direction or the counter-clockwise direction, or when an external force is input to the handlebars 2 via the wheel (the front wheel) 9, and thus causes the handlebars 2 to be turned to the maximum steering angle or greater, in the arm stopper mechanism 160, a striking surface 176 (refer to FIG. 8A) of the steering arm 161 strikes against a contact surface 186a (refer to FIG. 9A) of the stopper 162. Accordingly, the arm stopper mechanism 160 restricts the turning angle of the steering arm 161 via the stopper 162, and thus the turning of the handlebars 2 is restricted.

2: Schematic Configuration Between Steering Arm and Wheels (Front Wheels)

Figure 4:
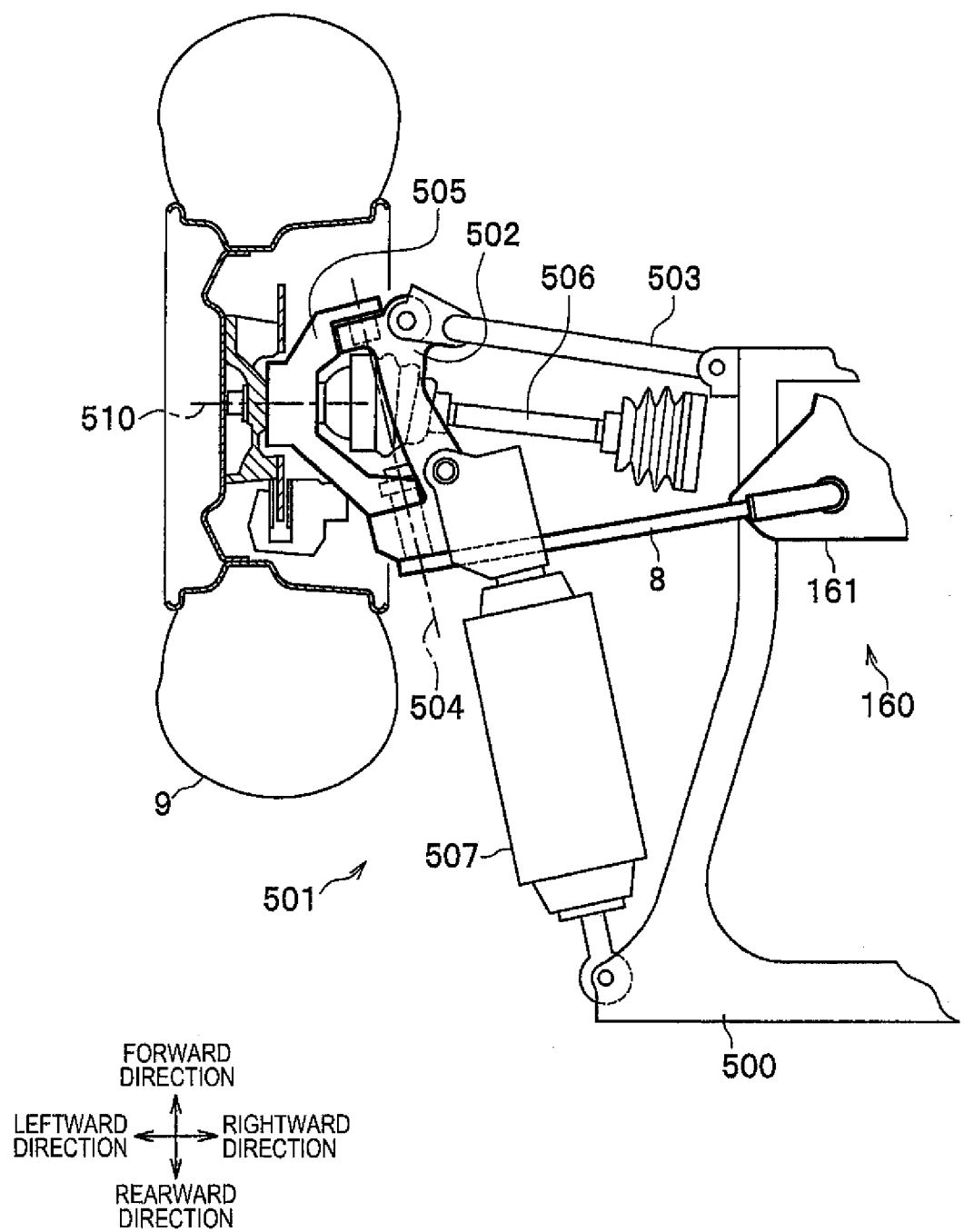
FIG. 4 is a view illustrating the schematic configuration between a steering arm of the arm stopper mechanism according to the first embodiment and front wheels, when seen from above.

Subsequently, the schematic configuration between the steering arm 161 and the wheels (the front wheels) 9 will be described with reference to FIG. 4. FIG. 4 is a view illustrating the schematic configuration between the steering arm 161 of the arm stopper mechanism 160 according to the first embodiment and the wheels (the front wheels) 9, when seen from above.

As illustrated in FIG. 4, the wheels (the front wheels) 9 are suspended from a vehicle body frame 500 via a front wheel suspension apparatus 501. The front wheel suspension apparatus 501 includes a front cushion 507, an upper end of which is connected to the vehicle body frame 500 and extends downward; a knuckle support member 502 that extends downward from a lower portion of the front cushion 507; a lower arm 503 through which a lower portion of the knuckle support member 502 extending in the lateral direction of the vehicle is connected to the vehicle body frame 500; a knuckle 505 that is attached to the knuckle support member 502 so as to be rotatable about a kingpin axis line 504, and supports the wheels (the front wheels) 9; and the tie rod 8 by which the knuckle 505 extending in the lateral direction of the vehicle is caused to rotate about the kingpin axis line 504. The knuckle 505 is provided with a hole through which a drive shaft 506 passes. The drive shaft 506 drives the wheels (the front wheels) 9 to rotate about a vehicle axis 510.

Subsequently, a relationship in operation between the steering arm 161 and the wheels (the front wheels) 9 will be described with reference to FIG. 5. FIGS. 5A and 5B are description views schematically illustrating a relationship in operation between the steering arm 161 of the arm stopper mechanism 160 according to the first embodiment and the wheels (the front wheels) 9, when seen from below.

FIG. 5A illustrates a state in which the handlebars 2 are not turned (that is, a state in which the handlebars 2 are maintained in a neutral state, and the saddle riding type vehicle 100 moves straight ahead). In contrast, FIG. 5B illustrates a state in which the handlebars 2 are turned to the counter-clockwise maximum steering angle (that is, a state in which the saddle riding type vehicle 100 is turned left to the maximum).

As apparent from differences between FIGS. 5A and 5B, when the handlebars 2 are turned to the counter-clockwise maximum steering angle (refer to FIG. 5B), the steering arm 161 turns about the output shaft 22 in the counter-clockwise direction. At this time, the right tie rod 8 pushes the right wheel (the right front wheel) 9 toward the leftward direction, and the left tie rod 8 pulls the left wheel (the left front wheel) 9 toward the leftward direction. As a result, two wheels (front wheels) 9 are oriented toward the leftward direction. At this time, a right striking portion 174 of the steering arm 161 collides with a right contact portion 186 of the stopper 162 (refer to FIGS. 7 and 11).

In contrast, when the handlebars 2 are turned to the clockwise maximum steering angle, the steering arm 161 turns about the output shaft 22 in the clockwise direction. At this time, the right tie rod 8 pushes the right wheel (the right front wheel) 9 toward the rightward direction, and the left tie rod 8 pulls the left wheel (the left front wheel) 9 toward the rightward direction. As a result, the two wheels (front wheels) 9 are oriented toward the rightward direction. At this time, the left striking portion 174 of the steering arm 161 collides with the left contact portion 186 of the stopper 162.

3: Load Vectors Applied to Steering Arm

In the saddle riding type vehicle 100, when the striking portion 174 of the steering arm 161 collides with the contact portion 186 of the stopper 162 (refer to FIG. 5B), an input load may be input to the steering arm 161 from the outside (refer to FIG. 6).

For example, when the saddle riding type vehicle 100 is not equipped with the motor-driven power steering apparatus 101 that is provided with the arm stopper mechanism 160 according to the first embodiment, but is equipped with a motor-driven power steering apparatus 1 (refer to FIGS. 16 and 17) that is provided with an arm stopper mechanism 60 according to the comparative example which will be described later, the arm stopper mechanism 60 according to the comparative example is not configured so as to reduce a value of a bending load vector Wt applied to the output shaft 22 (refer to Section 5: Relationship between Input Load Vector, Striking Load Vector, and Bending Load Vector which will be described later) which will be described later), and thus a relatively large bending load may be applied to the output shaft 22. As a result, at this time, an excessive load may be potentially applied to the bearings 32A and 32B (refer to FIG. 3) that support the output shaft 22; the bearing 31 (refer to FIG. 3) that supports the input shaft 21 which is connected to the output shaft 22 via the torsion bar 27; and the housing 113 (refer to FIG. 3) at the surroundings of the bearings 32A, 32B and 31.

Hereinafter, load vectors applied to the steering arm 161 will be described with reference to FIG. 6. FIG. 6 is a description view illustrating the load vectors applied to the steering arm 161. FIG. 6 illustrates the following state of the saddle riding type vehicle 100.

That is, when the saddle riding type vehicle 100 is traveling on a rough road, the saddle riding type vehicle 100 may move up and down severely. Sometimes, the wheels (the front wheels) 9 may leap up from (separate from) a road surface. For example, as illustrated in FIG. 6, when the driver turns the handlebars 2 to the counter-clockwise maximum steering angle right before or right after the wheels (the front wheels) 9 leap up from a road surface, first, the respective side surfaces of the right and left wheels (the right and left front wheels) 9 land on the road surface. At this time, for example, when a rear side of a side surface of the left wheel (the left front wheel) 9 collides with a hard protrusion 511 such as a stone, the left wheel (the left front wheel) 9 receives a strong reaction force from the protrusion 511. FIG. 6 illustrates a state of the saddle riding type vehicle 100 at this time.

At this time, an input load vector Wh as a strong reaction force is input to a left tie rod hole 172 (refer to FIGS. 7 and 8A) of the steering arm 161 via the left wheel (the left front wheel) 9 and the left tie rod 8.

At this time, since the right striking portion 174 of the steering arm 161 collides with the right contact portion 186 of the stopper 162, a striking load vector Wb is input to the right striking portion 174 from the right contact portion 186 in a perpendicular direction with respect to the right contact portion 186.

In a state in which the striking portion 174 of the steering arm 161 does not collide with the contact portion 186 of the stopper 162, even when the collision of the wheel (the front wheel) 9 with the protrusion 511 causes the striking portion 174 of the steering arm 161 to collide with the contact portion 186 of the stopper 162, load vectors are applied to the steering arm 161 similar to the state illustrated in FIG. 6.

When the driver turns the handlebars 2 to the clockwise maximum steering angle right before or right after the wheels (the front wheels) 9 leap up from a road surface, the input load vector Wh and the striking load vector Wb are input in a state reverse to the state illustrated in FIG. 6. That is, the input load vector Wh is input to a right tie rod hole 172 (refer to FIGS. 7 and 8A) of the steering arm 161. In contrast, the striking load vector Wb is input to the left striking portion 174 from the left contact portion 186.

4-1: Configuration of Arm Stopper Mechanism According to Comparative Example

Figure 16:
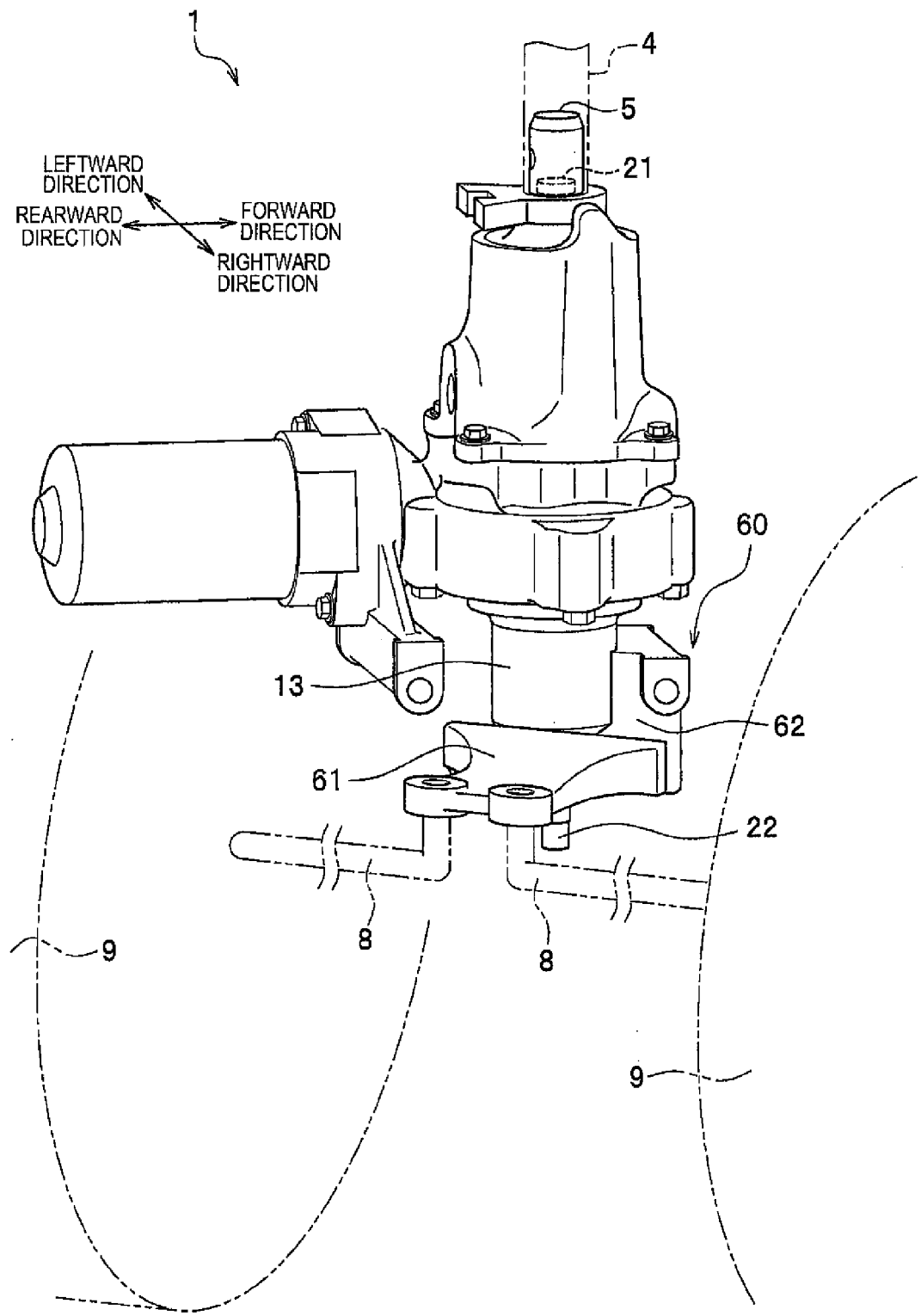
FIG. 16 is a schematic configuration view of a motor-driven power steering apparatus provided with an arm stopper mechanism according to a comparative example, when seen from a side.
Figure 17:
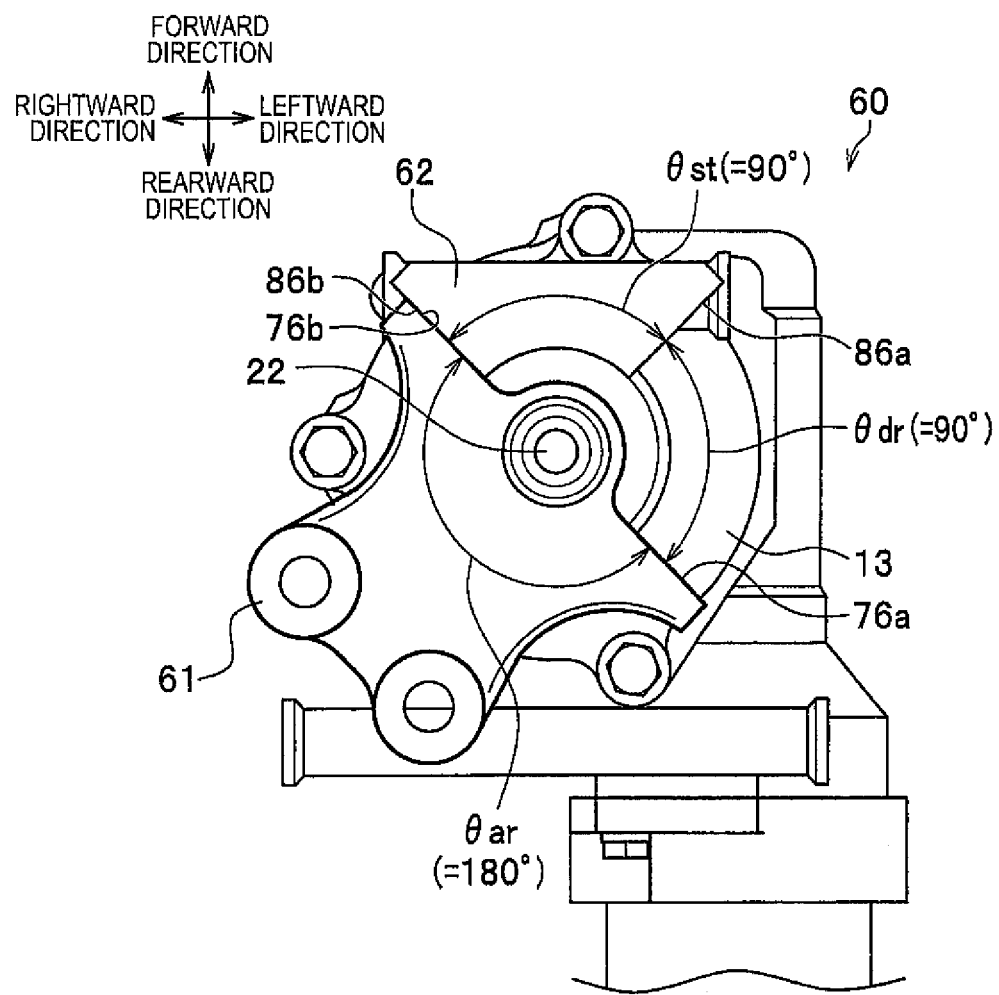
FIG. 17 is a schematic configuration view of the arm stopper mechanism according to the comparative example, when seen from below.

Subsequently, the configuration of the arm stopper mechanism 60 according to the comparative example will described with reference to FIGS. 16 to 19 for easy understanding of the characteristics of the arm stopper mechanism 160 according to the first embodiment. FIG. 16 is a schematic configuration view of the motor-driven power steering apparatus 1 provided with the arm stopper mechanism 60 according to the comparative example, when seen from a side. FIG. 17 is a schematic configuration view of the arm stopper mechanism 60 when seen from below. FIGS. 18A and 18B are schematic configuration views of a steering arm 61 of the arm stopper mechanism 60 when seen from below. FIGS. 19A and 19B are schematic configuration views of a stopper 62 of the arm stopper mechanism 60 when seen from below.

The motor-driven power steering apparatus 1 according to the comparative example illustrated in FIG. 16 is an apparatus similar to the motor-driven power steering apparatus 101 according to the first embodiment. Instead of the arm stopper mechanism 160 according to the first embodiment, the arm stopper mechanism 60 according to the comparative example is provided on a lower surface of a housing 13.

FIG. 17 illustrates the configuration of the arm stopper mechanism 60 when seen from below. As illustrated in FIG. 17, the arm stopper mechanism 60 includes the steering arm 61 that turns about the output shaft 22.

In the arm stopper mechanism 60 of the example illustrated in FIG. 17, an angle $\theta ar$ formed by striking surfaces $76a$ and $76b$ (refer to FIG. 18) of the steering arm 61 is set to be 180°. An angle $\theta st$ (an angle between two contact surfaces $86a$ and $86b$, and an angle formed in the stopper 62) formed by the contact surfaces $86a$ and $86b$ (refer to FIG. 19) of the stopper 62 is set to be 90°. A total angle $\theta dr$ is set to be 90° (that is, the clockwise maximum steering angle is 45° and the counter-clockwise maximum steering angle is 45°). Here, the total angle $\theta dr$ is obtained by summing the clockwise and counter-clockwise maximum steering angles of the steering arm 61.

FIGS. 18A and 18B illustrate a specific configuration of the steering arm 61. FIG. 18A illustrates the configuration of portions of the steering arm 61, and FIG. 18B illustrates the respective disposition positions of the portions of the steering arm 61.

As illustrated in FIG. 16, the entirety of a portion (hereinafter, refer to as a "main body") of the steering arm 61 for the attachment of the tie rods 8 has a plate shape.

As illustrated in FIG. 18, the steering arm 61 is provided with one output shaft hole 71 and two tie rod holes 72a and 72b. The output shaft hole 71 is a circular hole into which the output shaft 22 is fitted. Each of the tie rod holes 72a and 72b is a circular hole for the attachment of the tie rod 8. Hereinafter, the tie rod holes 72a and 72b are generically referred to as a "tie rod hole 72".

The output shaft 22 is fitted into the output shaft hole 71, and thus the center point of the output shaft hole 71 coincides with a center point O22 of the output shaft 22. Hereinafter, the center point of the output shaft hole 71 may refer to the "center point O22".

The tie rod holes 72a and 72b are respectively disposed at the same distances leftward and rightward from a center line L61 of the steering arm 61. In the example illustrated in FIG. 18, a center point O72 of each of the tie rod holes 72a and 72b is disposed at a distance T72 rearward from the center point O22 of the output shaft hole 71, and at a distance H72 from the center line L61 of the steering arm 61.

Here, the "center line L61 of the steering arm 61" is an imaginary straight line that passes through the center point O22 of the output shaft hole 71 and extends in a longitudinal direction of the vehicle. When the steering angle of the handlebars 2 is 0°, the "center line L61 of the steering arm 61" coincides with a "center line L62 (refer to FIG. 19) of the stopper 62" which will be described later. The "center line L62 of the stopper 62" is an imaginary straight line (hereinafter, referred to as a "center line of the entirety of the vehicle") that passes through a center point of the vehicle in the lateral direction and extends in the longitudinal direction of the vehicle.

The steering arm 61 includes portions (hereinafter, referred to as "striking portions") 74a and 74b that strike against the stopper 62. The striking portions 74a and 74b are provided in the respective vicinities of opposite lateral sides of the output shaft hole 71 in the plate-shaped main body (the portion for the attachment of the tie rods 8) of the steering arm 61. The respective end surfaces of the striking portions 74a and 74b are respectively formed by flat surfaces (hereinafter, referred to as "striking surfaces") 76a and 76b that strike against the stopper 62. Hereinafter, the striking portions 74a and 74b are generically referred to as a "striking portion 74". The striking surfaces 76a and 76b are generically referred to as a "striking surface 76".

Each of the striking surfaces 76a and 76b is set to have a disposition angle θ76 of 90° with respect to the center line L61 of the steering arm 61. Accordingly, the angle θar (an angle between two striking surfaces 76a and 76b, and an angle formed in the steering arm 61) formed by the striking surfaces 76a and 76b is set to be 180°. Here, the "disposition angle of the striking surface" indicates an angle formed by the center line and the striking surface.

In FIG. 18, a line L76a is a straight line that is imaginarily disposed along the striking surface 76a. A line L76b is a straight line that is imaginarily disposed along the striking surface 76b. The lines L76a and L76b intersect the center point O22 of the output shaft hole 71. A length H76 is a distance from the center point O22 of the output shaft hole 71 to an end portion of the striking surface 76 of the steering arm 61.

The steering arm 61 includes a circular arc portion 78 by which the output shaft hole 71 is surrounded in a circular arc shape. The circular arc portion 78 is formed to be continuous with the striking portions 74a and 74b. In FIG. 18, a length H78 is a distance from the center point O22 of the output shaft hole 71 to an end portion of the circular arc portion 78 of the steering arm 61.

FIGS. 19A and 19B illustrate a specific configuration of the stopper 62. FIG. 19A illustrates the configuration of portions of the stopper 62, and FIG. 19B illustrates the respective disposition positions of the portions of the stopper 62.

As illustrated in FIG. 16, the stopper 62 is provided to protrude downward from the lower surface of the housing 13 of the motor-driven power steering apparatus 1. As illustrated in FIGS. 19A and 19B, when seen from below, the stopper 62 has a shape in which a flabellate cut-away portion 81 (refer to FIG. 19A) with a radius of H81 is formed in an apex portion of an isosceles triangle in such a manner that the stopper 62 is laterally symmetrical about the center line L62 of the stopper 62, the apex of the isosceles triangle being the center point O22 of the output shaft 22, and the bottom and the oblique side of the isosceles triangle having a width H62 and a width (H81+H86), respectively.

Here, the "center line L62 of the stopper 62" is an imaginary straight line that passes through the center point O22 of the output shaft 22 and extends in the longitudinal direction. The "center line L62 of the stopper 62" is a center line of the entirety of the vehicle.

The stopper 62 includes two flat surfaces 86a and 86b that are respectively positioned in oblique line portions of the isosceles triangle. The flat surfaces 86a and 86b function as contact surfaces that are brought into contact with the striking surfaces 76a and 76b of the steering arm 61, respectively. Hereinafter, the flat surface 86a is referred to as the "contact surface 86a", and the flat surface 86b is referred to as the "contact surface 86b". The contact surfaces 86a and 86b are generically referred to as a "contact surface 86".

Each of the contact surfaces 86a and 86b is set to have a disposition angle θ86 of 45° with respect to the center line L62 of the stopper 62. Accordingly, the angle θst formed by the contact surfaces 86a and 86b is set to be 90°. Here, the "disposition angle of the contact surface" indicates an angle formed by the center line and the contact surface.

In FIG. 19, the line L86a is a straight line that is imaginarily disposed along the contact surface 86a. The line L86b is a straight line that is imaginarily disposed along the contact surface 86b. The lines L86a and L86b intersect the center point O22 of the output shaft 22.

Figure 20:
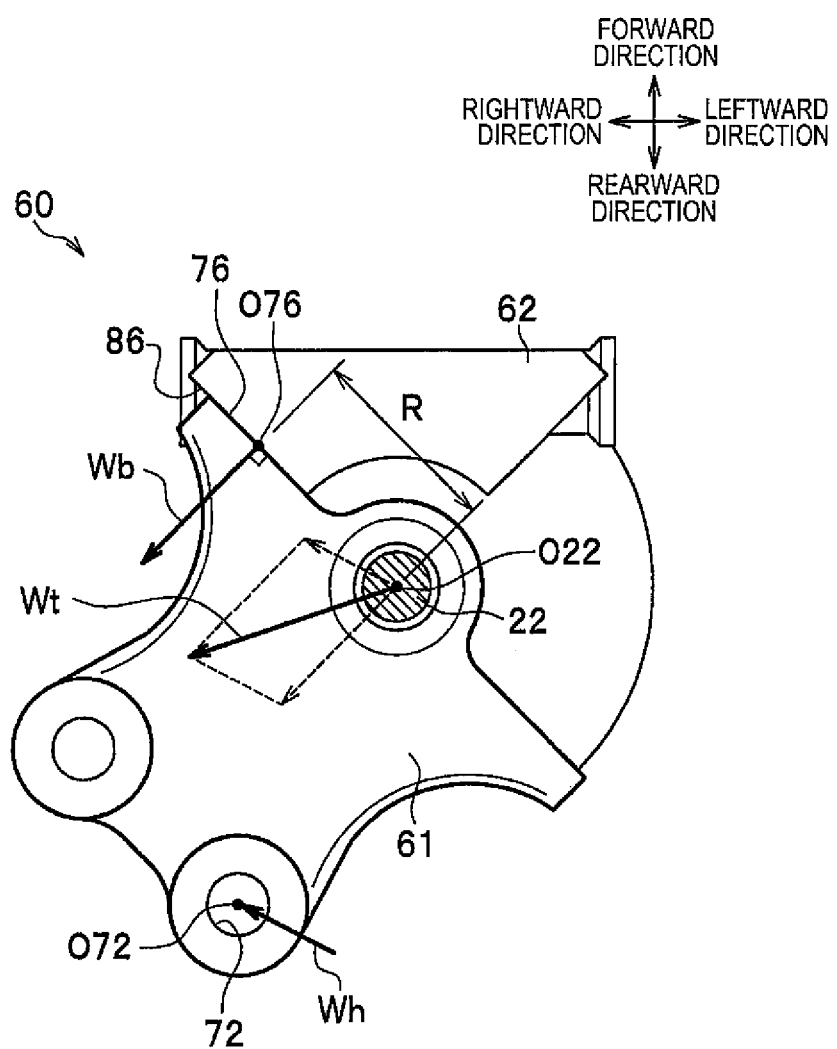
FIG. 20 is a description view illustrating the load vectors applied to the main portions of the arm stopper mechanism according to the comparative example.

4-2: Load Vectors Applied to Main Portions of Arm Stopper Mechanism According to Comparative Example Subsequently, load vectors applied to main portions of the arm stopper mechanism 60 according to the comparative example will be described with reference to FIG. 20. FIG. 20 is a description view illustrating the load vectors applied to the main portions of the arm stopper mechanism 60.

Here, the "input load vector Wh" refers to a load vector which is input to the steering arm 61 from the wheels 9 (refer to FIG. 16) via the tie rod holes 72, the "striking load vector Wb" refers to a load vector that is applied to the striking surface 76 of the steering arm 61 from the contact surface 86 of the stopper 62, and the "bending load vector Wt" refers to a load vector that is applied to the output shaft 22 fitted into the output shaft hole 71 (refer to FIG. 18A).

Here, a "striking center position O76" refers to a center position of a contact portion between the striking surface 76 of the steering arm 61 and the contact surface 86 of the stopper 62, and the striking load vector Wb is applied to the striking center position O76. In the example illustrated in FIG. 20, the striking center position O76 is set to be positioned at a distance R from the center point O22 of the output shaft 22.

In a case described here, as illustrated in FIG. 20, the handlebars 2 are turned to the counter-clockwise maximum steering angle in order for the saddle riding type vehicle 100 to turn left to the maximum while the saddle riding type vehicle 100 is traveling, and thus the right striking surface 76 of the steering arm 61 strikes against the right contact surface 86 of the stopper 62, and the rear side of the side surface of the left wheel (the left front wheel) 9 collides with the protrusion 511 (refer to FIG. 6). At this time, as illustrated in FIG. 20, as per the principle described in Section 3: Load Vectors Applied to Steering Arm, in the arm stopper mechanism 60, the input load vector Wh is applied to the surroundings of the left tie rod hole 72, and the striking load vector Wb is applied to the striking center position O76. The bending load vector Wt is applied to the output shaft 22, and is a combined vector of the input load vector Wh and the striking load vector Wb.

When a value of the bending load vector Wt increases, an excessive load may be potentially applied to the bearings 32A and 32B (refer to FIG. 3) that support the output shaft 22; the bearing 31 (refer to FIG. 3) that supports the input shaft 21 which is connected to the output shaft 22 via the torsion bar 27; and the housing 13 (refer to FIG. 16) at the surroundings of the bearings 32A, 32B, and 31. The output shaft 22 is connected to the handlebars 2 via the torsion bar 27, the input shaft 21, and the steering shaft 4. For this reason, when a value of the bending load vector Wt increases, a bending load as a strong reaction force propagates to the handlebars 2, and thus it is difficult to control the turning of the handlebars 2.

In this configuration, a value of the bending load vector Wt is a value of a combined vector of the input load vector Wh and the striking load vector Wb. When the striking surface 76 of the steering arm 61 is in contact with the contact surface 86 of the stopper 62, a direction of the input load vector Wh is determined by an attachment direction of the tie rods 8 (refer to FIG. 16) respectively attached to the tie rod holes 72. A direction of the striking load vector Wb is perpendicular to the striking surface 76 of the steering arm 61.

5: Relationship Between Input Load Vector, Striking Load Vector, and Bending Load Vector Subsequently, a relationship between the input load vector Wh, the striking load vector Wb, and the bending load vector Wt will be described with reference to FIGS. 20 and 21A, 21B, 21C, and 21D. FIGS. 21A, 21B, 21C, and 21D are schematic views illustrating the relationship between the input load vector Wh, the striking load vector Wb, and the bending load vector Wt. In a case described here, as illustrated in FIG. 20, the right striking surface 76 of the steering arm 61 strikes against the right contact surface 86 of the stopper 62.

Figure 21A:
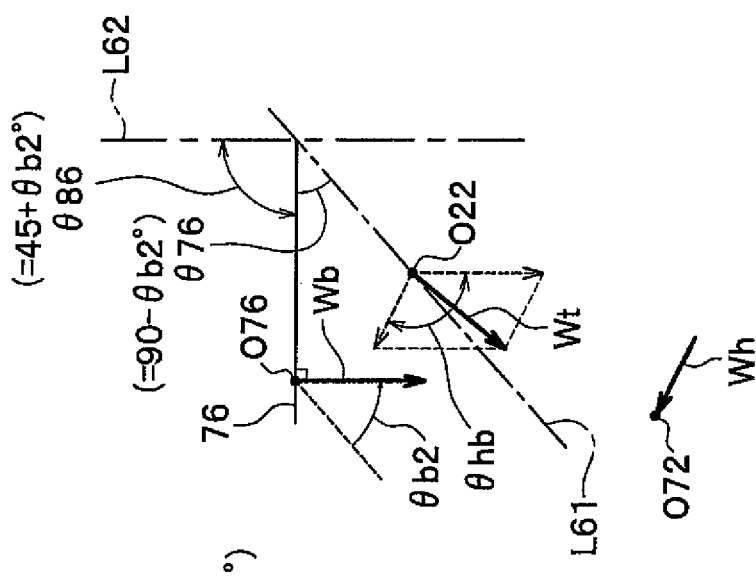
FIGS. 21A, 21B and 21C are schematic views illustrating a relationship between an input load vector, a striking load vector, and a bending load vector.
Figure 21B:
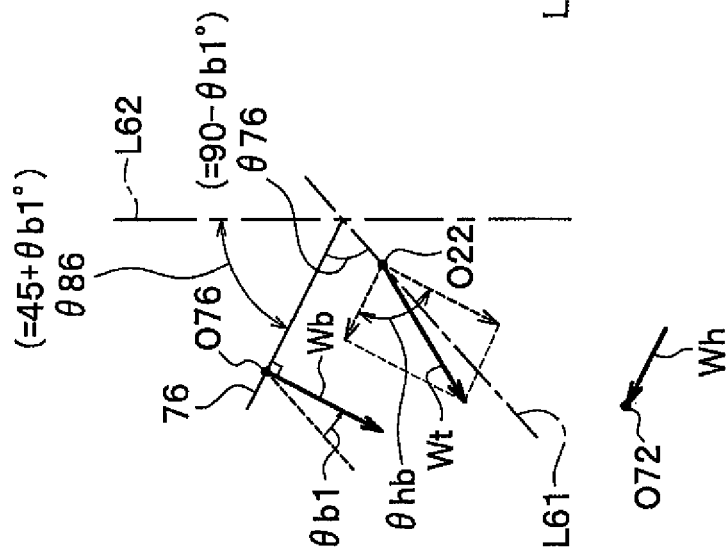
Figure 21C:
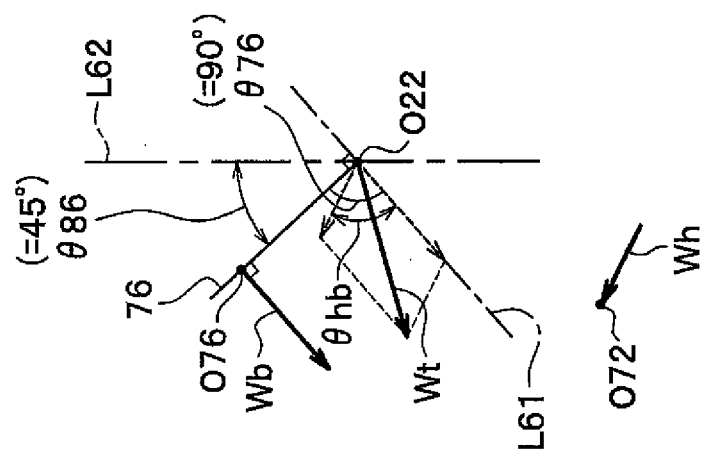

FIGS. 21A, 21B, and 21C illustrate how a value of the bending load vector Wt changes when changing the respective disposition directions of the striking surface 76 of the steering arm 61 and the contact surface 86 of the stopper 62 in a state where the right striking surface 76 of the steering arm 61 strikes against the right contact surface 86 of the stopper 62 as illustrated in FIG. 20. In FIGS. 21A to 21C, a positional relationship between the center point O72 of the tie rod hole 72, the striking center position O76, and the center point O22 of the output shaft 22 is as illustrated in FIG. 20.

FIG. 21A illustrates a state of the load vectors when the respective disposition directions of the striking surface 76 of the steering arm 61 and the contact surface 86 of the stopper 62 are not changed. That is, FIG. 21A illustrates an example in which the angle θ76 formed by the center line L61 and the striking surface 76 of the steering arm 61 is set to be 90°. In other words, FIG. 21A illustrates an example in which the angle θ86 formed by the center line L62 and the contact surface 86 of the stopper 62 is set to be 45°.

FIG. 21B illustrates a state of the load vectors when tilting a disposition direction of the striking surface 76 of the steering arm 61 toward the center line L61 from the state illustrated in FIG. 21A by an angle θb1 in such a manner that the direction of the input load vector Wh is orthogonal to the direction of the striking load vector Wb. That is, FIG. 21B illustrates an example in which the angle θ76 formed by the center line L61 and the striking surface 76 of the steering arm 61 is set to be (90−θb1)° smaller than 90°. In other words, FIG. 21B illustrates an example in which the angle θ86 formed by the center line L62 and the contact surface 86 of the stopper 62 is set to be (45+θb1)° greater than 45°.

FIG. 21C illustrates a state of the load vectors when tilting a disposition direction of the striking surface 76 of the steering arm 61 toward the center line L61 from the state illustrated in FIG. 21A by an angle θb2 (here, the angle θb2>the angle θb1). That is, FIG. 21C illustrates an example in which the angle θ76 formed by the center line L61 and the striking surface 76 of the steering arm 61 is set to be (90−θb2)° much smaller than the angle (90−θb1)° illustrated in FIG. 21B. In other words, FIG. 21C illustrates an example in which the angle θ86 formed by the center line L62 and the contact surface 86 of the stopper 62 is set to be (45+θb2)° much greater than (45+θb1)°.

A described above, a value of the bending load vector Wt is a value of the combined vector of the input load vector Wh and the striking load vector Wb. For this reason, a value of the bending load vector Wt tends to increase as an angle θhb formed by the respective directions of the input load vector Wh and the striking load vector Wb decreases. In contrast, a value of the bending load vector Wt tends to decrease as the angle θhb formed by the respective directions of the input load vector Wh and the striking load vector Wb increases.

In the example illustrated in FIG. 21A, the angle θhb formed by the respective directions of the input load vector Wh and the striking load vector Wb is an acute angle (an angle greater than or equal to 0° and less than 90°). In the example illustrated in FIG. 21B, the angle θhb formed by the respective directions of the input load vector Wh and the striking load vector Wb is a right angle (90°). In the example illustrated in FIG. 21C, the angle θhb formed by the respective directions of the input load vector Wh and the striking load vector Wb is an obtuse angle (90° to 180°).

For this reason, in the example illustrated in FIG. 21A, the bending load vector Wt becomes a value greater than a value (a value of the bending load vector Wt in a state illustrated in FIG. 21B) of a combined vector when the input load vector Wh is orthogonal to the striking load vector Wb. In contrast, in the example illustrated in FIG. 21C, the bending load vector Wt becomes a value smaller than a value (a value of the bending load vector Wt in a state illustrated in FIG. 21B) of the combined vector when the input load vector Wh is orthogonal to the striking load vector Wb.

Accordingly, as illustrated in FIG. 21C, when the angle θhb formed by the respective directions of the input load vector Wh and the striking load vector Wb is set to increase, and the direction of the input load vector Wh and the striking load vector Wb are applied to cancel out each other, the arm stopper mechanism 60 can reduce a value of the bending load vector Wt applied to the output shaft 22.

Here, as described above, FIG. 21A illustrates the example in which the angle θ76 formed by the center line L61 and the striking surface 76 of the steering arm 61 is set to be 90°, that is, the example in which the angle θ86 formed by the center line L62 and the contact surface 86 of the stopper 62 is set to be 45°.

FIG. 21B illustrates an example in which the angle θ76 formed by the center line L61 and the striking surface 76 of the steering arm 61 is set to be (90−θb1)° smaller than 90°, that is, the example in which the angle θ86 formed by the center line L62 and the contact surface 86 of the stopper 62 is set to be (45+θb1)° greater than 45°.

FIG. 21C illustrates the example in which the angle θ76 formed by the center line L61 and the striking surface 76 of the steering arm 61 is set to be (90−θb2)° much smaller than the angle (90−θb1)°, that is, the example in which the angle θ86 formed by the center line L62 and the contact surface 86 of the stopper 62 is set to be (45+θb2)° much greater than the angle (45+θb1)°.

Accordingly, as can be understood from the respective relationships illustrated in FIGS. 21A to 21C, as the angle θ76 formed by the center line L61 and the striking surface 76 decreases, or the angle θ86 formed by the center line L62 and the contact surface 86 of the stopper 62 increases, the angle θhb formed by the respective directions of the input load vector Wh and the striking load vector Wb increases.

For this reason, in the arm stopper mechanism 60, it is possible to increase the angle θhb formed by the respective directions of the input load vector Wh and the striking load vector Wb by decreasing the angle θ76 formed by the center line L61 and the striking surface 76 of the steering arm 61 (by increasing the angle θ86 formed by the center line L62 and the contact surface 86 of the stopper 62). Accordingly, in the arm stopper mechanism 60, the direction of the input load vector Wh and the striking load vector Wb can be applied to cancel out each other, and thus can reduce a value of the bending load vector Wt applied to the output shaft 22.

The arm stopper mechanism 60 according to the comparative example is not configured in such a manner that the direction of the input load vector Wh and the striking load vector Wb are applied to cancel out each other, thereby reducing a value of the bending load vector Wt applied to the output shaft 22. For this reason, in the arm stopper mechanism 60, a relatively large bending load may be applied to the output shaft 22. At this time, an excessive load may be potentially applied to the bearings 32A and 32B (refer to FIG. 3) that support the output shaft 22; the bearing 31 (refer to FIG. 3) that supports the input shaft 21 which is connected to the output shaft 22 via the torsion bar 27; and the housing 13 (refer to FIG. 16) at the surroundings of the bearings 32A, 32B, and 31. At this time, a bending load as a strong reaction force propagates to the handlebars 2, and thus it is difficult to control the turning of the handlebars 2.

6-1: Configuration of Arm Stopper Mechanism According to First Embodiment

In this regard, in order to reduce a value of the bending load vector Wt applied to the output shaft 22, the arm stopper mechanism 160 (refer to FIGS. 2 and 7) according to the first embodiment is configured in such a manner that the angle θhb (refer to FIG. 11) formed by the respective directions of the input load vector Wh and the striking load vector Wb is set to be greater than the angle θhb (refer to FIG. 21A) of the arm stopper mechanism 60 according to the comparative example.

That is, as illustrated in FIG. 8, the arm stopper mechanism 160 according to the first embodiment is configured in such a manner that an angle θ176 formed by a center line L161 and the striking surface 176 of the steering arm 161 is smaller than the angle θ76 (refer to FIG. 21A) of the arm stopper mechanism 60 according to the comparative example, or an angle θ186 formed by a center line 162L and the striking surface 186 of the stopper 162 is greater than the angle θ86 (refer to FIG. 21A) of the arm stopper mechanism 60 according to the comparative example.

Figure 7:
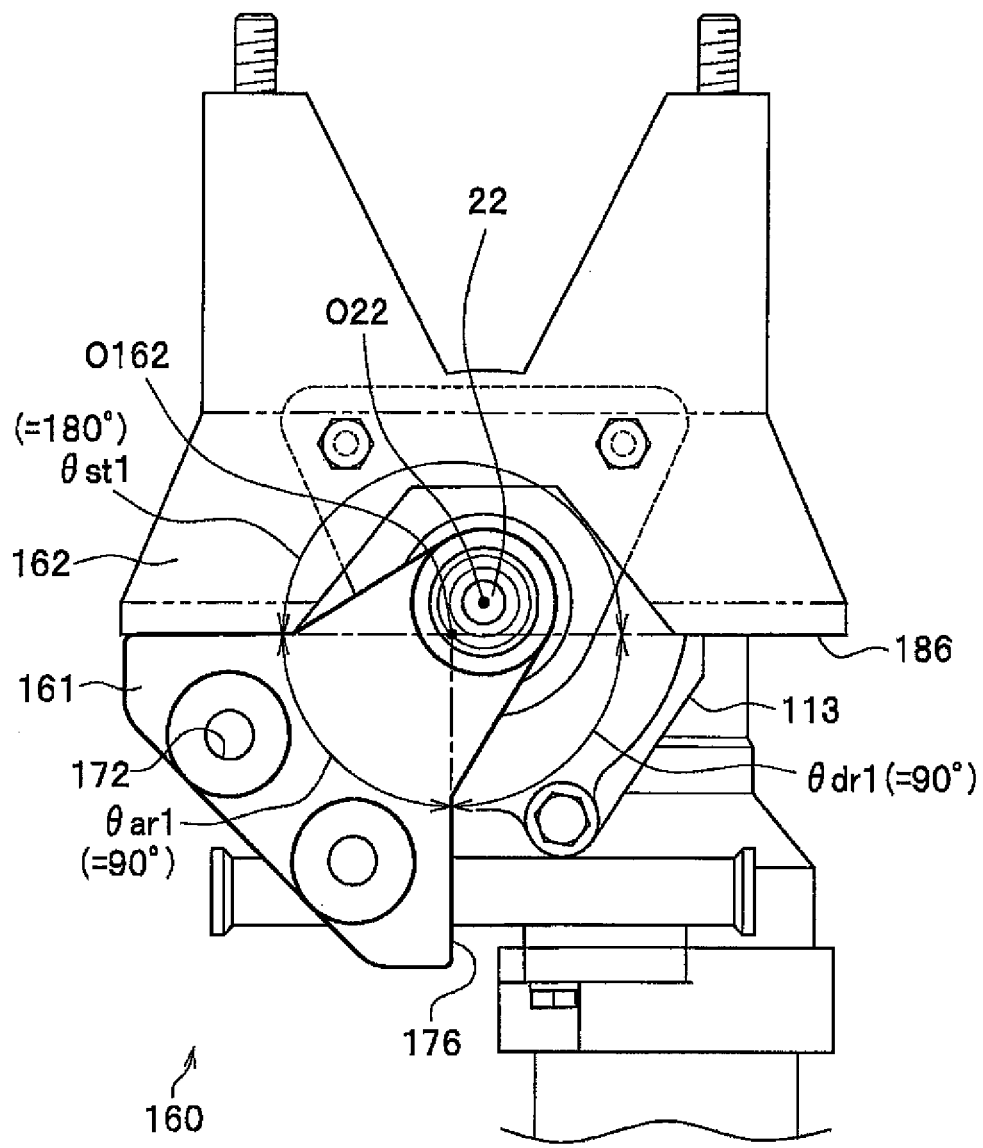
FIG. 7 is a schematic configuration view of the arm stopper mechanism according to the first embodiment when seen from below.
Figure 10A:
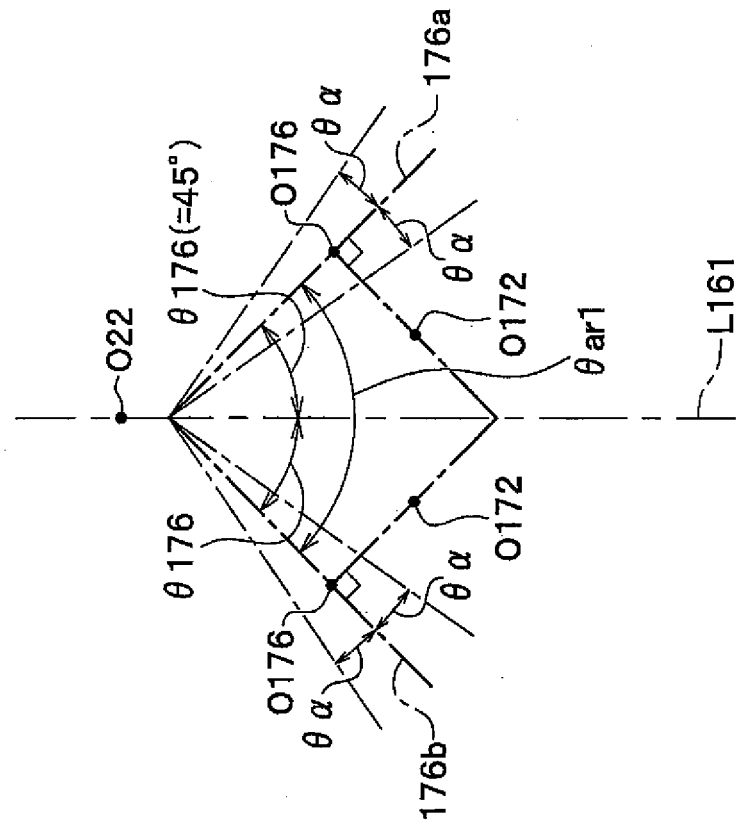
FIGS. 10A and 10B are schematic views illustrating an ideal configuration of portions of the steering arm of the arm stopper mechanism according to the first embodiment.
Figure 10B:
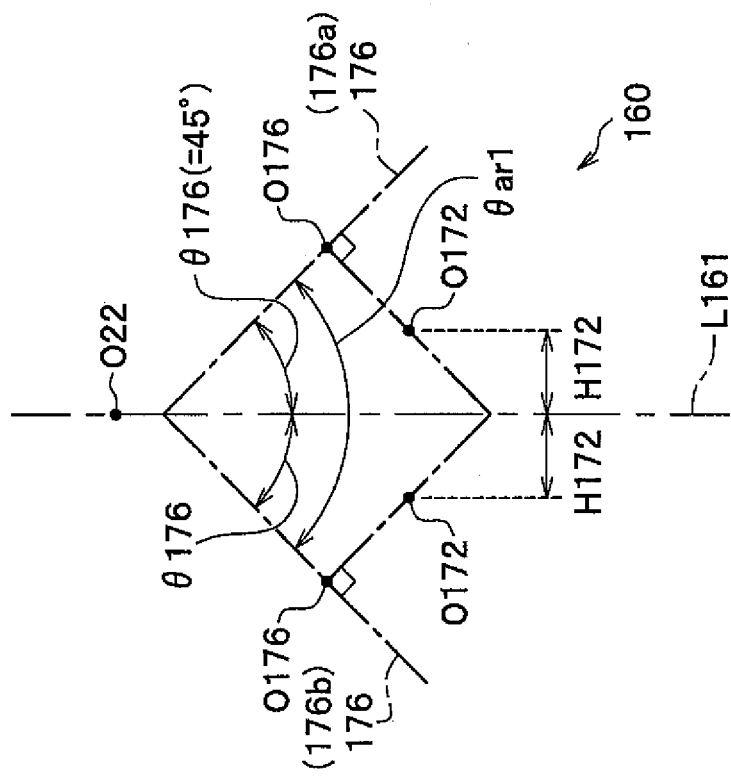

Hereinafter, the configuration of the arm stopper mechanism 160 according to the first embodiment will be described with reference to FIGS. 7 to 10. FIG. 7 is a schematic configuration view of the arm stopper mechanism 160 when seen from below. FIGS. 8A and 8B are schematic configuration views of the steering arm 161 of the arm stopper mechanism 160 when seen from below. FIG. 8A illustrates the configuration of portions of the steering arm 161, and FIG. 8B illustrates the respective disposition positions of the portions of the steering arm 161. FIGS. 9A and 9B are schematic configuration views of the stopper 162 of the arm stopper mechanism 160 when seen from below. FIG. 9A illustrates the configuration of portions of the stopper 162, and FIG. 9B illustrates the respective disposition positions of the portions of the stopper 162. FIGS. 10A and 10B are schematic views illustrating an ideal disposition relationship between members of the arm stopper mechanism 160.

As illustrated in FIG. 7, when compared to the arm stopper mechanism 60 according to the comparative example, the steering arm 161 and the stopper 162 of the arm stopper mechanism 160 have the respective shapes different from those of the arm stopper mechanism 60.

FIG. 7 illustrates the configuration of the arm stopper mechanism 160 when seen from below. As illustrated in FIG. 7, the arm stopper mechanism 160 includes the steering arm 161 that turns about the output shaft 22.

As illustrated in FIG. 2, the entirety of a main body (a portion for the attachment of the tie rods 8) of the steering arm 161 has a plate shape. As illustrated in FIG. 7 and FIGS. 8A and 8B, when seen from below, the steering arm 161 has a shape in which a folding fan is deployed at an acute angle and portions of the folding fan are respectively bent outward from the respective middle portions of opposite wings of the folding fan. As illustrated in FIGS. 8A and 8B, the steering arm 161 has a shape in which an output shaft hole 171 is disposed at a pivot (a center axis) of the folding fan, and two tie rod holes 172a and 172b are respectively disposed at arbitrary positions in the vicinity of a free end (an outer circumferential edge) of the folding fan. Hereinafter, the tie rod holes 172a and 172b are generically referred to as the "tie rod hole 172".

The output shaft 22 is fitted into the output shaft hole 171, and thus a center point of the output shaft hole 171 coincides with the center point O22 of the output shaft 22. Hereinafter, the center point of the output shaft hole 171 refers to the "center point O22".

The tie rod holes 172a and 172b are respectively disposed at the same distances leftward and rightward from a center line L161 of the steering arm 161. In the example illustrated in FIG. 8, a center point O172 of each of the tie rod holes 172a and 172b is disposed at a distance T172 rearward from the center point O22 of the output shaft hole 171, and at a distance H172 rightward and leftward from the center line L161 of the steering arm 161.

Here, the "center line L161 of the steering arm 161" is an imaginary straight line that passes through the center point O22 of the output shaft hole 171 and extends in the longitudinal direction. When the steering angle of the handlebars 2 is 0°, the "center line L161 of the steering arm 161" coincides with a "center line L162 (refer to FIG. 9) of the stopper 162" which will be described later. The "center line L162 of the stopper 162" is a center line (an imaginary straight line that passes through the center point of the vehicle in the lateral direction and extends in the longitudinal direction of the vehicle) of the entirety of the vehicle.

The steering arm 161 includes a circular arc portion 178 of a radius H178 by which the output shaft hole 171 is surrounded in a circular arc shape. The steering arm 161 includes portions (outwardly projecting portions) 174a and 174b that are bent outward from the respective middle portions of the opposite wings of the folding fan, and the portions 174a and 174b function as striking portions that strike against the stopper 162. Hereinafter, the portion 174a is referred to as a "striking portion 174a", and the portion 174b is referred to as a "striking portion 174b". The striking portions 174a and 174b are generically referred to as a "striking portion 174".

A flat surface 176a of the striking portion 174a and a flat surface 176b of the striking portion 174b are respectively formed by opposite side portions of the plate-shaped main body (the portion for the attachment of the tie rods 8) of the steering arm 161, and the flat surfaces 176a and 176b function as striking surfaces that strike against the stopper 162. Hereinafter, the flat surface 176a is referred to as the "striking surface 176a", and the flat surface 176b is referred to as the "striking surface 176b. The striking surfaces 176a and 176b are generically referred to as the "striking surface 176".

In FIG. 8A and 8B, a line L176a is a straight line that is imaginarily disposed along the striking surface 176a. A line L176b is a straight line that is imaginarily disposed along the striking surface 176b. A length H176 is a distance to an end portion of the striking surface 176 from a point O162 at which the lines L176a and 176b of the steering arm 161 intersect each other.

In contrast, as illustrated in FIG. 2, the stopper 162 is provided to protrude downward from the lower surface of the housing 113 of the motor-driven power steering apparatus 101. As illustrated in FIGS. 9A and 9B, when seen from below, the stopper 162 has a shape in which a lower base of a trapezoidal portion 162a with a substantially trapezoidal shape is joined to a long side of a rectangular portion 162b with a substantially rectangular shape.

The trapezoidal portion 162a and the rectangular portion 162b are disposed so as to perpendicularly intersect the center line L162 of the stopper 162. Here, the "center line L162 of the stopper 162" is an imaginary straight line that passes through the center point O22 of the output shaft 22 and extends in the longitudinal direction. The "center line L162 of the stopper 162" is the center line of the entirety of the vehicle.

The trapezoidal portion 162a and the rectangular portion 162b are disposed in such a manner that the center point O22 of the output shaft 22 coincides with a center point of the lower base of the trapezoidal portion 162a and a center point of the long side of the rectangular portion 162b. A cut-away portion 181 of the stopper 162 has the center point O22 of the output shaft 22 as its center, and surrounds the output shaft 22.

The stopper 162 from the lower surface of the housing 113 protrudes further from a front end of the trapezoidal portion 162a toward a rear end of the rectangular portion 162b. Only the contact surface 186 to be described later of the stopper 162 is brought into contact with the steering arm 161, and is provided at the rear end of the rectangular portion 162b.

In the example illustrated in FIG. 9, the trapezoidal portion 162a has an upper base of a width H162a, the lower base of a width H162b, and a height T162a. The rectangular portion 162b has the long side of the width H162b, and a short side of a width T162b.

The width T162b of the short side of the rectangular portion 162b is the same value as a separation distance T176 (refer to FIG. 8B) set in the steering arm 161. The separation distance T176 is a distance between the striking surface 176 and a parallel plane that passes through the center point O22 of the output shaft hole 171 of the steering arm 161 and is parallel with the striking surface 176. Flat surfaces 186a and 186b are positioned on a long side of the rectangular portion 162b which is not joined to the trapezoidal portion 162a, and function as the contact surfaces that are brought into contact with the striking surface 176 (refer to FIG. 8A) of the steering arm 161. Hereinafter, the flat surface 186a is referred to as a "contact surface 186a", and the flat surface 186b is referred to as a "contact surface 186b". The contact surfaces 186a and 186b are generically referred to as a "contact surface 186".

Each of the contact surfaces 186a and 186b is set to have a disposition angle θ186 of 90° with respect to the center line L162 of the stopper 162. Accordingly, an angle (an angle between two contact surfaces 186a and 186b, and an angle formed in the stopper 162) θst1 formed by the contact surfaces 186a and 186b is set to be 180°.

In FIGS. 9A and 9B, a line L186a is a straight line that is imaginarily disposed along the contact surface 186a. A line L186b is a straight line that is imaginarily disposed along the contact surface 186b. A point O186 is a point at which the lines L186a and 186b of the stopper 162 intersect each other. In the example illustrated in FIGS. 9A and 9B, since the angle θst1 is set to be 180°, the lines L186a and L186b overlap each other.

In the arm stopper mechanism 160, the portions of the steering arm 161 may be configured as illustrated in FIGS. 10A and 10B. FIGS. 10A and 10B are schematic views illustrating an ideal configuration of the members of the arm stopper mechanism 160. FIG. 10A illustrates the respective disposition positions of the portions of the steering arm 161, and FIG. 10B illustrates an angle of a disposition direction of each of the striking surfaces 176a and 176b of the steering arm 161.

Here, the disposition position of the striking surface 176 (refer to FIG. 8A) of the steering arm 161 will be mainly described. The stopper 162 (refer to FIGS. 2 and 7) struck by the striking surface 176 of the steering arm 161 is configured in such a manner that the portions of the stopper 162 correspond to the steering arm 161.

In FIGS. 10A and 10B, the line L161 is a center line of the steering arm 161. The point O22 is the center point of the output shaft hole 171 (refer to FIG. 8A) of the steering arm 161, and is the center point of the output shaft 22. The point O172 is the center point of the tie rod hole 172 (refer to FIG. 8A) of the steering arm 161. A point O176 is a striking center position (that is, a center position of a contact portion between the striking surface 176 of the steering arm 161 and the contact surface 186 (refer to FIG. 9A) of the stopper 162 according to the first embodiment) of the steering arm 161. A length H172 is a distance from the center line L161 of the steering arm 161 to the center point O172 of the tie rod hole 172. The angle θ176 is an angle formed by the center line L161 and the striking surface 176 of the steering arm 161.

As can be understood from the characteristics of the arm stopper mechanism 60 according to the comparative example illustrated in FIGS. 21A to 21C, when the angle θ176 formed by the center line L161 and the striking surface 176 of the steering arm 161 is set to decrease, or the angle θ186 formed by the center line L162 and the contact surface 186 of the stopper 162 is set to increase, the arm stopper mechanism 160 can increase the angle θhb formed by the respective directions of the input load vector Wh and the striking load vector Wb. Accordingly, in the arm stopper mechanism 160, the direction of the input load vector Wh and the striking load vector Wb can be applied to cancel out each other, and thus it is possible to reduce a value of the bending load vector Wt applied to the output shaft 22.

In the steering arm 161 of the arm stopper mechanism 160, the angle θ176 formed by the center line L161 and the striking surface 176 of the steering arm 161 is set to be smaller than the angle θ76 (refer to FIG. 21A) of the steering arm 61 of the arm stopper mechanism 60 according to the comparative example. That is, in the stopper 162 of the arm stopper mechanism 160, the angle θ186 formed by the center line L162 and the contact surface 186 of the stopper 162 is set to be greater than the angle θ86 (refer to FIG. 21A) of the stopper 62 of the arm stopper mechanism 60 according to the comparative example.

The arm stopper mechanism 160 is required to restrict the handlebars 2 such that the handlebars 2 are not turned to the maximum steering angle or greater in order for the vehicle not to roll over in the lateral direction. For this reason, for example, in the steering arm 161 of the arm stopper mechanism 160, when the angle θ176 is set to be 45° as an ideal optimum disposition angle, an allowable design angle (hereinafter, referred to as an "allowable tilt angle") with respect to the angle θ176 is set to be an angle θα (for example, 10°) so as to define the maximum steering angle of the handlebars 2.

In the arm stopper mechanism 160, in order to satisfy these conditions, the striking surfaces 176a and 176b of the steering arm 161 are disposed to tilt at an angle (45±θα)° in opposite directions with respect to the center line L161, having the arbitrary point O162 on the center line L161 of the steering arm 161 as its center. That is, an angle (an angle between two striking surfaces 176a and 176b, and an angle formed in the steering arm 161) θar1 formed by the striking surfaces 176a and 176b of the steering arm 161 is set to be an angle (90±2×θα)°.

For example, FIG. 7 illustrates the configuration of the arm stopper mechanism 160 when the allowable tilt angle θα is set to be 0°. In the example illustrated in FIG. 7, the angle θar1 formed by the striking surfaces 176a and 176b (refer to FIGS. 8A and 8B) of the steering arm 161 is set to be 90°. The angle θst1 formed by the contact surfaces 186a and 186b (refer to FIGS. 9A and 9B) of the stopper 162 is set to be 180°. A total angle θdr1 is set to be 90° (that is, the clockwise maximum steering angle is 45° and the counter-clockwise maximum steering angle is 45°). Here, the total angle θdr1 is obtained by summing the clockwise and counter-clockwise maximum steering angles of the steering arm 161.

6-2: Load Vectors Applied to Main Portions of Arm Stopper Mechanism According to First Embodiment Subsequently, load vectors applied to main portions of the arm stopper mechanism 160 according to the first embodiment will be described with reference to FIG. 11. FIG. 11 is a description view illustrating the load vectors applied to the main portions of the arm stopper mechanism 160.

Here, the "input load vector Wh" refers to a load vector which is input to the steering arm 161 from the wheels 9 (refer to FIG. 2) via the tie rod hole 172, the "striking load vector Wb" refers to a load vector that is applied to the striking surface 176 of the steering arm 161 from the contact surface 186 of the stopper 162, and the "bending load vector Wt" refers to a load vector that is applied to the output shaft 22 fitted into the output shaft hole 171 (refer to FIG. 8A).

Here, the "striking center position O176" refers to the center position of the contact portion between the striking surface 176 of the steering arm 161 and the contact surface 186 of the stopper 162, and the striking load vector Wb is applied to the striking center position O176. In the example illustrated in FIG. 11, the striking center position O176 is set to be positioned at a distance R1 rightward from the center point O22 of the output shaft 22 and at a distance T162b (that is, the distance T176 (refer to FIG. 8B)) rearward from the center point O22.

In a case described here, as illustrated in FIG. 11, the handlebars 2 are turned to the counter-clockwise maximum steering angle in order for the saddle riding type vehicle 100 to turn left to the maximum while the saddle riding type vehicle 100 is traveling, and thus the right striking surface 176 of the steering arm 161 strikes against the right contact surface 186 of the stopper 162, and the rear side of the side surface of the left wheel (the left front wheel) 9 collides with the protrusion 511 (refer to FIG. 6). At this time, as illustrated in FIG. 11, as per the principle described in Section 3: Load Vectors Applied to Steering Arm, in the arm stopper mechanism 160, the input load vector Wh is applied to the surroundings of the left tie rod hole 172, and the striking load vector Wb is applied to the striking center position O176. The bending load vector Wt is applied to the output shaft 22, and is a combined vector of the input load vector Wh and the striking load vector Wb.

In this configuration, a value of the bending load vector Wt is a value of a combined vector of the input load vector Wh and the striking load vector Wb. When the striking surface 176 of the steering arm 161 is in contact with the contact surface 186 of the stopper 162, a direction of the input load vector Wh is determined by the attachment direction of the tie rod 8 (refer to FIG. 2) attached to the tie rod hole 172. A direction of the striking load vector Wb is perpendicular to the striking surface 176 of the steering arm 161.

In the arm stopper mechanism 160, since the steering arm 161 and the stopper 162 are configured as described above, the input load vector Wh and the striking load vector Wb are applied to cancel out each other. For this reason, the arm stopper mechanism 160 can reduce a value of the bending load vector Wt applied to the output shaft 22 further than the arm stopper mechanism 60 according to the comparative example. For this reason, the arm stopper mechanism 160 can prevent a bending load from being applied to the output shaft 22.

In particular, in the arm stopper mechanism 160, a value of the bending load vector Wt applied to the output shaft 22 may be set to be smaller than or equal to a value of a combined vector when the input load vector Wh is temporarily orthogonal to the striking load vector Wb. Accordingly, the arm stopper mechanism 160 can considerably reduce a value of the bending load vector Wt applied to the output shaft 22, and thus can efficiently prevent a bending load from being applied to the output shaft 22.

In the arm stopper mechanism 160, when the angle θst1 formed by two contact surfaces 186 of the stopper 162 is set to be greater than the angle θar1 formed by two striking surfaces 176 of the steering arm 161, and greater than or equal to 90°, the direction of the input load vector Wh and the striking load vector Wb can be applied to cancel out each other. As a result, the arm stopper mechanism 160 can reduce a value of the bending load vector Wt applied to the output shaft 22, and thus can prevent a bending load from being applied to the output shaft 22. Accordingly, the arm stopper mechanism 160 can reduce a load applied to the bearings 32A and 32B that support the output shaft 22; the bearing 31 (refer to FIG. 3) that supports the input shaft 21 which is connected to the output shaft 22 via the torsion bar 27; and the housing 113 (refer to FIG. 3) at the surroundings of the bearings 32A, 32B, and 31. Since a bending load is prevented from being applied to the output shaft 22, the bending load as a strong reaction force does not propagate to the handlebars 2, and thus it is possible to improve the controllability of the handlebars 2.

However, since the angle θst1 formed by the two contact surfaces 186 of the stopper 162 is set be greater than the angle θar1 formed by the two striking surfaces 176 of the steering arm 161, and greater than or equal to 90°, and thus it is possible to decrease the angle θar1 of the steering arm 161, and it is possible to reduce the size of the steering arm 161 in the arm stopper mechanism 160.

Hereinafter, this point will be described.

In the arm stopper mechanism 160, the steering arm 161 turns about the output shaft 22 in a region in which the stopper 162 is not present. Accordingly, in the arm stopper mechanism 161, a circumferential angle of 360° about the output shaft 22 is divided into the angle θst1 formed by the two contact surfaces 186 of the stopper 162; the angle θar1 formed by the two striking surfaces 176 of the steering arm 161; and the total angle θdr1 of the clockwise and counter-clockwise maximum steering angles of the steering arm 161.

For this reason, when the angle θst1 formed by the two contact surfaces 186 of the stopper 162 is set to increase, the angle θar1 formed by the two striking surfaces 176 of the steering arm 161 decreases, and thus it is possible to reduce the size of the steering arm 161 in the arm stopper mechanism 160.

In particular, in the arm stopper mechanism 160, when the angle θst1 formed by the two contact surfaces 186 of the stopper 162 is set to be greater than or equal to 180°, the angle θar1 formed by the two striking surfaces 176 of the steering arm 161 decreases further. As a result, at this time, it is possible to further reduce the size of the steering arm 161 in the arm stopper mechanism 160.

At this time, in the arm stopper mechanism 160, since the size of the steering arm 161 is further reduced, it is possible to bring the striking center position O176 of the striking load vector Wb close to the vicinity of the tie rod hole 72 to which the input load vector Wh is applied. For this reason, at this time, the arm stopper mechanism 160 can efficiently reduce occurrence of vibration.

In the arm stopper mechanism 160, it is preferable to secure an angle of 90° or greater for the total angle θdr1 of the clockwise and counter-clockwise maximum steering angles of the steering arm 161. For this reason, in the arm stopper mechanism 160, a total value of the angle θst1 and the angle θar1 is preferably set to be smaller than or equal to 270°. Here, the angle θst1 is formed by the two contact surfaces 186 of the stopper 162, and the angle θar1 is formed by the two striking surfaces 176 of the steering arm 161. When these conditions are satisfied, it is possible to secure an angle of 90° or greater for the total angle θdr1 of the clockwise and counter-clockwise maximum steering angles of the steering arm 161 in the arm stopper mechanism 160.

7: Schematic Configuration of Main Portions of Arm Stopper Mechanism According to First Embodiment As described above, for example, the configuration of the main portions of the actual arm stopper mechanism 160 is the same as illustrated in FIGS. 22 to 24.

Hereinafter, the configuration of the main portions of the arm stopper mechanism 160 will be described with reference to FIGS. 22 to 24. FIGS. 22 to 24 are schematic configuration views of the main portions of the arm stopper mechanism 160 according to the first embodiment. FIG. 22 illustrates the schematic configuration of the motor-driven power steering apparatus 101 provided with the arm stopper mechanism 160 when seen from a side. FIG. 23 illustrates the schematic configuration (particularly, a schematic configuration of the vicinity of the contact surface 186 which is a main portion) of the arm stopper mechanism 160 when seen from below. FIG. 24 is an enlarged view illustrating the configuration of region X1 in FIG. 23 when seen obliquely downward from the left.

As illustrated in FIG. 22, a shock absorbing member 601 is provided on the contact surface 186 of the stopper 162 of the arm stopper mechanism 160. The shock absorbing member 601 relieves a striking load (colliding load) occurring when the striking surface 176 of the steering arm 161 collides with the contact surface 186 of the stopper 162. For example, the shock absorbing member 601 is made of an elastically deformable elastic body of such as rubber, elastic resin or a spring, or formed by a shock absorbing apparatus such as an air damper or a hydraulic damper which dissipates vibration energy and reduces a vibration amplitude of a collision.

Here, the "air damper" includes a piston and a cylinder, and consumes the kinetic energy of the piston and reduces the speed of the piston by operating the piston with air trapped in the air damper and compressing the air. The "hydraulic damper" includes oil trapped therein instead of air. When the shock absorbing apparatus is used as the shock absorbing member 601, and is attached to the contact surface 186 of the stopper 162, the shock absorbing apparatus is attached to the contact surface 186 in such a manner that an operation direction of the piston is perpendicular to the contact surface 186. When the shock absorbing apparatus is used as the shock absorbing member 601, and is attached to the striking surface 176 of the steering arm 161, the shock absorbing apparatus is attached to the striking surface 176 in such a manner that the operation direction of the piston is perpendicular to the striking surface 176.

As illustrated in FIG. 23, in the first embodiment, the shock absorbing members 601 are respectively provided on the right and left contact surfaces 186 of the stopper 162. The shock absorbing member 601 may not be provided on the contact surface 186 of the stopper 162, but may be provided on the striking surface 176 of the steering arm 161. Alternatively, the shock absorbing members 601 may be respectively provided on both of the striking surface 176 of the steering arm 161 and the contact surface 186 of the stopper 162.

In the example illustrated in FIG. 24, the shock absorbing member 601 is made of an elastic body of such as rubber, or a soft resin material. Hereinafter, the shock absorbing member 601 is referred to as a "shock absorbing member 601a". The shock absorbing member 601a is provided in a concave portion 611 formed in the contact surface 186, and a part of the shock absorbing member 601a protrudes from the contact surface 186 of the stopper 162. The shock absorbing member 601a is fixed to the stopper 162 with a fixing bolt 621. The shock absorbing member 601a may be fixed to the stopper 162 with an adhesive.

Grooves 612 are provided in the surroundings of the concave portion 611 of the stopper 162. The groove 612 is a space for the retraction of squeezed portion of the shock absorbing member 601a when the striking surface 176 of the steering arm 161 collides with the contact surface 186 of the stopper 162. In the arm stopper mechanism 160, the squeezed portions of the shock absorbing member 601a are retracted to the groove 612 during a collision, and thus the entirety of the striking surface 176 of the steering arm 161 uniformly strikes against the entirety of the contact surface 186 of the stopper 162.

When the striking surface 176 of the steering arm 161 collides with the contact surface 186 of the stopper 162, the operation of the arm stopper mechanism 160 is as follows. That is, at the event of a collision, first, the striking surface 176 strikes against the shock absorbing member 601a and the shock absorbing member 601a is squeezed, and then the striking surface 176 strikes against the contact surface 186. At this time, the movement of the steering arm 161 decelerates as a squeezed portion of the shock absorbing member 601a enters the groove 612. Subsequently, when the striking surface 176 collides with the contact surface 186, the movement of the steering arm 161 is stopped.

In the arm stopper mechanism 160, the shock absorbing member 601a can relieve a striking load (colliding load) occurring between the striking surface 176 and the contact surface 186. As a result, in the arm stopper mechanism 160, it is possible to reduce noise occurring due to collision between the striking surface 176 and the contact surface 186.

First Modification Example

For example, the arm stopper mechanism 160 can be modified into an arm stopper mechanism 160A illustrated in FIG. 25. FIG. 25 is a schematic configuration view of main portions of the arm stopper mechanism 160A according to a modification example.

In the example illustrated in FIG. 25, a step-like portion (hereinafter, referred to as a "stepped portion 622") is provided on the striking surface 176 of the arm stopper mechanism 160A. The stepped portion 622 is a portion that collides with the shock absorbing member 601. The stepped portion 622 includes a protruding portion (hereinafter, referred to as a "protruding portion 622a"), and a portion (hereinafter, referred to as a "retreating portion 622b") that retreats with respect to the protruding portion 622a. Here, the protruding portion 622a and the striking surface 176 are formed on the same surface, and the retreating portion 622b retreats from the protruding portion 622a of the striking surface 176. The stepped portion 622 is provided on any one of the striking surface 176 and the contact surface 186 which collides with the shock absorbing member 601. Accordingly, when the shock absorbing member 601 is provided on the striking surface 176, the stepped portion 622 is provided on the contact surface 186.

In the example illustrated, approximately one third of the shock absorbing member 601 in the lateral direction is brought into contact with the protruding portion 622a of the stepped portion 622, and approximately two thirds is brought into contact with the retreating portion 622b of the stepped portion 622. The area of a contact portion (hereinafter, referred to as a "contact portion") between the shock absorbing member 601 and the protruding portion 622a of the stepped portion 622 affects the rate of deceleration of the steering arm 161. The speed of the steering arm 161 decreases considerably to the extent that the area of the contact portion increases. Instead, a strong striking load is applied to the striking surface 176. For this reason, the area of the contact portion of the arm stopper mechanism 160A is preferably designed in light of a balance between the rate of deceleration of the steering arm 161 and the strength of a striking load applied to the striking surface 176.

In this configuration, when the striking surface 176 collides with the contact surface 186, as the steering angle of the steering arm 161 increases, the arm stopper mechanism 160A operates as described below.

That is, first, the protruding portion 622a of the stepped portion 622 collides with the shock absorbing member 601 at an early stage of the collision. Subsequently, the protruding portion 622a and the retreating portion 622b of the stepped portion 622 collide with the shock absorbing member 601 at a middle stage of the collision. Finally, the striking surface 176 collides with the contact surface 186 at a later stage of the collision.

In the arm stopper mechanism 160A, the stepped portion 622 squeezes the shock absorbing member 601 in stages until the striking surface 176 collides with the contact surface 186. At this time, since the steering arm 161 moves while decelerating, the arm stopper mechanism 160A can reduce a striking load (colliding load) occurring when the striking surface 176 collides with the contact surface 186. As a result, in the steering apparatus using the arm stopper mechanism having this configuration, it is possible to prevent the operation of the handlebars from being disturbed, and obtain good handling characteristics.

A contact area of the stepped portion 622 and the shock absorbing member 601 changes in stages at the early and middle stages of the collision, and thus a volume of the shock absorbing member 601 squeezed by the stepped portion 622 changes in stages. For this reason, in the arm stopper mechanism 160A, it is possible to change a striking load (colliding load) applied to the striking surface 176 in multiple stages (here, two stages).

In the arm stopper mechanism 160A, since the shock absorbing member 601 is partially squeezed by the protruding portion 622a of the stepped portion 622 at the early stage of the collision, it is possible to set only a relatively small striking load (colliding load) to be applied to the striking surface 176. That is, it is possible to obtain a soft collision at the early stage of the collision. As a result, in the motor-driven power steering apparatus 101 using the arm stopper mechanism 160A, particularly at the early stage of the collision, it is possible to prevent the operation of the handlebars from being disturbed, and obtain good handling characteristics.

In the arm stopper mechanism 160A, since the entirety of the shock absorbing member 601 is squeezed by the protruding portion 622a and the retreating portion 622b of the stepped portion 622 in the middle stage of the collision, the shock absorbing member 601 can reliably relieve a striking load (colliding load) applied to the striking surface 176. Accordingly, the arm stopper mechanism 160A can efficiently reduce a striking load (colliding load) in the middle stage of the collision. As a result, in the motor-driven power steering apparatus 101 using the arm stopper mechanism 160A, even at the middle stage of the collision, it is possible to prevent the operation of the handlebars from being disturbed, and obtain good handling characteristics.

Second Modification Example

For example, the arm stopper mechanism 160 can be modified into an arm stopper mechanism 160B illustrated in FIG. 26. FIG. 26 is a schematic configuration view of main portions of the arm stopper mechanism 160B according to a modification example.

In the example illustrated in FIG. 26, the shock absorbing member 601 includes two springs 601b1 and two springs 601b2. The springs 601b1 and 601b2 are compression coil springs. The springs 601b1 and 601b2 have different spring constants. A spring (for example, the spring 601b1) with a low spring constant value is set to have a long length, and a spring (for example, the spring 601b2) with a high spring constant value is set to have a short length. The springs 601b1 and 601b2 are provided in a concave portion 613 formed in the contact surface 186 in such a manner that a part of each of the springs 601b1 and 601b2 protrudes from the contact surface 186 of the stopper 162.

In the arm stopper mechanism 160B with this configuration, when the striking surface 176 collides with the contact surface 186, as the steering angle of the steering arm 161 increases, first, the springs 601b1 with a low spring constant value collide with the striking surface 176 (refer to FIG. 23), and then the springs 601b2 with a high spring constant value collide with the striking surface 176.

In the arm stopper mechanism 160B, when the striking surface 176 collides with the contact surface 186, the springs 601b1 move differentially from the springs 601b2. That is, at an early stage of the collision, only the spring 601b1 with a low spring constant value collide with the striking surface 176 and are compressed, and in contrast, at a middle stage of the collision, both of the springs 601b1 and 601b2 collide with the striking surface 176 and are compressed. Accordingly, in the arm stopper mechanism 160B, it is possible to change a striking load (colliding load) applied to the striking surface 176 in multiple stages (here, two stages).

In the arm stopper mechanism 160B, at the early stage of the collision, only the springs 601b1 with a low spring constant value are compressed, and thus it is possible to set only a relatively small striking load (colliding load) to be applied to the striking surface 176. As a result, in the motor-driven power steering apparatus 101 using the arm stopper mechanism 160B, at the early stage of the collision, it is possible to prevent the operation of the handlebars from being disturbed, and obtain good handling characteristics.

In the arm stopper mechanism 160B, at a middle stage of the collision, both of the springs 601b1 and 601b2 collide with the striking surface 176, and thus the springs 601b1 and 601b2 can reliably relieve a striking load (colliding load) applied to the striking surface 176. Accordingly, the arm stopper mechanism 160B can efficiently reduce a striking load (colliding load) at the middle stage of the collision. As a result, in the motor-driven power steering apparatus 101 using the arm stopper mechanism 160B, even at the middle stage of the collision, it is possible to prevent the operation of the handlebars from being disturbed, and obtain good handling characteristics.

8: Schematic Configuration of Attachment Position Varying Mechanism Provided in Arm Stopper Mechanism According to First Embodiment In the present invention, for example, the actual arm stopper mechanism 160 includes an attachment position varying mechanism 670 illustrated in FIG. 28. The attachment position varying mechanism 670 is a mechanism by which it is possible to change a distance from the output shaft 22 to an attachment position of the tie rod 8.

Hereinafter, the configuration of the attachment position varying mechanism 670 will be described with reference to FIG. 28. FIG. 28 is a schematic configuration view of the attachment position varying mechanism 670 provided in the arm stopper mechanism 160 according to the first embodiment.

As illustrated in FIG. 28, the steering arm 161 is provided with the tie rod holes 172. The tie rod hole 172 is formed by a slender hole 671 that is parallel with the proximate striking surface 176. The "proximate striking surface 176" indicates the striking surface 176 having the same disposition position as the slender hole 671. That is, the proximate striking surface 176 of the right slender hole 671 indicates the right striking surface 176b, and the proximate striking surface 176 of the left slender hole 671 indicates the left striking surface 176a.

In the arm stopper mechanism 160, the tie rod 8 is allowed to move along a longitudinal direction (the respective directions of arrows A671a and A671b) of the slender hole 671, and is fixed at an arbitrary position. As a result, in the arm stopper mechanism 160, it is possible to change the distance from the output shaft 22 to the attachment position of the tie rod 8. Accordingly, the slender hole 671 functions as the attachment position varying mechanism 670.

In the arm stopper mechanism 160 with this configuration, when the attachment position of the tie rod 8 is set to be located further forward from a normal attachment position, the distance from the output shaft 22 to the attachment position of the tie rod 8 decreases, and thus it is easy to quickly operate the handlebars to have a relatively large steering angle. According, in the arm stopper mechanism 160, it is possible to obtain steering characteristics suitable for a "rough road surface" or a "course on which very high speed traveling is not attainable".

Accordingly, for example, in the arm stopper mechanism 160, when the saddle riding type vehicle 100 is expected to travel on the "rough road surface" or the "course on which very high speed traveling is not attainable", the attachment position of the tie rod 8 is set to be located further forward from the normal attachment position, and thus it is possible to obtain preferred steering characteristics.

In contrast, in the arm stopper mechanism 160, when the attachment position of the tie rod 8 is set to be located further rearward from the normal attachment position, the distance from the output shaft 22 to the attachment position of the tie rod 8 increases, and thus it is easy to slowly operate the handlebars to have a relatively small steering angle. Accordingly, in the arm stopper mechanism 160, it is possible to obtain steering characteristics suitable for a "relatively neat road surface" or a "course on which relatively high speed traveling is attainable".

Accordingly, for example, in the arm stopper mechanism 160, when the saddle riding type vehicle 100 is expected to travel on the "relatively neat road surface" or the "course on which relatively high speed traveling is attainable", the attachment position of the tie rod 8 is set to be located further rearward from the normal attachment position, and thus it is possible to obtain preferred steering characteristics.

In the arm stopper mechanism 160, when the distance from the output shaft 22 to the attachment position of the tie rod 8 is changed via the attachment position varying mechanism 670, it is possible to obtain steering characteristics adapted for various road surface conditions or various course characteristics.

In the steering arm 161, since the tie rod hole 172 is formed by the slender hole 671 that is parallel with the proximate striking surface 176, the distance from the tie rod hole 172 to the proximate striking surface 176 is uniform. Accordingly, in the arm stopper mechanism 160, it is possible to secure sufficient strength of the steering arm 161.

9-1: Schematic Configuration of First Modification Example of Attachment Position Varying Mechanism Provided in Arm Stopper Mechanism According to First Embodiment For example, the configuration of the attachment position varying mechanism 670 can be modified into a configuration illustrated in FIG. 29. Hereinafter, the configuration of an attachment position varying mechanism 670A as a first modification example of the attachment position varying mechanism 670 will be described with reference to FIG. 29. FIG. 29 is a schematic configuration view of the attachment position varying mechanism 670A.

As illustrated in FIG. 29, the tie rod hole 172 is formed by a slender hole 672 that extends radially with respect to the output shaft hole 171. Accordingly, in the arm stopper mechanism 160, it is possible to move the tie rod 8 along a longitudinal direction of the slender hole 672, and fix the tie rod 8 at an arbitrary position. As a result, in the arm stopper mechanism 160, it is possible to change the distance from the output shaft 22 to the attachment position of the tie rod 8. Accordingly, the slender hole 672 functions as the attachment position varying mechanism 670A.

In the arm stopper mechanism 160 with this configuration, similar to the attachment position varying mechanism 670 (refer to FIG. 28), it is possible to change the distance from the output shaft 22 to the attachment position of the tie rod 8 via the attachment position varying mechanism 670A. As a result, in the arm stopper mechanism 160, it is possible to obtain steering characteristics adapted for various road surface conditions or various course characteristics.

In the steering arm 161, since the tie rod hole 172 is formed by the slender hole 672 that extends radially with respect to the output shaft hole 171, the driver can easily discern the distance from the output shaft 22 to the attachment position of the tie rod 8. Accordingly, the driver can easily set the respective attachment positions of the two tie rods 8 in such a manner that the attachment positions are respectively located at the same distances rightward and leftward from the output shaft hole 171.

9-2: Schematic Configuration of Second Modification Example of Attachment Position Varying Mechanism Provided in Arm Stopper Mechanism According to First Embodiment For example, the configuration of the attachment position varying mechanism 670 can be modified into a configuration illustrated in FIG. 30. Hereinafter, the configuration of an attachment position varying mechanism 670B as a second modification example of the attachment position varying mechanism 670 will be described with reference to FIG. 30. FIG. 30 is a schematic configuration view of the attachment position varying mechanism 670B.

As illustrated in FIG. 30, the tie rod hole 172 is formed by a plurality of circular holes 673 that are disposed in parallel with the proximate striking surface 176. In the arm stopper mechanism 160 with this configuration, when the tie rod 8 is attached to any one of the plurality of circular holes 673, it is possible to change the distance from the output shaft 22 to the attachment position of the tie rod 8. Accordingly, the plurality of circular holes 673 function as the attachment position varying mechanism 670B.

Similar to the slender hole 672 illustrated in FIG. 29, it is possible to dispose the circular holes 673 linearly and radially with respect to the output shaft hole 171. It is possible to change the tie rod hole 172 from the circular holes 673 to non-circular holes (for example, square holes, regular hexagonal holes, or the like).

In the arm stopper mechanism 160 with this configuration, similar to the attachment position varying mechanism 670 (refer to FIG. 28), it is possible to change the distance from the output shaft 22 to the attachment position of the tie rod 8 via the attachment position varying mechanism 670B. As a result, in the arm stopper mechanism 160, it is possible to obtain steering characteristics adapted for various road surface conditions or various course characteristics.

However, in the arm stopper mechanism 160, since the respective longitudinal and lateral positions of the tie rods 8 with respect to the steering arm 161 are defined via the circular holes 673, it is possible to easily attach the two tie rods 8 at the respective equal positions with respect to longitudinal and lateral directions of the steering arm 161.

9-3: Schematic Configuration of Third Modification Example of Attachment Position Varying Mechanism Provided in Arm Stopper Mechanism According to First Embodiment For example, the configuration of the attachment position varying mechanism 670 can be modified into a configuration illustrated in FIG. 31. Hereinafter, the configuration of an attachment position varying mechanism 670C as a third modification example of the attachment position varying mechanism 670 will be described with reference to FIG. 31. FIG. 31 is a schematic configuration view of the attachment position varying mechanism 670C.

As illustrated in FIG. 31, the tie rod hole 172 is formed by a hole 674, the shape of which is formed when adjacent holes of a plurality of circular holes partially overlap with each other. Here, the plurality of circular holes are disposed in parallel with the proximate striking surface 176. In the arm stopper mechanism 160 with this configuration, when the tie rod 8 is attached to any one of the plurality of circular holes of the hole 674, it is possible to change the distance from the output shaft 22 to the attachment position of the tie rod 8. Accordingly, the hole 674 functions as the attachment position varying mechanism 670C.

For example, similar to the slender hole 672 illustrated in FIG. 29, the shape of the hole 674 can be changed in order for the hole 674 to extend radially with respect to the output shaft hole 171.

In the arm stopper mechanism 160 with this configuration, similar to the attachment position varying mechanism 670 (refer to FIG. 28), it is possible to change the distance from the output shaft 22 to the attachment position of the tie rod 8 via the attachment position varying mechanism 670C. As a result, in the arm stopper mechanism 160, it is possible to obtain steering characteristics adapted for various road surface conditions or various course characteristics.

However, in the arm stopper mechanism 160, since the respective longitudinal and lateral position of the tie rod 8 with respect to the steering arm 161 is defined via any one of the circular holes of the hole 674, it is possible to easily attach the two tie rods 8 at the respective equal positions with respect to the longitudinal and lateral directions of the steering arm 161.

9-4: Schematic Configuration of Fourth Modification Example of Attachment Position Varying Mechanism Provided in Arm Stopper Mechanism According to First Embodiment For example, the configuration of the attachment position varying mechanism 670 can be modified into a configuration illustrated in FIGS. 32 and 33. Hereinafter, the configuration of an attachment position varying mechanism 680 as a fourth modification example of the attachment position varying mechanism 670 will be described with reference to FIGS. 32 and 33. Here, an "arm stopper mechanism 160B" refers to the arm stopper mechanism 160 having the attachment position varying mechanism 680. FIGS. 32 and 33 are schematic configuration views of the attachment position varying mechanism 680. FIG. 32 illustrates the configuration of the attachment position varying mechanism 680 when seen obliquely upward from the right. FIG. 33 illustrates the configuration of the attachment position varying mechanism 680 when seen from below. FIG. 34A illustrates the configuration of the attachment position varying mechanism 680 when disassembled. FIG. 34B illustrates a cross-sectional configuration of the attachment position varying mechanism 680 when taken along line X1-X1 illustrated in FIG. 34A.

As illustrated in FIG. 32, the configuration of the arm stopper mechanism 160B uses a steering arm 161B instead of the steering arm 161 (refer to FIG. 2) and is not provided with the tie rod holes 172, and a connecting member 682 is used and is provided with tie rod holes 772 (refer to FIG. 33). A fixing bolt 683 connects the connecting member 682 and a slender hole 681 provided in the steering arm 161B. As will be described below, the slender hole 681 of the steering arm 161B and the connecting member 682 function as the attachment position varying mechanism 680.

As illustrated in FIG. 33, the slender hole 681 has a substantially rectangular shape when seem from below. The slender hole 681 is positioned further rearward from the output shaft hole 171, and extends along the center line L161 of the steering arm 161B in the longitudinal direction.

When the connecting member 682 is moved to a furthest forward position and is connected to the slender hole 681, a front end of the slender hole 681 is set to be located at a position at which the steering arm 161B is turnable in the clockwise and counter-clockwise directions while the tie rods 8 respectively attached to the tie rod holes 772 are not in contact with the housing 113. In contrast, a rear end of the slender hole 681 is set to be arbitrarily positioned at an outer circumferential edge of a rear end portion of the steering arm 161B.

As illustrated in FIG. 34A, the connecting member 682 includes a plate-like main body portion 682a that is long in the lateral direction, and a protruding portion 682b that protrudes vertically upward from an upper surface of the main body portion 682a. The upper surface of the main body portion 682a faces a lower surface of the steering arm 161B. In contrast, the protruding portion 682b is inserted into the slender hole 681. The protruding portion 682b is slidable along a longitudinal direction (that is, a longitudinal direction of the steering arm 161B) of the slender hole 681.

The protruding portion 682b has a substantially rectangular shape when seen from above. The protruding portion 682b is provided at a center position of the connecting member 682 in the lateral direction, and extends in the longitudinal direction. The protruding portion 682b has a lateral width slightly shorter than that of the slender hole 681 so as to be slidable in the slender hole 681 without wobbling.

The tie rod hole 772 for the attachment of the tie rod 8 is provided in the vicinity of each of right and left opposite ends of the main body portion 682a. In contrast, a female screw portion 773 for the attachment of the fixing bolt 683 is provided in the vicinity of a center of the protruding portion 682b.

As illustrated in FIG. 34B, the connecting member 682 is attached to the steering arm 161B by inserting the protruding portion 682b into the slender hole 681 and attaching the fixing bolt 683 to the female screw portion 773 of the protruding portion 682b. At this time, the steering arm 161B is interposed between the fixing bolt 683 and the main body portion 682a of the connecting member 682, thereby fixing the connecting member 682.

In the arm stopper mechanism 160B with this configuration, it is possible to change the distance from the output shaft 22 to each of the respective attachment positions of the tie rods 8 by sliding the connecting member 682 along the longitudinal direction (that is, the longitudinal direction of the steering arm 161B) of the slender hole 681 with the protruding portion 682b inserted into the slender hole 681 and with the tie rods 8 connected to the connecting member 682. Accordingly, the slender hole 681 of the steering arm 161B and the connecting member 682 function as the attachment position varying mechanism 680.

In the arm stopper mechanism 160B provided with the attachment position varying mechanism 680, similar to the attachment position varying mechanism 670 (refer to FIG. 28), it is possible to change the distance from the output shaft 22 to the attachment position of the tie rod 8 via the attachment position varying mechanism 680. As a result, in the arm stopper mechanism 160B, it is possible to obtain steering characteristics adapted for various road surface conditions or various course characteristics.

However, in the arm stopper mechanism 160B, since the slender hole 681 of the steering arm 161B defines the respective positions of the tie rods 8 in the longitudinal direction, and the tie rod holes 772 of the connecting member 682 define the respective positions of the tie rods 8 in the lateral direction, it is possible to easily to attach the two tie rods 8 at the respective equal positions with respect to the longitudinal and lateral directions of the steering arm 161B.

For example, the slender hole 681 of the attachment position varying mechanism 680 (refer to FIGS. 32 to 34) can be modified into a hole (that is, a hole having a shape in which adjacent holes of a plurality of holes partially overlap with each other) having the same shape as the hole 674 (refer to FIG. 31). At this time, it is necessary to modify the shape of the protruding portion 682b (refer to FIG. 34A) of the connecting member 682 so as to allow the protruding portion 682b to be inserted into the slender hole 681. In the attachment position varying mechanism 680 with this configuration, since it is possible to change the position of the connecting member 682 in the longitudinal direction in multiple stages due to this slender hole 681, it is possible to easily set the respective attachment positions of the tie rods 8 in the longitudinal direction.

Since the arm stopper mechanism 60 according to the comparative example has the same configuration as the arm stopper mechanism of the related art, as illustrated in FIG. 20, when the striking surface 76 of the steering arm 61 collides with the contact surface 86 of the stopper 62, a bending load has a relatively large value. Accordingly, the arm stopper mechanism 60 is required to have strength against the bending load of a relatively large value, an input load, and a striking load. It is necessary to make the steering arm 61 of the arm stopper mechanism 60 according to the comparative example, using iron so as to obtain a high strength while reducing a cost increase.

However, the iron steering arm 61 has an excessively great weight. In the motor-driven power steering apparatus 1 (refer to FIG. 16) using the arm stopper mechanism 60 according to the comparative example, since the steering arm 61 is an object with great weight and is required to move in conjunction with the handlebars 2, the handlebars 2 become heavy, and it is difficult to obtain good handling characteristics.

In contrast, in the arm stopper mechanism 160 according to the first embodiment, as illustrated in FIG. 11, since the input load vector Wh and the striking load vector Wt are applied to cancel out each other when the striking surface 176 of the steering arm 161 collides with the contact surface 186 of the stopper 162, it is possible to reduce occurrence of bending load. Accordingly, the steering arm 161 of the arm stopper mechanism 160 is not required to have such a high strength as the steering arm 61 according to the comparative example. That is, it is preferred that the strength of the steering arm 161 of the arm stopper mechanism 160 be secured to the extent of merely enduring the reduced bending load, an input load and a striking load. For this reason, it is possible to make the steering arm 161 of the arm stopper mechanism 160, using a metallic material or resin material having a specific gravity smaller than that of iron (for example, aluminum alloy, polyphenylene sulfide resin, or the like). As a result, it is possible to reduce the weight of the steering arm 161 of the arm stopper mechanism 160. Accordingly, in the motor-driven power steering apparatus 101 (refer to FIG. 2) using the arm stopper mechanism 160, the handlebars become light, and it is possible to obtain good handling characteristics. It is possible to improve the fuel economy of the saddle riding type vehicle 100 by reducing the weight of the steering arm 161.

In the arm stopper mechanism 160, since it is possible to set the respective hardnesses of the steering arm 161 and the stopper 162 to be different from each other, a member (the steering arm 161) with a low hardness can absorb a striking load (colliding load) between the striking surface 176 and the contact surface 186, and it is possible to reduce noise occurring due to collision between the striking surface 176 and the contact surface 186.

Since it is possible to make the steering arm 161 of the arm stopper mechanism 160, using a material with a unit price lower than that of iron, it is possible to reduce the cost of the motor-driven power steering apparatus 101.

As illustrated in FIG. 37, the steering arm 161 is formed in such a manner that the striking surface 176 has a thickness (height) TA1 greater than a thickness (for example, a thickness in the vicinity of the center line L161 (refer to FIG. 8) of the steering arm 161) TA2 in other portions of the steering arm 161. FIG. 37 is a schematic configuration view of the motor-driven power steering apparatus provided with the arm stopper mechanism according to the first embodiment, when seen from a side.

In the steering arm 161, since the thickness (height) TA1 of the striking surface 176 is greater than the thickness TA2 of the other portions, it is possible to secure a relatively wide contact area of the striking surface 176 and the contact surface 186 of the stopper 162. Accordingly, in the steering arm 161, it is possible to disperse a striking load (colliding load) when the striking surface 176 collides with the contact surface 186 of the stopper 162. For this reason, in the arm stopper mechanism 160, it is possible to improve the impact resistance of the steering arm 161, and even when the striking surface 176 of the steering arm 161 relatively strongly collides with the contact surface 186 of the stopper 162, it is possible to prevent the steering arm 161 from being damaged.

Structure of Connecting Steering Shaft Member and Steering Arm

Subsequently, in the first embodiment and a second embodiment, the structure of respectively connecting a steering shaft member 50 and the steering arm 161 to the input shaft 21 and the output shaft 22 will be described with reference to FIGS. 38 to 43D.

In the drawings illustrated below, the same reference numbers are respectively assigned to the same members as or members equivalent to those of the first and second embodiments, and duplicated descriptions will be appropriately omitted. The respective sizes and shapes of the members may be modified or may be exaggeratedly illustrated for descriptive purposes.

FIG. 38 is an exploded view of the motor-driven power steering apparatus 101 illustrating a manner in which the input shaft 21 and the output shaft 22 are respectively connected to the steering shaft member 50 and the steering arm 161, when seen from the rear. FIG. 39A is a top view of FIG. 38, and FIG. 39B is a bottom view of FIG. 38. FIG. 40 is an exploded vertical cross-sectional view illustrating the joint 5, the input shaft 21, the output shaft 22 connected to the input shaft 21 via the torsion bar 27, and the steering arm 161 illustrated in FIG. 38, all of which are detached.

As illustrated in FIGS. 38 and 39, the motor-driven power steering apparatus 101 has a unit body packed with the housing 113, and the housing 113 has the input shaft 21, the output shaft 22, the torsion bar 27 connecting the input shaft 21 and the output shaft 22, and the like built thereinto (refer to FIG. 40). The input shaft 21 and the output shaft 22 are turnably supported by the housing 113 via the bearings 31, 32A, and 32B (refer to FIG. 3).

The steering shaft member 50 includes the steering shaft 4 to which the handlebars 2 (refer to FIG. 41) as steering handlebars are fixed via the handle stay 3 (refer to FIG. 41), and the joint 5 that connects the steering shaft 4 and the input shaft 21. The joint 5 is turnably supported by an upper holder 114 via a bearing (not illustrated). The upper holder 114 assembled with the joint 5 is fixed to the housing 113 in such a manner that the joint 5 is connected to the input shaft 21.

As illustrated in FIG. 40, an outer circumferential portion on an upper end side of the input shaft 21 is provided with a male serration 21A that is fitted to a female serration 5A formed in the joint 5 of the steering shaft member 50 (refer to FIG. 38 and the same hereinafter). Accordingly, the input shaft 21 is serration-fitted into the steering shaft member 50. An outer circumferential portion on a lower end side of the output shaft 22 is provided with a male serration 22A that is fitted to a female serration 161A formed in the steering arm 161. Accordingly, the output shaft 22 is serration-fitted into the steering arm 161. The female serration 161A is formed on an inner surface of each of the output shaft hole 171 (refer to FIG. 8) and an output shaft hole 271 (refer to FIG. 13).

An upper portion of the torsion bar 27 is inserted into a hollow portion of the input shaft 21, and an upper end portion of the torsion bar 27 is serration-joined to an inner surface of the hollow portion of the input shaft 21. In contrast, a lower portion of the torsion bar 27 is inserted into a hollow portion of the output shaft 22, and a lower end portion of the torsion bar 27 is connected to the output shaft 22 via a coupling pin 27A. As such, the input shaft 21 connected to the joint 5 of the steering shaft member 50 is connected to the output shaft 22 connected to the steering arm 161 via the torsion bar 27, and the input shaft 21 and the output shaft 22 are disposed on the same center axis CL.

The joint 5 of the steering shaft member 50 has a substantially cylindrical trunk portion 51 that has the female serration 5A formed on the inner surface of the trunk portion 51, and a plate-like protruding member 52 that is mounted in a fixed manner on an outer circumferential surface of the trunk portion 51 using welding or the like and protrudes radially outward from the outer circumferential surface.

FIG. 41 is an exploded view illustrating a manner in which the steering shaft 4 is attached to the joint 5, when seen from the rear. FIG. 42 is a cross-sectional view illustrating a state in which the steering shaft 4 is attached to the joint 5.

As illustrated in FIGS. 41 and 42, a groove 53 is formed in the outer circumferential surface of the trunk portion 51 of the joint 5, and the shape of the groove 53 is obtained when a part of the outer circumferential surface is cut away using a cylindrical surface extending in the lateral direction. In contrast, a cut-away groove 41 extending in an axial direction is formed on a rear side of an end portion of the cylindrical steering shaft 4, the end portion being positioned close to the joint 5, and right and left boss portions 42 and 43 are provided on the rear side of the end portion with the cut-away groove 41 interposed therebetween.

When the steering shaft 4 is attached to the joint 5, first, the circumferential position of the groove 53 of the joint 5 is aligned with that of the cut-away groove 41 of the steering shaft 4, and the steering shaft 4 is inserted into the joint 5 in such a manner that the outer circumferential surface of the trunk portion 51 of the joint 5 is fitted to an inner circumferential surface of the steering shaft 4. A bolt 44 is inserted into a through hole 421 formed in the boss portion 42, and the bolt 44 is screwed into a female screw portion 431 formed in the boss portion 43 while an outer circumferential surface of the bolt 44 is being fitted to the groove 53 of the joint 5. The boss portions 42 and 43 are tightened with the bolt 44, thereby reducing the diameter of a lower end portion of the steering shaft 4. Accordingly, an upper end portion of the joint 5 is tightened by the lower end portion of the steering shaft 4, and thus the steering shaft 4 is attached to the joint 5. Here, since the outer circumferential surface of the bolt 44 is fitted to the groove 53 of the joint 5, the circumferential position (phase) of the joint 5 is reliably aligned with that of the steering shaft 4 or the handlebars 2 as pre-determined, and the alignment is held.

Referring to FIGS. 38 to 40, the motor-driven power steering apparatus 101 includes a torque sensor (not illustrated) for the detection of steering torque. The torque sensor detects steering torque based on the respective rotational displacements of the input shaft 21 and the output shaft 22 which are caused to occur by the twisting of the torsion bar 27 when the steering torque is applied to the handlebars 2 (refer to FIG. 41).

The motor-driven power steering apparatus 101 includes the electric motor 24 as an actuator that generates torque to be transmitted to the output shaft 22. The electric motor 24 is attached to the housing 113, and is driven to correspond to the detected torque of the torque sensor 23 via a command from a controller (not illustrated). A rotating drive force from the electric motor 24 is transmitted to the output shaft 22 via a power transmission mechanism including a worm gear and a worm wheel.

For example, the motor-driven power steering apparatus 101 is attached to the vehicle body, using an attachment boss provided in the housing 113, for example. In the steering mechanism 1001 (refer to FIG. 1), the torque sensor detects steering torque applied to the handlebars 2 (refer to FIG. 41), the electric motor 24 is driven based on the detected torque, and the generated torque of the electric motor 24 is transmitted to the output shaft 22 via the power transmission mechanism. Accordingly, in the motor-driven power steering apparatus 101, the generated torque of the electric motor 24 can be used as an assisting force for a steering force applied to the handlebars 2 by the driver.

As described above, since the striking surface 176 of the steering arm 161 strikes against the contact surface 186 of the stopper 162, the turning angle of the steering arm 161 is restricted, and thus the turning of the output shaft 22 is restricted. In contrast, since a striking surface 521 of a protruding member 52 of the joint 5 strikes against a contact surface 187 of a stopper 162 of the upper holder 114, the turning angle of the protruding member 52 is restricted, and thus the turning of the input shaft 21 is restricted (refer to FIGS. 39A and 39B).

FIG. 43A is a cross-sectional view taken along line A-A in FIG. 40, FIG. 43B is a cross-sectional view taken along line B-B in FIG. 40, FIG. 43C is a cross-sectional view taken along line C-C in FIG. 40, and FIG. 43D is a cross-sectional view taken along line D-D in FIG. 40.

The input shaft 21 has an input shaft engaging portion 211. The input shaft engaging portion is engaged with a steering shaft member engaging portion 54 provided in the joint 5 of the steering shaft member 50, and thus determines the respective circumferential positions of the input shaft 21 and the joint 5. The output shaft 22 has an output shaft engaging portion 221. The output shaft engaging portion 221 is engaged with a steering arm engaging portion 1611 provided in the steering arm 161, and thus determines the respective circumferential positions of the output shaft 22 and the steering arm 161.

In the embodiment, the input shaft engaging portion 211 is a linear concave portion with missing teeth, from which teeth of the male serration 21A are removed, and the output shaft engaging portion 221 is a linear concave portion with missing teeth, from which teeth of the male serration 22A are removed. In FIGS. 43B and 43C, the number of missing teeth is one, but a plurality of teeth may be missing. The steering shaft member engaging portion 54 is a linear convex portion which is a united tooth obtained by filling up a gap between teeth of the female serration 5A, and the steering arm engaging portion 1611 is a linear convex portion which is a united tooth obtained by filling up a gap between teeth of the female serration 161A. In FIGS. 43A and 43D, two teeth are united to form the united tooth, but three or more teeth may be united.

In the embodiment, it is possible to connect the joint 5 of the steering shaft member 50 and the input shaft 21, using serration fitting while engaging the steering shaft member engaging portion 54 with the input shaft engaging portion 211. It is possible to connect the steering arm 161 and the output shaft 22, using serration fitting while engaging the steering arm engaging portion 1611 with the output shaft engaging portion 221. Accordingly, it is possible to align the circumferential position (phase) of the joint 5 connected to the input shaft 21 with that of the steering arm 161 connected to the output shaft 22. Here, the input shaft 21 is connected to the output shaft 22 via the torsion bar 27. That is, a direction of a center line L5 (refer to FIG. 39A) coincides with a direction of the center line L161 (refer to FIG. 39B). Here, the center line L5 is a bilaterally symmetrical axis of the joint 5, and the center line L161 is a bilaterally symmetrical axis of the steering arm 161. Here, the center line L5, which is the bilaterally symmetrical axis of the joint 5, passes through a turning center of the joint 5 and the respective circumferential center positions of the groove 53 and the protruding member 52. Accordingly, it is possible to prevent an occurrence of an offset between a direction of a center line which is a bilaterally symmetrical axis of the handlebars 2 and the direction of the center line L161 which is the bilaterally symmetrical axis of the steering arm 161. Here, the handlebars 2 are fixed while holding the circumferential position of the handlebars 2 which is pre-determined with respect to the steering shaft member 50.

That is, in the embodiment, it is possible to provide the motor-driven power steering apparatus 101 in which it is possible to easily and reliably align the circumferential position of the joint 5 of the steering shaft member 50 with that of the steering arm 161, and in which it is possible to prevent a bending load from being applied to the output shaft 22 from the steering arm 161.

In the embodiment, the linear concave portion formed in the male serration 21A of the input shaft 21 can be engaged with the linear convex portion formed in the female serration 5A of the joint 5. The linear concave portion formed in the male serration 22A of the output shaft 22 can be engaged with the linear convex portion formed in the female serration 161A of the steering arm 161. Accordingly, it is possible to form the linear convex portions and the linear concave portions by reshaping a part of the respective teeth of the serrations 21A, 22A, 5A, and 161A. It is possible to connect the steering shaft member 50 and the input shaft 21, using serration fitting while engaging the linear convex portion with the linear concave portion. In addition, it is possible to connect the steering arm 161 and the output shaft 22, using serration fitting.

In contrast to the embodiment, the input shaft engaging portion 211 may be formed by the linear convex portion which is a unit tooth obtained by filling up a gap between the teeth of the male serration 21A, and the output shaft engaging portion 221 may be formed by the linear convex portion which is a united tooth obtained by filling up a gap between the teeth of the male serration 22A. In addition, the steering shaft member engaging portion 54 may be formed by the linear concave portion with missing teeth, from which the teeth of the female serration 5A are removed, and the steering arm engaging portion 1611 may be formed by the linear concave portion with missing teeth, from which the teeth of the female serration 161A are removed. Even in this configuration, it is possible to obtain the same effects.

In the embodiment, when the handlebars 2 are not turned (that is, the handlebars 2 are in a neutral state in which the center line, which is the bilaterally symmetrical axis of the handlebars 2, coincides with the longitudinal direction of the saddle riding type vehicle 100), the respective circumferential positions of the steering shaft member engaging portion 54, the input shaft engaging portion 211, the output shaft engaging portion 221, and the steering arm engaging portion 1611 face rearward. Here, the input shaft 21 is connected to the output shaft 22 via the torsion bar 27 in such a manner that the circumferential position (phase) of the input shaft engaging portion 211 is aligned with that of the output shaft engaging portion 221. When the handlebars 2 are not turned, the respective circumferential positions of the steering shaft member engaging portion 54, the input shaft engaging portion 211, the output shaft engaging portion 221, and the steering arm engaging portion 1611 may be set to face a pre-determined direction other than the rearward direction, insofar as the direction of the center line which is the bilaterally symmetrical axis of the handlebars 2 is allowed to coincide with the direction of the center line L161 which is the bilaterally symmetrical axis of the steering arm.

Subsequently, a modification example of the embodiment will be described with reference to FIGS. 44A to 45B, mainly focusing on points different from the embodiment illustrated in FIGS. 38 to 43D, and the descriptions of common points therebetween will be omitted.

FIG. 44A is a plan view illustrating the surroundings of a steering shaft member engaging portion 54a and an input shaft engaging portion 211a according to the modification example, and FIG. 44B is a cross-sectional view taken along line E-E in FIG. 44A. FIG. 45A is a vertical cross-sectional view illustrating the surroundings of the output shaft engaging portion 221a and a steering arm engaging portion 1611a according to the modification example, and FIG. 45B is a cross-sectional view taken along line F-F in FIG. 45A.

In the modification example, the input shaft engaging portion 211a is a columnar pin member as the convex portion which is formed in an axial end portion of the male serration 21A of the input shaft 21. Here, the input shaft engaging portion 211a is press-fitted into a hole formed at a tip end of the input shaft 21. However, the present invention is not limited to this configuration, and for example, the input shaft engaging portion 211a may be provided integrally with the input shaft 21. The steering shaft member engaging portion 54a is a through hole as the convex portion which is formed in an axial end portion of the female serration 5A of the joint 5. The input shaft engaging portion 211a and the steering shaft member engaging portion 54a are formed at respective positions offset from the center axis CL (refer to FIG. 40 and the same hereinafter), here, at the respective positions offset rearward from the center axis CL when the handlebars 2 are not turned, so as to determine the respective circumferential positions of the input shaft 21 and the joint 5.

The output shaft engaging portion 221a is a rectangular parallelepiped key member as the convex portion which is formed in an axial end portion of the male serration 22A of the output shaft 22. The output shaft engaging portion 221a is provided to protrude radially outward from an outer circumferential surface of the output shaft 22. Here, the output shaft engaging portion 221a is provided integrally with the output shaft 22. However, the present invention is not limited to this configuration, and for example, the output shaft engaging portion 221a may be press-fitted into a hole formed in the outer circumferential surface of the output shaft 22. The steering arm engaging portion 1611a is a key groove as the concave portion which is formed in an axial end portion of the female serration 161A of the steering arm 161. The output shaft engaging portion 221a and the steering arm engaging portion 1611a are formed at respective positions offset from the center axis CL, here, at the respective positions offset rearward from the center axis CL when the handlebars 2 are not turned, so as to determine the respective circumferential positions of the output shaft 22 and the steering arm 161. In the modification example, a male screw portion 35 of the output shaft 22 is screwed into a nut member 37, and thus a contact surface 57 of the steering arm 161 is pressed against a contacted surface 29 of the output shaft 22, and the steering arm 161 is attached to the output shaft 22 while being fixed thereto.

In the modification example, it is possible to obtain the same action effects as in the embodiment illustrated in FIGS. 22 to 27.

It is possible to engage the convex portion formed in the axial end portion of the male serration 21A of the input shaft 21 with the concave portion formed in the axial end portion of the female serration 5A of the joint 5, and it is possible to engage the convex portion formed in the axial end portion of the male serration 22A of the output shaft 22 with the concave portion formed in the axial end portion of the female serration 161A of the steering arm 161. Accordingly, the concave portions and the convex portions respectively engaged with each other are respectively formed in the respective axial end portions of the serrations, and it is possible to connect the steering shaft member 50 and the input shaft 21, using serration fitting while engaging the concave portion with the convex portion, and it is possible to connect the steering arm 161 and the output shaft 22, using serration fitting.

In contrast to the modification example, the input shaft engaging portion 211a may be the concave portion formed in the axial end portion of the male serration 21A, and the output shaft engaging portion 221a may be the concave portion formed in the axial end portion of the male serration 22A. The steering shaft member engaging portion 54a may be the convex portion formed in the axial end portion of the female serration 5A, and the steering arm engaging portion 1611 a may be the convex portion formed in the axial end portion of the female serration 161A. Even in this configuration, it is possible to obtain the same effects.

10: Internal Configuration of Steering Apparatus According to First Embodiment

Hereinafter, an internal configuration of the motor-driven power steering apparatus 101 will be described with reference to FIG. 3.

As illustrated in FIG. 3, the housings 113a, 113b, and 113c of the power steering apparatus 101 have the input shaft 21, the output shaft 22, the torque sensor 23, the electric motor (the actuator) 24, a worm gear 25, and a worm wheel 26 built thereinto.

An upper portion of the input shaft 21 connected to the steering shaft 4 is supported by the first housing 113a via the bearing 31. A core member 40 is mounted in the vicinity of a center of the input shaft 21, and allows the torque sensor 23 to detect steering torque occurring in the torsion bar 27. A spiral groove 40A is formed in the core member 40, and a slider pin 27B provided in the input shaft 21 is fitted into the spiral groove 40A. As the input shaft 21 rotates, the spiral groove 40A is pushed by the slider pin 27B, and thus the core member 40 moves in an axial direction. As will be described later, the torque sensor 23 detects steering torque occurring in the torsion bar 27, based on an axial movement distance of the core member 40. Upper and lower portions of the output shaft 22 connected to the steering arm 161 are supported by the second housing 113b and the third housing 113c via the upper and lower bearings 32A and 32B, respectively.

The shaft serration 21A for a connection to the steering shaft 4 is formed in an outer circumferential portion at an upper end of the input shaft 21, and the male serration 22A for a connection to the steering arm 161 is formed in an outer circumferential portion at a lower end of the output shaft 22.

The upper end portion of the torsion bar 27 is inserted into the hollow portion of the input shaft 21, and the upper end portion of the torsion bar 27 is serration-joined to the inner surface of the hollow portion of the input shaft 21. In contrast, the lower portion of the torsion bar 27 is inserted into the hollow portion of the output shaft 22, and a lower end portion of the torsion bar 27 is connected to the output shaft 22 via the coupling pin 27A.

In the power steering apparatus 101, the input shaft 21 connected to the steering shaft 4 is connected to the output shaft 22 connected to the steering arm 161 via the torsion bar 27, and the input shaft 21 and the output shaft 22 are disposed on the same center axis CL.

The power steering apparatus 101 includes the torque sensor 23 for the detection of steering torque. The torque sensor 23 detects steering torque based on the respective rotational displacements of the input shaft 21 and the output shaft 22 which are caused to occur by the twisting of the torsion bar 27 when the steering torque is applied to the handlebars 2 (refer to FIG. 1).

For example, the torque sensor 23 includes two detecting coils (not illustrated) that are disposed along an axial direction of the input shaft 21. When the core member 40 moves in the axial direction in response to the rotation of the input shaft 21, the two detecting coils of the torque sensor 23 detect a movement distance of a detected portion (not illustrated) of the core member 40, and thus detect a change in the rotational angle of the input shaft 21. A change in the rotational angle of the input shaft 21 indicates a twisting angle of the torsion bar 27. The torque sensor 23 detects steering torque occurring in the torsion bar 27, based on a change (that is, the twisting angle of the torsion bar 27) in the rotational angle of the input shaft 21.

The power steering apparatus 101 includes the electric motor 24 that generates torque to be transmitted to the output shaft 22. The electric motor 24 is attached to the second housing 113b, and is driven to correspond to the detected torque of the torque sensor 23 by the controller (not illustrated).

The worm gear 25 is joined to a rotation shaft of the electric motor 24 via a joint (not illustrated), and the worm wheel 26 meshing with the worm gear 25 is fixed to the output shaft 22. Opposite end portions of the worm gear 25 are supported by the second housing 113b via respective bearings (not illustrated). Inside the second housing 113b, the worm wheel 26 is fixed to the output shaft 22 directly under the bearing 32A that receives the output shaft 22. The worm wheel 26 has a circular plate-like main body 38 that has a toothed portion formed on an outer circumference thereof and made of synthetic resin, and a core bar 39 embedded in the main body 38.

In the power steering apparatus 101, the first housing 113a supports the upper portion of the input shaft 21 and the torque sensor 23; the second housing 113b supports an upper portion of the output shaft 22, the electric motor 24, the worm gear 25, and the worm wheel 26; the third housing 113c supports a lower portion of the output shaft 22. The first housing 113a and the second housing 113b are fastened with a mounting bolt 14, and the second housing 113b and the third housing 113c are fastened with a mounting bolt 15. An oil seal 33 seals an upper opening portion of the bearing 31 installed in the first housing 113a, and an oil seal 34 seals a lower opening portion of the bearing 32B installed in the third housing 113c. The power steering apparatus 101 can be attached to the vehicle body, using the attachment boss (not illustrated) provided in the second housing 113b.

In the steering mechanism 1001 (refer to FIG. 1), the torque sensor 23 detects steering torque applied to the handlebars 2 (refer to FIG. 1), the electric motor 24 is driven based on the detected torque, and the generated torque of the electric motor 24 is transmitted to the output shaft 22 via the worm gear 25 and the worm wheel 26. Accordingly, in the power steering apparatus 101, the generated torque of the electric motor 24 can be used as an assisting force for a steering force applied to the handlebars 2 by the driver.

In the embodiment, the power steering apparatus 101 includes a collar (cylindrical member) 6 that is disposed radially outward from the output shaft 22 with a gap interposed between the collar 6 and the output shaft 22, and an O-ring (seal member) 7 that is disposed between the output shaft 22 and the collar 6 in a radial direction.

The steering arm 161 has a substantially cylindrical portion 51 and an arm portion 52 that extends radially outward from an outer circumferential surface of the cylindrical portion 51. A hole serration 54 is formed on an inner surface of the cylindrical portion 51, and is connected to the shaft serration 22A of the output shaft 22. A pair of the tie rod holes 172 are formed at a tip end of the arm portion 52, and the right and left tie rods 8 (refer to FIG. 1) are respectively connected to the tie rod holes 172.

The steering arm 161 is inserted into the output shaft 22 in order for the hole serration 54 to be engaged with the shaft serration 22A, and is disposed to be adjacent to the collar 6 in the axial direction. In contrast, the male screw portion 35 is formed at a tip end of the output shaft 22. Accordingly, when the male screw portion 35 is screwed into the nut member 37 with a washer 36 installed therebetween, the steering arm 161 is brought into contact with the core bar 39 of the worm wheel 26, and thus the steering arm 161 is pressed against an end surface of the collar 6 that is restricted so as to be unable to move toward the input shaft 21, and can be fixed to the output shaft 22.

11: Respective Schematic Configuration of Portions at Assembly of Steering Apparatus According to First Embodiment The respective schematic configurations of portions at the assembly of the motor-driven power steering apparatus 101 will be described with reference to FIGS. 46 to 57. Here, the entirety of assembly steps will be described assuming that the motor-driven power steering apparatus 101 is assembled by using an assembly apparatus (not illustrated). It is possible to manually perform a part or the entirety of the assembly steps.

FIGS. 46 to 57 are the respective schematic configuration views of the portions at the assembly of the motor-driven power steering apparatus 101. FIG. 46 illustrates the configuration of an assembly C1 that is assembled in an initial step, and FIGS. 47A to 57 illustrate the respective configurations of assemblies that are assembled in the rest of steps. The motor-driven power steering apparatus 101 is finally assembled by assembling the washer 36 (refer to FIG. 3) and the nut member 37 (refer to FIG. 3) with the output shaft 22 of an assembly C10 illustrated in FIG. 57.

(1) As illustrated in FIG. 47A, first, the assembly apparatus (not illustrated) manufactures the assembly C1 at the assembly of the motor-driven power steering apparatus 101. At this time, first, the assembly apparatus inserts the upper end portion of the torsion bar 27 into the hollow portion of the input shaft 21. Subsequently, the assembly apparatus makes two holes 45B pass through the input shaft 21 into the interior of the torsion bar 27. For example, the two holes 45B are formed to face each other at the respective positions, each of which is separated from the upper end portion of the torsion bar 27 by approximately a half of an overall length of an inserted portion of the torsion bar 27 that is inserted into the hollow portion of the input shaft 21. Subsequently, two slider pins 27B are respectively press-fitted into the two holes 45B by the assembly apparatus. The assembly apparatus connects the upper end portion of the torsion bar 27 and the input shaft 21 in this manner. As a result, the assembly apparatus manufactures the assembly C1.

A lower end portion of the input shaft 21 is inserted into the output shaft 22, and thus an overlapping portion 50a (refer to FIG. 51) is formed by the lower end portion of the input shaft 21 and the upper end portion of the output shaft 22. The lower end portion of the input shaft 21 is provided with a non-circular cross-section portion 121A and a circular cross-section portion 121B.

The "non-circular cross-section portion 121A" has a non-circular cross section when seen in the axial direction (refer to FIGS. 46A to 46C). In contrast, the "circular cross-section portion 121B" has a circular cross section when seen in the axial direction (refer to FIGS. 46A to 46C).

FIG. 46B illustrates a cross-sectional configuration of the non-circular cross-section portion 121A when taken along line X1-X1 illustrated in FIG. 46A. FIG. 46C illustrates a cross-sectional configuration of the circular cross-section portion 121B when taken along line X2-X2 illustrated in FIG. 46A.

As illustrated in FIG. 46B, in the first embodiment, the non-circular cross-section portion 121A is formed by a two-surface width portion. The "two-surface width portion" indicates a portion provided with two flat surfaces in parallel with each other. For example, the non-circular cross-section portion 121A is a remaining portion which is obtained when two portions of an outer circumferential portion of a cylindrical member are cut away linearly in the axial direction in such a manner that two cut-away surfaces become the two flat surfaces in parallel with each other. Here, the cylindrical member has a diameter greater than that of the circular cross-section portion 121B. The non-circular cross-section portion 121A includes two protruding portions 21ba and 21bb which protrude radially outward from the circular cross-section portion 121B when seen in the axial direction.

The non-circular cross-section portion 121A (refer to FIG. 46B) is inserted into a circular hole 30a and circumferential holes 30ba and 30bb of an insertion hole 30 which will be described later (refer to FIG. 52A).

In contrast, the circular cross-section portion 121B (refer to FIG. 46C) is inserted into only the circular hole 30a of the insertion hole 30 which will be described later (refer to FIG. 52A). The "circular cross-section portion 121B" is equivalent to an "input shaft main body" that is described in the claims.

(2) As illustrated in FIG. 47A, the assembly apparatus manufactures an assembly C2 after the manufacturing of the assembly C1 is complete. At this time, first, two pins 28 are press-fitted into two holes by the assembly apparatus. Here, the two holes are formed to face each other in the vicinity of an upper end of the output shaft 22. Subsequently, the bearing 32A is press-fitted to the output shaft 22 by the assembly apparatus. Subsequently, the assembly apparatus screws a nut 29 onto the output shaft 22. Subsequently, the worm wheel 26 is press-fitted to the output shaft 22 by the assembly apparatus. The assembly apparatus manufactures the assembly C2 in this manner. It is possible to manufacture the assembly C2 concurrently with or before the manufacturing of the assembly C1.

The overlapping portion 50a (refer to FIG. 51) is formed by the upper end portion of the output shaft 22 and the lower end portion of the input shaft 21. The insertion hole 30 is formed inside the output shaft 22, and the respective lower end portions of the torsion bar 27 and the input shaft 21 are inserted into the insertion hole 30.

For example, the insertion hole 30 in the upper end portion of the output shaft 22 has a cross section illustrated in FIGS. 48A and 48B when seen in the axial direction. FIG. 48A illustrates a cross-sectional configuration of the insertion hole 30 when taken along line X3-X3 illustrated in FIG. 47. FIG. 48B illustrates a functional configuration of portions of the insertion hole 30.

As illustrated in FIG. 48B, in the overlapping portion 50a of the upper end portion of the output shaft 22, the insertion hole 30 includes the circular hole 30a that has a circular cross section when seen in the axial direction, and the circumferential holes 30ba and 30bb which extend radially outward from the circular hole 30a, and extend in a circumferential direction of the circular hole 30a.

The circular cross-section portion 121B, which is the input shaft main body, is inserted into the "circular hole 30a" (refer to FIG. 52A). In the overlapping portion 50a, the circular hole 30a functions as a bearing by which the circular cross-section portion 121B of the input shaft 21 is supported to be rotatable about the axis. The "circular hole 30a" is equivalent to an "insertion hole main body" that is described in the claims.

In contrast, the protruding portions 21ba and 21bb are inserted into the "circumferential holes 30ba and 30bb" (refer to FIG. 52A). The "circumferential holes 30ba and 30bb" restrict the respective circumferential operation ranges of the protruding portions 21ba and 21bb, thereby restricting a relative rotation range θr (refer to FIG. 52B).

(3) As illustrated in FIG. 49, the assembly apparatus manufactures an assembly C3 after the manufacturing of the assembly C2 is complete. At this time, first, the assembly apparatus assembles the assembly C2 into the second housing 113b. Subsequently, the assembly apparatus fixes an outer ring of the bearing 32A in the axial direction by tightening the nut 29. The assembly apparatus manufactures the assembly C3 in this manner.

(4) As illustrated in FIG. 50A, after the manufacturing of the assembly C3 is complete, the assembly apparatus manufactures an assembly C4 by assembling the core member 40 with the assembly C1. Subsequently, as illustrated in FIG. 50B, the assembly apparatus assembles the assembly C4 with the assembly C3 by inserting the respective lower end portions of the torsion bar 27 and the input shaft 21 of the assembly C4 into the insertion hole 30 formed in an upper end portion of the assembly C3, and thus an assembly C5 is manufactured. Subsequently, as illustrated in FIG. 50C, the assembly apparatus manufactures an assembly C6 by assembling the first housing 113a with an upper portion of the assembly C5.

At this time, for example, in the overlapping portion 50a (refer to FIG. 51) of the assembly C6, the input shaft 21 is oriented with respect to the axis of the output shaft 22 as illustrated in FIG. 52A or 52B.

Since the circular hole 30a of the output shaft 22 functions as a bearing by which the circular cross-section portion 121B of the input shaft 21 is supported to be rotatable about the axis, the input shaft 21 rotates about the circular hole 30a. At this time, the protruding portions 21ba and 21bb of the input shaft 21 move circumferentially inside the circumferential holes 30*ba* and 30*bb* of the output shaft 22. The respective wall surfaces of the circumferential holes 30*ba* and 30*bb* are in contact with the protruding portions 21*ba* and 21*bb*, thereby restricting the respective circumferential operation ranges of the protruding portions 21*ba* and 21*bb*. As a result, the relative rotation range θr (refer to FIG. 52B) of the input shaft 21 and the output shaft 22 is restricted.

Accordingly, the following functions as a rotation restriction portion 20 to restrict the relative rotation range θr (refer to FIG. 52B) of the input shaft 21 and the output shaft 22: the circular cross-section portion 121B and the protruding portions 21*ba* and 21*bb* formed in the overlapping portion 50*a* of the input shaft 21, and the circular hole 30*a* and the circumferential holes 30*ba* and 30*bb* formed in the overlapping portion 50*a* of the output shaft 22.

(5) After the manufacturing of the assembly C6 is complete, the assembly apparatus performs a process of placing the torque sensor 23 in a neutral position and a process of connecting the torsion bar 27 and the output shaft 22. Hereinafter, the processes will be described with reference to FIGS. 58, 51, and 52. FIG. 58 is a flowchart illustrating main assembly steps of the motor-driven power steering apparatus 101.

As illustrated in FIG. 58, first, the assembly apparatus non-rotatably and non-movably holds (fixes) the output shaft 22 of the assembly C6 using fixing means (not illustrated) (S110). Here, in S110, the assembly apparatus is assumed to hold the output shaft 22. However, in S110, the assembly apparatus can also hold the input shaft 21. At this time, in each step of S120, S150, S160, S170, and S180 which will be described later, the input shaft 21 and the output shaft 22, which are targets of an operation, are reversely interpreted.

Subsequently, the assembly apparatus detects a direction (orientation) (refer to FIG. 52A) of a counter-clockwise rotation limit of the input shaft 21 and a direction (orientation) (refer to FIG. 52B) of a clockwise rotation limit of the input shaft 21 while rotating the input shaft 21 about the axis in the clockwise and counter-clockwise directions (a direction of arrow A1 illustrated in FIG. 51) (S120).

FIG. 52A illustrates a state in which the protruding portions 21*ba* and 21*bb* of the input shaft 21 are respectively brought into contact with the respective wall surfaces of the circumferential holes 30*bb* and 30*ba* of the output shaft 22 when turning the input shaft 21 in the counter-clockwise direction. Hereinafter, a direction (orientation) of the input shaft 21 in this state is referred to as the "direction of the counter-clockwise rotation limit".

In contrast, FIG. 52B illustrates a state in which the protruding portions 21*ba* and 21*bb* of the input shaft 21 are respectively brought into contact with the respective wall surfaces of the circumferential holes 30*bb* and 30*ba* of the output shaft 22 when turning the input shaft 21 in the clockwise direction. Hereinafter, a direction (orientation) of the input shaft 21 in this state is referred to as the "direction of the clockwise rotation limit".

The assembly apparatus can detect the direction of the counter-clockwise rotation limit by placing the input shaft 21 in the state illustrated in FIG. 52A, and the direction of the clockwise rotation limit by placing the input shaft 21 in the state illustrated in FIG. 52B. Since the relative rotation range θr (refer to FIG. 52B) is an angle between the direction of the counter-clockwise rotation limit and the direction of the clockwise rotation limit, the assembly apparatus can easily calculate the relative rotation range θr based on the directions.

Here, a direction of the aligned respective orientations of the input shaft 21 and the output shaft 22 at the assembly indicates a direction of the input shaft 21 and the output shaft 22 in a neutral state about the axis. The direction of the input shaft 21 and the output shaft 22 in a neutral state about the axis indicates a direction in which a rotating shaft (here, the input shaft 21) out of the input shaft 21 and the output shaft 22 is turned from the direction of the counter-clockwise rotation limit in the clockwise direction (or, from the direction of the clockwise rotation limit in the counter-clockwise direction) by a medium angle (θr/2) of the relative rotation range.

Accordingly, when a set direction Se (refer to FIG. 52C) refers to the direction in which the input shaft 21 is turned from the direction of the counter-clockwise rotation limit in the clockwise direction (or, from the direction of the clockwise rotation limit in the counter-clockwise direction) by the medium angle (θr/2) of the relative rotation range, the assembly apparatus can easily align the respective orientations of the input shaft 21 and the output shaft 22 with each other at the assembly by aligning the orientation of the input shaft 21 with the set direction Se.

In the first embodiment, after step S120 is complete, the assembly apparatus calculates the relative rotation range θr (S130), defines the set direction Se (refer to FIG. 52C) based on the direction of the counter-clockwise rotation limit (or, the direction of the clockwise rotation limit) and the medium angle (θr/2) of the relative rotation range (S140), and rotates the input shaft 21 to be disposed in the set direction Se (S150).

Subsequently, the assembly apparatus holds (temporarily fixes) the input shaft 21 using fixing means (not illustrated) in order for the input shaft 21 not be rotatable about the axis and unmovable in the axial direction (S160).

Subsequently, the assembly apparatus moves the input shaft 21 in the axial direction (a direction of arrow A2 illustrated in FIG. 51) while measuring a voltage from the torque sensor 23 (refer to FIG. 3) (S170). Accordingly, the assembly apparatus defines a position (hereinafter, referred to as a "neutral voltage position") at which an output voltage of the torque sensor 23 becomes a neutral voltage. Subsequently, the assembly apparatus moves the input shaft 21 to be disposed at the neutral voltage position, and non-rotatably and non-movably holds (fixes) the input shaft 21 using the fixing means (not illustrated) (S180).

Here, the "neutral voltage position" indicates a state in which the detected portion (not illustrated) of the core member 40 is disposed at the center of the two detecting coils (not illustrated) of the torque sensor 23. When the core member 40 is disposed at the neutral voltage position, the output voltage of the torque sensor 23 becomes the neutral voltage. When the core member 40 moves in the axial direction in response to the rotation of the input shaft 21, the torque sensor 23 detects a movement direction and a movement distance of the core member 40, thereby detecting a twisting direction and a twisting angle of the torsion bar 27, and steering torque occurring in the torsion bar 27.

Subsequently, as illustrated in FIG. 51, the assembly apparatus makes two holes 45A in the output shaft 22 and the torsion bar 27 while non-rotatably and non-movably holding the input shaft 21 (S190).

At this time, the assembly apparatus makes the two holes 45A pass through the output shaft 22 into the interior of the torsion bar 27. The two holes 45A are formed to face each other at the respective positions, each of which is separated from the lower end portion of the torsion bar 27 by approximately a half of an overall length of an inserted portion of the torsion bar 27 that is inserted into the hollow portion of the output shaft 22.

Subsequently, two coupling pins 27A are press-fitted into the two holes 45A by the assembly apparatus (S200). Accordingly, the assembly apparatus connects the upper end portion of the torsion bar 27 and the input shaft 21.

The assembly apparatus performs the process of placing the torque sensor 23 in the neutral position and the process of connecting the torsion bar 27 and the output shaft 22 in this manner.

(6) After the process of placing the torque sensor 23 in the neutral position and the process of connecting the torsion bar 27 and the output shaft 22 are complete, as illustrated in FIG. 53, the collar 6 is press-fitted onto the output shaft 22 of the assembly C6 by the assembly apparatus, and an assembly C7 is manufactured. Subsequently, as illustrated in FIG. 54, the assembly apparatus assembles the bearing 32B onto the collar 6 of the assembly C7, and thus an assembly C8 is manufactured.

(7) As illustrated in FIG. 55, when the manufacturing of the assembly C8 is complete, the assembly apparatus assembles the third housing 113C with a lower portion of the assembly C8, and thus an assembly C9 is manufactured. Subsequently, the assembly apparatus assembles the worm gear 25 (refer to FIG. 3) with the assembly C9 (refer to FIG. 55).

(8) Subsequently, as illustrated in FIG. 56, the assembly apparatus assembles the electric motor 24, the upper holder 46, and the steering arm 161 with the second housing of the assembly C9, an upper portion of the assembly C9, and the output shaft 22, respectively. The assembly apparatus manufactures an assembly C10 in this manner (refer to FIG. 57). The joint 5 is assembled with the upper holder 46.

Thereafter, the assembly apparatus assembles the washer 36 (refer to FIG. 3) and the nut member 37 (refer to FIG. 3) onto the output shaft 22 of the assembly C10. The assembly apparatus manufactures the motor-driven power steering apparatus 101 in this manner.

The motor-driven power steering apparatus 101 with this configuration has the rotation restriction portion 20 (refer to FIG. 52) in the overlapping portion 50a (refer to FIG. 51). Since the rotation restriction portion 20 restricts the relative rotation range of the input shaft 21 and the output shaft 22 at the assembly, the motor-driven power steering apparatus 101 easily obtains the relative rotation range θr (refer to FIG. 52B) of the input shaft 21 and the output shaft 22 by rotating the input shaft 21 and the output shaft 22 in the clockwise and counter-clockwise directions.

When the set direction Se (refer to FIG. 52C) refers to the direction in which the input shaft 21 is turned from the direction of the counter-clockwise rotation limit in the clockwise direction (or, from the direction of the clockwise rotation limit in the counter-clockwise direction) by the medium angle (θr/2) of the relative rotation range, the assembly apparatus of the motor-driven power steering apparatus 101 can easily align the respective orientations of the input shaft 21 and the output shaft 22 with each other at the assembly by aligning the orientation of a rotating shaft (here, the input shaft 21) with the set direction Se. For this reason, the motor-driven power steering apparatus 101 can easily align the respective orientations of the input shaft 21 and the output shaft 22 with each other without using a jig at the assembly.

As illustrated in FIGS. 2 and 3, the motor-driven power steering apparatus 101 includes the input shaft 21 that is connected to the steering shaft 4 connected to the steering handlebars (the handlebars 2); the torsion bar 27; the output shaft 22 that is connected to the input shaft 21 via the torsion bar 27; the torque sensor 23 that detects a steering state of the handlebars 2; the electric motor 24; an electronic control unit (ECU, controller, and not illustrated) that controls the electric motor 24 based on a detection signal from the torque sensor 23; a torque transmission mechanism 26 that transmits the generated torque of the electric motor 24 to the output shaft 22; the housing 113; and the arm stopper mechanism 160.

In FIG. 3, the housing 113 is a substantially cylindrical body made of metal, and is configured when the first housing 113a, the second housing 113b, and the third housing 113c disposed in sequence from the top are assembled together. The input shaft 21 is connected to the steering shaft 4 via the joint 5, and is turnably supported by the first housing 113a via the bearing 31. The output shaft 22 is turnably supported by the second housing 113b and the third housing 113c via the bearings 32A and 32B. The steering arm 161 of the arm stopper mechanism 160 is attached to the vicinity of the lower end of the output shaft 22. The torsion bar 27 is serration-joined to the input shaft 21 with the upper end of the torsion bar 27 inserted into the hollow portion of the input shaft 21. The coupling pin 27A connects the torsion bar 27 and the output shaft 22 with the lower end of the torsion bar 27 inserted into the hollow portion of the output shaft 22.

The torque sensor 23 includes two detecting coils 23A and 23B in the first housing 113a, and the detecting coils 23A and 23B surround a cylindrical core 23C engaged with the input shaft 21 and the output shaft 22. The core 23C includes a vertical groove 23E engaged with a guide pin 23D of the output shaft 22, and thus is movable only in the axial direction. In addition, the core 23C includes a spiral groove 23G engaged with a slider pin 23F of the input shaft 21.

Accordingly, when steering torque applied to the handlebars 2 (refer to FIG. 1) is transmitted to the input shaft 21, and a relative rotational displacement between the input shaft 21 and the output shaft 22 occurs due to an elastic twisting deformation of the torsion bar 27, the respective rotational displacements of the input shaft 21 and the output shaft 22 are converted into an axial displacement of the core 23C. The displacement of the core 23C causes a magnetic change in the surroundings of the detecting coils 23A and 23B, and the inductance of the detecting coils 23A and 23B changes due to the magnetic change. That is, when the core 23C moves toward the input shaft 21, the inductance of the detecting coil 23A close to the core 23C increases, and the inductance of the detecting coil 23B distant from the core 23C decreases, and thus it is possible to detect steering torque based on a change in inductance.

As illustrated in FIG. 2, the electric motor 24 is attached to a motor attachment seat 113d of the second housing 113b, using a mounting bolt 30. In FIG. 3, the torque transmission mechanism 26 includes a worm 28 attached to a motor output shaft 24B of the electric motor 24, and a worm wheel 29 that is attached to the output shaft 22 and meshes with the worm 28.

CL1
Worm Wheel

As illustrated in FIGS. 61 and 62, the worm wheel 29 includes a hub portion 29a (inner hub) disposed on a radially inner side, and a ring-shaped gear toothed portion 29b that is fixed to a radially outer side of the hub portion 29a and has gear teeth formed on an outer circumferential surface of a gear toothed portion 29b. The hub portion 29a and the gear toothed portion 29b are made of resin, for example, ABS resin or amide resin.

Accordingly, the worm wheel 29 has mass smaller than that of a worm wheel having a metallic core in the related art, and thus has a reduced weight and low inertia. Accordingly, for example, it is possible to quickly switch the state of the worm wheel 29 from a stop state to a rotation state, and torque is quickly transmitted from the electric motor 24 to the worm wheel 29.

A radially outer end of the hub portion 29a is embedded in the gear toothed portion 29b, and the hub portion 29a and the gear toothed portion 29b are integrated by a bicolor molding method. The hub portion 29a and the gear toothed portion 29b may be integrally molded.

CL2

The hub portion 29a is serration-joined to the output shaft 22. That is, a serration hole 29c is formed on a center axis line of the hub portion 29a, and a serration shaft 22a is formed on an outer circumferential surface of the output shaft 22. Here, since the hub portion 29a is made of resin, and thus the hub portion 29a is likely to slightly deform compared the metallic hub portion 29a, it is easy to assemble the hub portion 29a onto the metallic output shaft 22.

Since the hub portion 29a and the output shaft 22 are serration-joined together, the hub portion 29a and the output shaft 22 are not offset from each other in the axial direction and a circumferential direction. Accordingly, torque is transmitted well to the output shaft 22 from the electric motor 24 via the hub portion 29a. The hub portion 29a may be molded integrally with the output shaft 22 by injecting melted resin to the surroundings of the serration shaft 22a of the output shaft 22.

A method of fixing the hub portion 29a to the output shaft 22 is not limited to that in the embodiment. For example, (1) a rotation stop portion (surface) such as knurling may be formed on the outer circumferential surface of the output shaft 22, and the rotation stop portion may be press-fitted into the hub portion 29a, or (2) the hub portion 29a and the output shaft 22 may be spline-joined together.

In the motor-driven power steering apparatus 101 with this configuration, the torque sensor 23 detects steering torque applied to the handlebars 2, and the ECU controls the electric motor 24 based on a detection signal from the torque sensor 23. The generated torque of the electric motor 24 is transmitted to the output shaft 22 via the worm 28 and the worm wheel 29. Accordingly, the generated torque of the electric motor 24 is transmitted to the output shaft 22 as an assist force for the steering force applied to the handlebars 2 by the driver.

Two right and left attachment holes 162d vertically pass through a trapezoidal portion 162a (refer to FIG. 63A). The attachment hole 162d has a circular cross section, and the attachment holes 162d are disposed to be bilaterally symmetrical about the center line L162 of the stopper 162.

When the stopper 162 is placed on a lower surface of a flange portion 113d of the housing 113, the attachment holes 162d communicate with screw holes 113b (refer to FIG. 63A) of the flange portion 113d, respectively.

As illustrated in FIG. 63A, it is possible to fix the stopper 162 to the flange portion 113d by inserting the respective shaft portions of bolts B1 into the attachment holes 162d from a lower surface of the stopper 162, respectively, and screwing the respective tip portions of the bolt B1 into the respective screw holes 113b of the flange portion 113d, respectively.

As such, the stopper 162 and the housing 113 are separate members, and as illustrated in FIG. 63A, the stopper 162 is attached to the housing 113, using two bolts B1.

Male screw members B2 for connecting the stopper 162 to the vehicle body (not illustrated) protrude from the respective front end surfaces of support portions 162c, respectively. Since the male screw members B2 are fixed to the vehicle body, the stopper 162 can be stabilized.

As illustrated in FIGS. 2 and 3, the motor-driven steering apparatus 101 includes the input shaft 21 that is connected to the steering shaft 4 connected to the steering handlebars (the handlebars 2); the torsion bar 27; the output shaft 22 that is connected to the input shaft 21 via the torsion bar 27; the torque sensor 23 that detects a steering state of the handlebars 2; the electric motor 24; the controller (referred to as the electronic control unit (ECU)) 25 that controls the electric motor 24 based on a detection signal from the torque sensor 23; the torque transmission mechanism 26 that transmits the generated torque of the electric motor 24 to the output shaft 22; the housing 113; and the arm stopper mechanism 160.

In FIG. 3, the housing 113 includes the first housing 113a, the second housing 113b, and the third housing 113c which are disposed in sequence from the top. The input shaft 21 is connected to the steering shaft 4 via the joint 5, and is turnably supported by the first housing 113a via the bearing 31. The output shaft 22 is turnably supported by the second housing 113b and the third housing 113c via the bearings 32A and 32B. The steering arm 161 of the arm stopper mechanism 160 is attached to the vicinity of the lower end of the output shaft 22. The torsion bar 27 is serration-joined to the input shaft 21 with the upper end of the torsion bar 27 inserted into the hollow portion of the input shaft 21. The coupling pin 27A connects the torsion bar 27 and the output shaft 22 with the lower end of the torsion bar 27 inserted into the hollow portion of the output shaft 22.

The torque sensor 23 includes the two detecting coils 23A and 23B in the first housing 113a, and the detecting coils 23A and 23B surround the cylindrical core 23C engaged with the input shaft 21 and the output shaft 22. The core 23C includes the vertical groove 23E engaged with the guide pin 23D of the output shaft 22, and thus is movable only in the axial direction. In addition, the core 23C includes the spiral groove 23G engaged with the slider pin 23F of the input shaft 21. Accordingly, when steering torque applied to the handlebars 2 (refer to FIG. 1) is transmitted to the input shaft 21, and a relative rotational displacement between the input shaft 21 and the output shaft 22 occurs due to an elastic twisting deformation of the torsion bar 27, the respective rotational displacements of the input shaft 21 and the output shaft 22 are converted into an axial displacement of the core 23C. The displacement of the core 23C causes a magnetic change in the surroundings of the detecting coils 23A and 23B, and the inductance of the detecting coils 23A and 23B changes due to the magnetic change. That is, when the core 23C moves toward the input shaft 21, the inductance of the detecting coil 23A close to the core 23C increases, and the inductance of the detecting coil 23B distant from the core 23C decreases, and thus it is possible to detect steering torque based on a change in inductance.

As illustrated in FIG. 2, the electric motor 24 is attached to the motor attachment seat 113d of the second housing 113b, using the mounting bolt 30. In FIG. 3, the torque transmission mechanism 26 includes the worm 28 attached to the output shaft 24B of the electric motor 24, and the worm wheel 29 that is attached to the output shaft 22 and meshes with the worm 28.

In the motor-driven steering apparatus 101 with this configuration, the torque sensor 23 detects steering torque applied to the handlebars 2, and a controller 25 controls the electric motor 24 based on a detection signal from the torque sensor 23. The generated torque of the electric motor 24 is transmitted to the output shaft 22 via the worm 28 and the worm wheel 29. Accordingly, the generated torque of the electric motor 24 is transmitted to the output shaft 22 as an assist force for the steering force applied to the handlebars 2 by the driver.

For example, the controller 25 includes a CPU board with a microcomputer and peripheral circuits mounted thereon; a power supply board with power supply elements mounted thereon; a connector portion connected to the outside, and the like. In the present invention, the controller 25 is accommodated in a case 24A of the electric motor 24, which is not illustrated. The controller 25 is also connected to a battery or vehicle-side control equipment which is not illustrated.

Since the controller 25 is accommodated in the case 24A of the electric motor 24, as in the related art, it is not necessary to secure a space for disposing the controller 25 separate from the electric motor 24. Accordingly, it is possible to remove a space for the disposition of the controller 25. Since the controller 25 is protected by the case 24A of the electric motor 24, it is not necessary to provide a separate protective case dedicated to the controller 25, and it is possible to reduce the weight to that extent.

Since a connection portion between the controller 25 and the electric motor 24 is accommodated in the case 24A, unlike the related art, a motor harness for connecting the controller 25 and the electric motor 24 is not exposed to the outside. Accordingly, it is possible to omit a motor harness routing operation. Since the motor harness is not exposed to the outside, it is possible to prevent the harness and the like from being damaged in severe usage conditions of the saddle riding type vehicle 100.

Since a detection signal harness (not illustrated) for connecting the controller 25 and the torque sensor 23 is also shortened, a detection torque signal harness routing operation becomes simplified.

As described above, in the arm stopper mechanism 160 according to the first embodiment, it is possible to reduce a value of the bending load vector Wt applied to the output shaft 22. Accordingly, it is possible to reduce a load applied to the bearings 32A and 32B that support the output shaft 22; the bearing 31 (refer to FIG. 3) that supports the input shaft 21 which is connected to the output shaft 22 via the torsion bar 27; and the housing 113 (refer to FIG. 3) at the surroundings of the bearings 32A, 32B, and 31. Since a bending load is prevented from being applied to the output shaft 22, the bending load as a strong reaction force does not propagate to the handlebars 2, and thus it is possible to improve the controllability of the handlebars 2. It is possible to reduce the size of the steering arm 161.

The mounting of the arm stopper mechanism 160 on the motor-driven power steering apparatus 101 can improve the controllability of the handlebars 2.

Second Embodiment

In the arm stopper mechanism 160 according to the first embodiment, the striking surfaces 176 are respectively provided in the side portions of the main body (the portion for the attachment of the tie rods 8) of the steering arm 161. In the steering arm 161, the striking portions 174 respectively provided with the striking surface 176 project outward (in a turning direction) so as to define the maximum steering angle of the handlebars 2.

In contrast, in a second embodiment, an arm stopper mechanism 260 has a configuration in which the striking portions do not project outward.

Configuration of Arm Stopper Mechanism According to Second Embodiment

Figure 12:
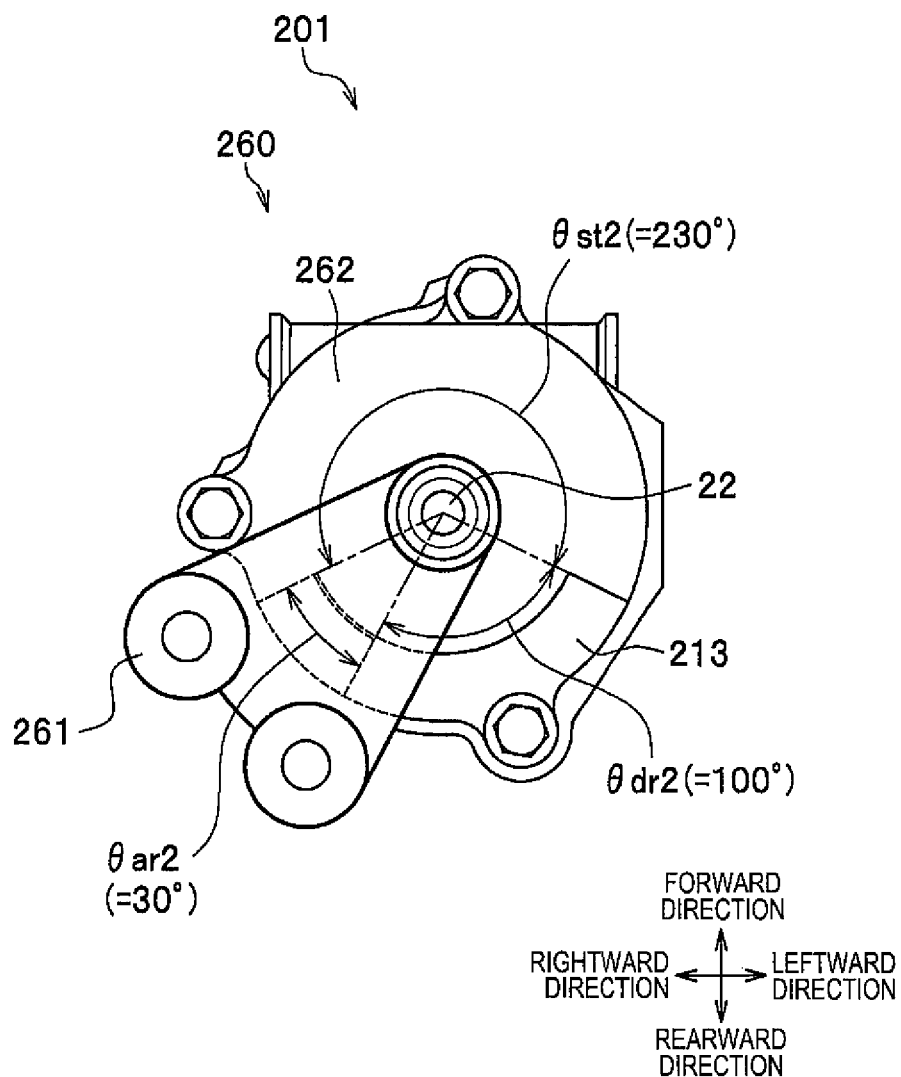
FIG. 12 is a schematic configuration view of the arm stopper mechanism according to a second embodiment, when seen from below.
Figure 13:
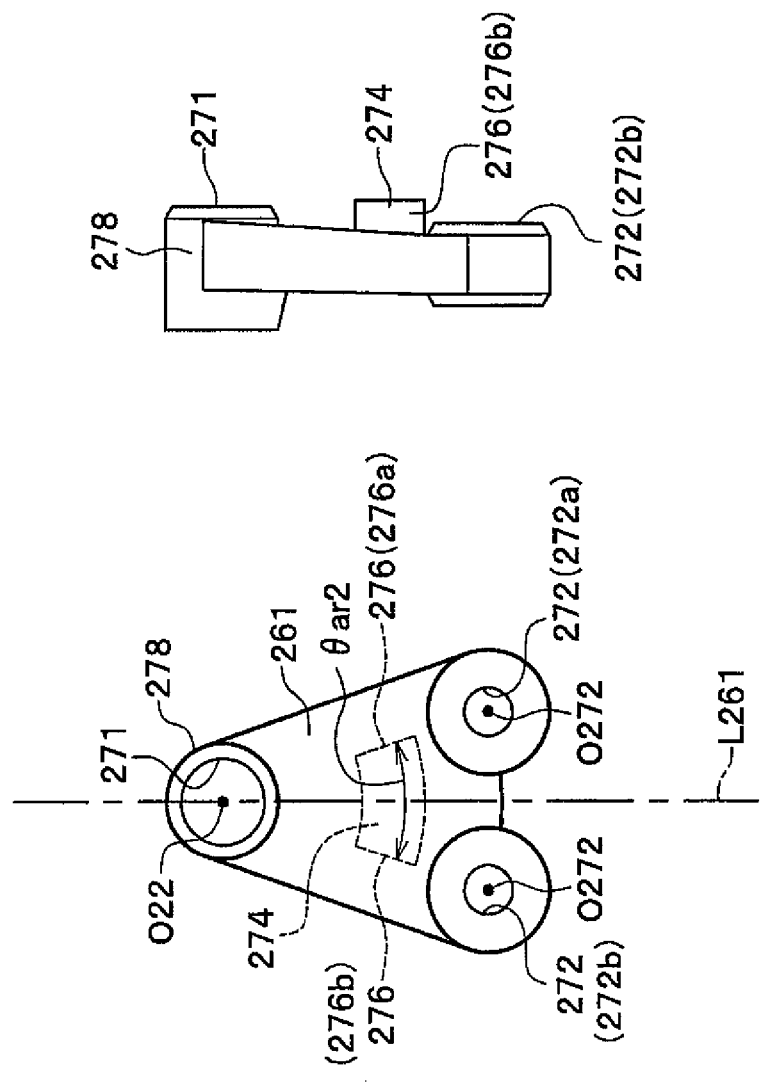
FIGS. 13A, 13B and 13C are schematic configuration views of a steering arm of the arm stopper mechanism according to the second embodiment, when seen from below.
Figure 14:
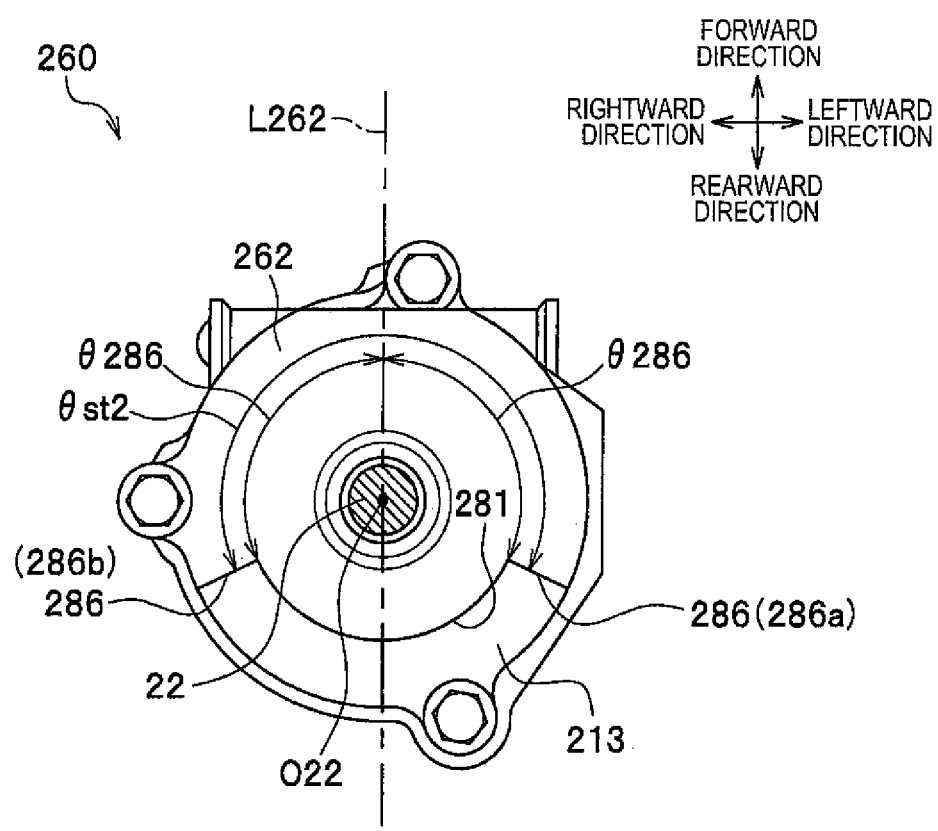
FIG. 14 is a schematic configuration view of a stopper of the arm stopper mechanism according to the second embodiment, when seen from below.

Hereinafter, the configuration of the arm stopper mechanism 260 according to the second embodiment will be described with reference to FIGS. 12 to 14. FIG. 12 is a schematic configuration view of the arm stopper mechanism 260 when seen from below. FIGS. 13A to 13C are schematic configuration views of a steering arm 261 of the arm stopper mechanism 260 when seen from below. FIG. 13A illustrates the configuration of portions of the steering arm 261, FIG. 13B illustrates the configuration of the steering arm 261 when seen from the side direction, and FIG. 13C illustrates the respective disposition positions of the portions of the steering arm 261. FIG. 14 is a schematic configuration view of a stopper 262 of the arm stopper mechanism 260 when seen from below. FIG. 14 illustrates the configuration of portions of the stopper 262.

FIG. 12 illustrates the configuration of the arm stopper mechanism 260 when seen from below. As illustrated in FIG. 12, the arm stopper mechanism 260 includes the steering arm 261 that rotates about the output shaft 22.

As illustrated in FIG. 13B, the entirety of a main body (a portion for the attachment of the tie rods 8) of the steering arm 261 has a plate shape. As illustrated in FIGS. 12 and 13A, the steering arm 261 has a folding fan shape which is deployed at an acute angle when seen from below. As illustrated in FIGS. 13A to 13C, the steering arm 261 has a shape in which an output shaft hole 271 is disposed at a pivot (a center axis) of a folding fan, and two tie rod holes 272a and 272b are disposed close to opposite wings in the vicinity (an outer circumferential edge) of a free end of the folding fan. Hereinafter, the tie rod holes 272a and 272b are generically referred to as a "tie rod hole 272".

The output shaft 22 is fitted into the output shaft hole 271, and thus a center point of the output shaft hole 271 coincides with the center point O22 of the output shaft 22. Hereinafter, the center point of the output shaft hole 271 is referred to as the "center point O22".

The tie rod holes 272a and 272b are respectively disposed at the same distances leftward and rightward from a center line L261 of the steering arm 261. In the example illustrated in FIG. 13C, a center point O272 of each of the tie rod holes 272a and 272b is disposed rearward from the center point O22 of the output shaft hole 271, and at a distance H272 rightward and leftward from the center line L261 of the steering arm 261.

Here, the "center line L261 of the steering arm 261" is an imaginary straight line that passes through the center point O22 of the output shaft hole 271 and extends in the longitudinal direction. When the steering angle of the handlebars 2 is 0°, the "center line L261 of the steering arm 261" coincides with a "center line L262 (refer to FIG. 14) of the stopper 262" which will be described later. The "center line L262 of the stopper 262" is a center line (an imaginary straight line that passes through the center point of the vehicle in the lateral direction and extends in the longitudinal direction of the vehicle) of the entirety of the vehicle.

The steering arm 261 includes a circular arc portion 278 by which the output shaft hole 271 is surrounded in a circular arc shape. The steering arm 261 includes a protruding portion 274 that protrudes upward from the vicinity of a center of an upper surface of the main body (the portion for the attachment of the tie rods 8) of the steering arm 261, and the protruding portion 274 functions as a striking portion that strikes against the stopper 262. Hereinafter, the protruding portion 274 is referred to as a "striking portion 274".

Side portions of the striking portion 274 are respectively formed by flat surfaces 276a and 276b, and the flat surfaces 276a and 276b function as the striking surfaces that strike against the stopper 262. Hereinafter, the flat surface 276a is referred to as a "striking surface 276a", and the flat surface 276b is referred to as a "striking surface 276b". The striking surfaces 276a and 276b are generically referred to as a "striking surface 276".

In FIG. 13C, a line L276a is a straight line that is imaginarily disposed along the striking surface 276a. A line L276b is a straight line that is imaginarily disposed along the striking surface 276b.

In contrast, the stopper 262 is provided to protrude downward from a lower surface of a housing 213 of a motor-driven power steering apparatus 201. As illustrated in FIG. 14, when seen from below, the stopper 262 has a substantially circular arc shape which is obtained when a cut-away portion 281 is cut away from the stopper 262. Here, the cut-away portion 281 has a circular arc shape having the center point O22 of the output shaft 22 as its center. In the stopper 262, end surfaces 286a and 286b function as the contact surfaces, and are formed when the cut-away portion 281 is cut away. Hereinafter, the end surface 286a is referred to as a "contact surface 286a", and the end surface 286b is referred to as a "contact surface 286b". The contact surfaces 286a and 286b are generically referred to as a "contact surface 286".

Here, the "center line L262 of the stopper 262" is an imaginary straight line that passes through the center point O22 of the output shaft 22 and extends in the longitudinal direction. The "center line L262 of the stopper 262" is the center line of the entirety of the vehicle.

As can be understood from the characteristics of the arm stopper mechanism 60 according to the comparative example illustrated in FIGS. 21A to 21C, when an angle θ276 formed by the center line L261 and the striking surface 276 of the steering arm 261 is set to decrease, or an angle θ286 formed by the center line L262 and the contact surface 286 of the stopper 262 is set to increase, the arm stopper mechanism 260 can increase the angle θhb formed by the respective directions of the input load vector Wh and the striking load vector Wb. Accordingly, in the arm stopper mechanism 260, the direction of the input load vector Wh and the striking load vector Wb can be applied to cancel out each other, and thus it is possible to reduce a value of the bending load vector Wt applied to the output shaft 22.

In the steering arm 261 of the arm stopper mechanism 260, the angle θ276 formed by the center line L261 of the steering arm 261 and the striking surface 276 is set to be smaller than the angle θ76 of the steering arm 61 of the arm stopper mechanism 60 according to the comparative example. That is, in the stopper 262 of the arm stopper mechanism 260, the angle θ286 formed by the center line L262 of the stopper 262 and the contact surface 286 is set to be smaller than the angle θ86 (refer to FIG. 21A) of the stopper 62 of the arm stopper mechanism 60 according to the comparative example.

The arm stopper mechanism 260 is required to restrict the handlebars 2 such that the handlebars 2 are not turned to the maximum steering angle or greater in order for the vehicle not to roll over in the lateral direction. For this reason, for example, in the steering arm 261 of the arm stopper mechanism 260, when the respective optimum disposition angles of the striking surfaces 276 with respect to the center line L261 are set to be the tilt angle θ276 of imaginary straight lines L276a and L276b with respect to the center line L261, an allowable design tilt angle with respect to the angle θ276 is set to be an angle θβ (for example, 5°) so as to define the maximum steering angle of the handlebars 2. Here, the imaginary straight lines L276a and L276b connect the respective center points O272 of the tie rod holes 272 and the center point O22 of the output shaft hole 271, respectively.

In the arm stopper mechanism 260, in order to satisfy these conditions, the striking surfaces 276a and 276b of the steering arm 261 are disposed to tilt at an angle $(\theta276\pm\theta\beta)°$ in opposite directions with respect to the center line L261, having the center point O22 of the output shaft hole 271 as its center. That is, an angle (an angle between two striking surfaces 276a and 276b, and an angle formed in the steering arm 261) θar2 formed by the striking surfaces 276a and 276b of the steering arm 261 is set to be an angle $(2\times(\theta276\pm\theta\beta))°$.

For example, FIG. 12 illustrates the configuration of the arm stopper mechanism 260 when the tilt angle θ276 of the straight lines L276a and L276b is set to be 15° (that is, the angle θar2 formed by the striking surfaces 276a and 276b (refer to FIG. 3) of the steering arm 261 is set to be 30°), and the allowable tilt angle θβ is set to be 0°. In the arm stopper mechanism 260 of the example illustrated in FIG. 12, the angle θar2 formed by the striking surfaces 276a and 276b (refer to FIGS. 13A to 13C) of the steering arm 261 is set to be 30°. An angle θst2 (an angle between two contact surfaces 286a and 286b, and an angle formed in the stopper 262) formed by the contact surfaces 286a and 286b (refer to FIG. 14) of the stopper 262 is set to be 230°. A total angle θdr2 is set to be 100°. Here, the total angle θdr2 is obtained by summing the clockwise and counter-clockwise maximum steering angles of the steering arm 261.

Figure 15:
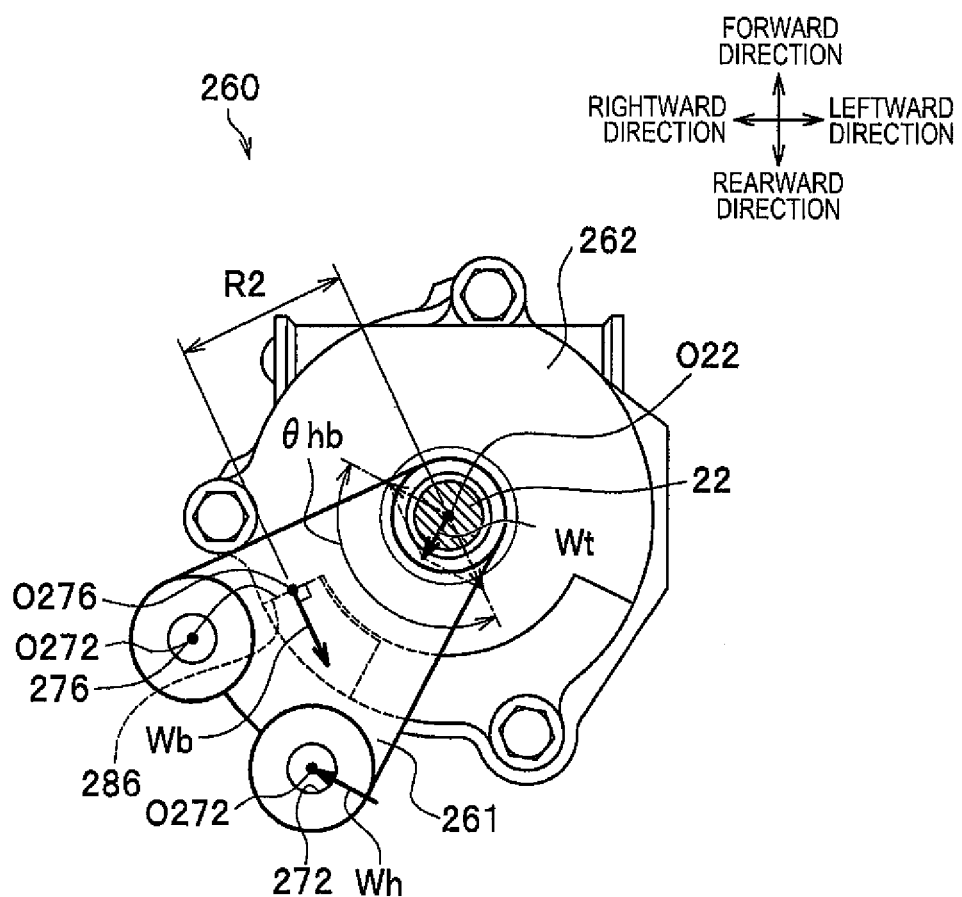
FIG. 15 is a description view illustrating load vectors applied to main portions of the arm stopper mechanism according to the second embodiment.

Load Vectors Applied to Main Portions of Arm Stopper Mechanism According to Second Embodiment Hereinafter, load vectors applied to main portions of the arm stopper mechanism 260 will be described with reference to FIG. 15. FIG. 15 is a description view illustrating the load vectors applied to the main portions of the arm stopper mechanism 260.

Here, the "input load vector Wh" refers to a load vector which is input to the steering arm 261 from the wheels 9 (refer to FIG. 2) via the tie rod holes 272, the "striking load vector Wb" refers to a load vector that is applied to the striking surface 276 of the steering arm 261 from the contact surface 286 of the stopper 262, and the "bending load vector Wt" refers to a load vector that is applied to the output shaft 22 fitted into the output shaft hole 271 (refer to FIG. 13A).

Here, a "striking center position O276" refers to a center position of a contact portion between the striking surface 276 of the steering arm 261 and the contact surface 286 of the stopper 262, and the striking load vector Wb is applied to the striking center position O276. In the example illustrated in FIG. 15, the striking center position O276 is set to be positioned between the center point O22 of the output shaft 22 and the center point O272 of the tie rod hole 272, and at a distance R2 from the center point O22 of the output shaft 22.

In a case described here, as illustrated in FIG. 15, the handlebars 2 are turned to the counter-clockwise maximum steering angle in order for the saddle riding type vehicle 100 to turn left to the maximum while the saddle riding type vehicle 100 is traveling, and thus the right striking surface 276 of the steering arm 261 strikes against the right contact surface 286 of the stopper 262, and the rear side of the side surface of the left wheel (the left front wheel) 9 collides with the protrusion 511 (refer to FIG. 6). At this time, as illustrated in FIG. 15, in the arm stopper mechanism 260, the input load vector Wh is applied to the surroundings of the left tie rod hole 272, and the striking load vector Wb is applied to the striking center position O276. The bending load vector Wt is applied to the output shaft 22, and is a combined vector of the input load vector Wh and the striking load vector Wb.

A value of the bending load vector Wt is a value of a combined vector of the input load vector Wh and the striking load vector Wb. When the striking surface 276 of the steering arm 261 is in contact with the contact surface 286 of the stopper 262, a direction of the input load vector Wh is determined by the attachment direction of the tie rod 8 (refer to FIG. 2) attached to the tie rod hole 272. A direction of the striking load vector Wb is perpendicular to the striking surface 276 of the steering arm 261.

In the arm stopper mechanism 260, since the steering arm 261 and the stopper 262 are configured as described above, the input load vector Wh and the striking load vector Wb are applied to cancel out each other. For this reason, the arm stopper mechanism 260 can reduce a value of the bending load vector Wt applied to the output shaft 22 further than the arm stopper mechanism 60 according to the comparative example. For this reason, the arm stopper mechanism 260 can prevent a bending load from being applied to the output shaft 22.

In the arm stopper mechanism 260, in particular, a value of the bending load vector Wt applied to the output shaft 22 is preferably set to be smaller than or equal to a value of a combined vector when is obtained when the input load vector Wh is orthogonal to the striking load vector Wb. Accordingly, the arm stopper mechanism 260 can considerably reduce a value of the bending load vector Wt applied to the output shaft 22, and thus can efficiently prevent a bending load from being applied to the output shaft 22.

In the present invention, similar to the arm stopper mechanism 160 (refer to FIG. 29) according to the first embodiment, the actual arm stopper mechanism 260 includes the attachment position varying mechanism 670A and the like (refer to FIG. 35).

Hereinafter, the configuration of the attachment position varying mechanism 670A of the arm stopper mechanism 260 will be described with reference to FIG. 35. FIG. 35 is a schematic configuration view of the attachment position varying mechanism 670A provided in the arm stopper mechanism 260 according to the second embodiment.

As illustrated in FIG. 35, the steering arm 261 is provided with the tie rod holes 272. The tie rod hole 272 is formed by the slender hole 672 that extends radially with respect to the output shaft hole 271. Accordingly, in the arm stopper mechanism 260, it is possible to move the tie rod 8 along the longitudinal direction of the slender hole 672, and fix the tie rod 8 at an arbitrary position. As a result, in the arm stopper mechanism 260, it is possible to change the distance from the output shaft 22 to the attachment position of the tie rod 8.

The steering arm 261 has a size smaller than that of the steering arm 161 according to the first embodiment. For this reason, when the slender hole 672 is set to excessively increase in a longitudinal length, the strength of the steering arm 261 may decrease. The steering arm 261 preferably includes protruding portions 691 in such a manner that it is possible to sufficiently secure the strength of the steering arm 261 even when the slender hole 672 is set to excessively increase in a longitudinal length. The protruding portion 691 is provided to protrude from a rear end portion of the steering arm 261 in the longitudinal direction of the slender hole 672. Accordingly, it is possible to sufficiently secure the strength of the steering arm 261.

In the arm stopper mechanism 260 with this configuration, similar to the arm stopper mechanism 160 according to the first embodiment, it is possible to change the distance from the output shaft 22 to the attachment position of the tie rod 8 via the attachment position varying mechanism 670A. As a result, in the arm stopper mechanism 260, it is possible to obtain steering characteristics adapted for various road surface conditions or various course characteristics.

The steering arm 261 can include the circular holes 673 as illustrated in FIG. 30, or the holes 674 as illustrated in FIG. 31 instead of the slender holes 672. That is, the arm stopper mechanism 260 can include the attachment position varying mechanism 670B or the attachment position varying mechanism 670C instead of the attachment position varying mechanism 670A.

Similar to the arm stopper mechanism 160B (refer to FIGS. 32 to 34B) according to the first embodiment, the arm stopper mechanism 260 can include the attachment position varying mechanism 680 (refer to FIG. 36).

Hereinafter, the configuration of the attachment position varying mechanism 680 of the arm stopper mechanism 260 will be described with reference to FIG. 36. Here, an "arm stopper mechanism 260B" refers to the arm stopper mechanism 260 with the attachment position varying mechanism 680, and a "steering arm 261B" refers to the steering arm 261 of the arm stopper mechanism 260B. FIG. 36 is a schematic configuration view of the attachment position varying mechanism 680 provided in the arm stopper mechanism 260B according to the second embodiment.

As illustrated in FIG. 36, the steering arm 261B is provided with a slender hole 681. The slender hole 681 is positioned further rearward from the output shaft hole 271, and extends along the center line L261 of the steering arm 261B in the longitudinal direction. The connecting member 682 is connected to the slender hole 681, using the fixing bolt 683. The slender hole 681, the connecting member 682, and the fixing bolt 683 are configured as illustrated in FIGS. 34A and 34B.

When the connecting member 682 is moved to a furthest forward position and is connected to the slender hole 681, the front end of the slender hole 681 is set at the position in which the steering arm 261B is turnable in the clockwise and counter-clockwise directions while the tie rods 8 respectively attached to the tie rod holes 772 are not in contact with the housing 213. In contrast, the rear end of the slender hole 681 is set to be arbitrarily positioned at an outer circumferential edge of a rear end portion of the steering arm 261B.

The steering arm 261B has a size smaller than that of the steering arm 161 according to the first embodiment. For this reason, when the slender hole 681 is set to excessively increase in a longitudinal length, the strength of the steering arm 261B may decrease. For example, the rear end portion of the steering arm 261B forms an extending portion 692 that extends rearward than that of the steering arm 261 illustrated in FIG. 29, and thus it is possible to sufficiently secure the strength of the steering arm 261B even when the slender hole 681 is set to excessively increase in a longitudinal length. Accordingly, even when the slender hole 681 is set to excessively increase in a longitudinal length, it is possible to sufficiently secure the strength of the steering arm 261B.

In the arm stopper mechanism 260B with this configuration, similar to the arm stopper mechanism 160B (refer to FIGS. 32 to 34B) according to the first embodiment, it is possible to change the distance from the output shaft 22 to the attachment position of the tie rod 8 via the attachment position varying mechanism 680. As a result, in the arm stopper mechanism 260B, it is possible to obtain steering characteristics adapted for various road surface conditions or various course characteristics.

As described above, in the arm stopper mechanism 260 according to the second embodiment, similar to the arm stopper mechanism 160 according to the first embodiment, it is possible to reduce a value of the bending load vector Wt applied to the output shaft 22. Accordingly, it is possible to reduce a load applied to the bearings 32A and 32B that support the output shaft 22; the bearing 31 (refer to FIG. 3) that supports the input shaft 21 which is connected to the output shaft 22 via the torsion bar 27; and the housing 113 (refer to FIG. 3) at the surroundings of the bearings 32A, 32B, and 31. Since a bending load is prevented from being applied to the output shaft 22, the bending load as a strong reaction force does not propagate to the handlebars 2, and thus it is possible to improve the controllability of the handlebars 2.

In the arm stopper mechanism 260, since the striking portion 274 of the steering arm 261 does not project outward (in the turning direction), the arm stopper mechanism 260 can have a size smaller than that of the arm stopper mechanism 160 according to the first embodiment.

The mounting of the arm stopper mechanism 260 on the motor-driven power steering apparatus 201 can improve the controllability of the handlebars 2.

The present invention is not limited to the embodiments, and can be modified in various forms insofar as the modifications do not depart from the scope of the present invention.

For example, the present invention can also be applied to a steering apparatus with a non-power assist configuration (that is, a configuration without the electric motor 24).

Supplementary Note

An arm stopper mechanism according to the present invention preferably has a steering arm which rotates about an output shaft of a steering apparatus, and to which two tie rods respectively connected to wheels are attached; and a stopper that is provided at the surroundings of the output shaft, and restricts the turning angle of the steering arm. The steering arm preferably includes an output shaft hole into which the output shaft is fitted; two tie rod holes to which the tie rods are respectively attached; and two striking surfaces that strike against the stopper. The stopper preferably includes two contact surfaces that are respectively brought into contact with the two striking surfaces of the steering arm. When any one of the two striking surfaces of the steering arm strikes against the contact surface of the stopper, the striking surfaces are preferably configured in such a manner that an input load vector input from the distant tie rod hole and a striking load vector applied to the striking surface are applied to cancel out each other. The two striking surfaces are preferably disposed in such a manner that a bending load vector applied to the output shaft fitted into the output shaft hole is set to be smaller than or equal to a value of a combined vector of the input load vector and the striking load vector when the input load vector is orthogonal to the striking load vector. A direction of the input load vector is determined by an attachment direction of the tie road attached to the tie rod hole. A direction of the striking load vector is perpendicular to the striking surface of the steering arm.

What is claimed is:

1. An arm stopper mechanism comprising:
a steering arm which turns about an output shaft of a steering apparatus, and to which two tie rods respectively connected to wheels are attached; and
a stopper that is provided around the output shaft, and restricts a turning angle of the steering arm,
wherein when a center line refers to an imaginary straight line that passes through the output shaft and extends in a longitudinal direction of a vehicle, the steering arm comprises, in a neutral state:
an output shaft hole which is provided on the center line, and into which the output shaft is fitted;
two tie rod holes which are respectively provided to be positioned rightward and leftward from the center line and rearward from the output shaft hole, and to which the tie rods are respectively attached; and
two striking surfaces which are respectively provided to be positioned rightward and leftward from the center line and rearward from the output shaft hole, and which strike against the stopper,
wherein the stopper comprises two contact surfaces that are respectively provided to be positioned rightward and leftward from the center line and in a turning direction of the striking surfaces of the steering arm, and are respectively brought into contact with the striking surfaces, and wherein an angle formed by the two contact surfaces of the stopper is greater than an angle formed by the two striking surfaces of the steering arm, and is greater than or equal to 180°, said angle formed by the two contact surfaces being formed in such a manner that a bisector of the angle formed by the two contact surfaces intersects the stopper.

2. The arm stopper mechanism according to claim 1, wherein a total angle is smaller than or equal to 270°, the total angle being obtained by summing the angle formed by the two contact surfaces of the stopper and the angle formed by the two striking surfaces of the steering arm.

3. The arm stopper mechanism according to claim 1, wherein an entirety of a main body of the steering arm for the attachment of the tie rods has a plate shape, and when seen from below, the steering arm has a shape in which a folding fan is deployed at an acute angle, and portions of the folding fan are respectively bent outward from the respective middle portions of opposite wings of the folding fan,
wherein the output shaft hole is disposed on a center axis of the folding fan, and the two tie rod holes are respectively disposed at arbitrary positions in an outer circumferential edge of the folding fan, and
wherein the two striking surfaces of the steering arm are respectively provided at side portions of the main body of the steering arm.

4. The arm stopper mechanism according to claim 3, wherein the stopper is provided to protrude downward from the steering apparatus, and when seen from below, the stopper has a shape in which a trapezoidal portion with a substantially trapezoidal shape is joined to a rectangular portion with a substantially rectangular shape in such a manner that a lower base of the trapezoidal portion overlaps with one of long sides of the rectangular portion,
wherein the trapezoidal portion and the rectangular portion are disposed in such a manner that a center point of the output shaft coincides with a center point of the lower base of the trapezoidal portion and a center point of the one of long sides of the rectangular portion, and
wherein a short side of the rectangular portion has same width as a separation distance between the striking surface and a parallel plane that passes through the center point of the output shaft hole of the steering arm and is parallel with the striking surface, and a long side of the rectangular portion not joined to the trapezoidal portion functions as the contact surfaces.

5. The arm stopper mechanism according to claim 1, wherein an entirety of a main body of the steering arm for the attachment of the tie rods has a plate shape, and when seen from below, the steering arm has a folding fan shape deployed at an acute angle,
wherein the output shaft hole is disposed on a center axis of the folding fan, and the two tie rod holes are respectively disposed in vicinities of opposite wings in an outer circumferential edge of the folding fan, and
wherein the two striking surfaces of the steering arm are respectively provided in side portions of a protruding portion that protrudes upward from vicinity of a center of an upper surface of the main body of the steering arm.

6. The arm stopper mechanism according to claim 5, wherein the stopper is provided to protrude downward from the steering apparatus, and when seen from below, the stopper has a substantially circular shape which is obtained when a circular arc-shaped portion is cut away from the stopper, the circular arc-shaped portion having the center point of the output shaft as a center thereof, and cut-away end surfaces of the stopper function as the contact surfaces, respectively.

7. A steering apparatus comprising:
the arm stopper mechanism according to claim 1.

8. The steering apparatus according to claim 7, further comprising an input shaft and a steering shaft member,
wherein the input shaft has an input shaft engaging portion that is serration-fitted into the steering shaft member, and is engaged with a steering shaft member engaging portion provided in the steering shaft member so that respective circumferential positions of the input shaft and the steering shaft member are set, and
wherein the output shaft has an output shaft engaging portion that is serration-fitted into the steering arm, and is engaged with a steering arm engaging portion provided in the steering arm so that respective circumferential positions of the output shaft and the steering arm are set.

9. The steering apparatus according to claim 8,
wherein one of the input shaft engaging portion and the steering shaft member engaging portion is a linear concave portion in which teeth of one of male and female serrations for the fitting of the input shaft into the steering shaft member are removed, and
wherein other of the input shaft engaging portion and the steering shaft member engaging portion is a linear convex portion which is obtained by filling up a gap between teeth of other of male and female serrations for the fitting of the input shaft into the steering shaft member.

10. The steering apparatus according to claim 8,
wherein one of the output shaft engaging portion and the steering arm engaging portion is a linear concave portion in which teeth of one of male and female serrations for the fitting of the output shaft into the steering arm are removed, and
wherein other of the output shaft engaging portion and the steering arm engaging portion is a linear convex portion which is obtained by filling up a gap between teeth of other of male and female serrations for the fitting of the output shaft into the steering arm.

11. The steering apparatus according to claim 8,
wherein one of the input shaft engaging portion and the steering shaft member engaging portion is a concave portion that is formed in an axial end portion of one of male and female serrations for the fitting of the input shaft into the steering shaft member, and
wherein other of the input shaft engaging portion and the steering shaft member engaging portion is a convex portion that is formed in an axial end portion of other of male and female serrations for the fitting of the input shaft into the steering shaft member.

12. The steering apparatus according to claim 8,
wherein one of the output shaft engaging portion and the steering arm engaging portion is a concave portion that is formed in an axial end portion of one of male and female serrations for the fitting of the output shaft into the steering arm, and
wherein other of the output shaft engaging portion and the steering arm engaging portion is a convex portion that is formed in an axial end portion of other of male and female serrations for the fitting of the output shaft into the steering arm.

13. The steering apparatus according to claim 7, further comprising:
a steering handlebar-side input shaft;
a steering wheel-side output shaft;
a torsion bar that connects the input shaft and the output shaft, and can be twisted; and
a rotation restriction portion that is provided at an overlapping portion in which the input and output shafts overlap with each other in an axial direction, and restricts a relative rotation range of the input and output shafts.

14. The steering apparatus according to claim 13,
wherein the overlapping portion is formed when the input shaft is inserted into the output shaft,
wherein the rotation restriction portion comprises:
an input shaft main body that is formed in the input shaft and has a circular axial cross section;
a protruding portion that is formed in the input shaft and protrudes radially outward from the input shaft main body;
an insertion hole main body that is formed in the output shaft and has a circular axial cross section into which the input shaft main body is inserted; and
a circumferential hole that extends radially outward from the insertion hole main body and extends in a circumferential direction of the insertion hole main body, and that restricts the relative rotation range by restricting a circumferential operation range of the protruding portion.

15. The steering apparatus according to claim 13,
wherein the overlapping portion is formed when the input shaft is inserted into the output shaft,
wherein the rotation restriction portion comprises:
an input shaft main body that is formed in the input shaft and has a circular axial cross section in which a concave portion is formed at a part of the circular axial cross section; and
an insertion hole main body that is formed in the output shaft and has a circular axial cross section in which a convex portion is formed at a part of the circular axial cross section, into which the input shaft main body is inserted.

16. The steering apparatus according to claim 7, further comprising:
a worm wheel that meshes with a worm fixed to a motor output shaft of a motor and is fixed to the output shaft, and is made of resin, wherein
the output shaft outputs a steering force to the wheels.

17. The steering apparatus according to claim 16,
wherein the output shaft is serration-joined to the worm wheel.

18. The steering apparatus according to claim 7, further comprising a housing,
wherein the housing and the stopper are separately formed, and the stopper is attached to a lower surface of the housing.

19. The arm stopper mechanism according to claim 18,
wherein a flange portion is formed at a lower portion of the housing, and
wherein the stopper is attached to the flange portion with a bolt.

20. The steering apparatus according to claim 7, further comprising:
an input shaft that is connected to a steering shaft connected to steering handlebars;
a sensor that detects a steering state of the steering handlebars;
a motor;
a controller that controls the motor based on a detection signal from the sensor; and
a torque transmission mechanism that transmits torque generated by the motor to the output shaft, wherein the controller is accommodated in a case of the motor, and the output shaft is connected to the input shaft.

21. The arm stopper mechanism according to claim 1, wherein a shock absorbing member which absorbs an impact is provided on at least one of the two striking surfaces, or at least one of the two contact surfaces.

22. The arm stopper mechanism according to claim 21, wherein the shock absorbing member is an elastically deformable elastic body.

23. The arm stopper mechanism according to claim 22, wherein a stepped portion is provided on at least one of the two striking surfaces, or at least one of the two contact surfaces, and the stepped portion collides with the shock absorbing member.

24. The arm stopper mechanism according to claim 21, wherein the shock absorbing member is a shock absorbing apparatus which dissipates vibration energy and reduces a vibration amplitude of an impact.

25. The arm stopper mechanism according to claim 1, further comprising:

an attachment position varying mechanism that can change a distance from the output shaft to an attachment position of the tie rod.

26. The arm stopper mechanism according to claim 25, wherein the steering arm has right and left tie rod holes to which the tie rods are respectively attached, and wherein each of the right and left tie rod holes is formed by a slender hole in parallel with each of the two striking surfaces, or a slender hole that extends radially with respect to the output shaft hole, so that the attachment position varying mechanism is constituted.

27. The arm stopper mechanism according to claim 25, wherein the steering arm has right and left tie rod holes to which the tie rods are respectively attached, and wherein each of the right and left tie rod holes is formed by a plurality of holes which are disposed in parallel with each of the two striking surfaces, or a plurality of holes which are extended radially with respect to the output shaft hole, so that the attachment position varying mechanism is constituted.

28. The arm stopper mechanism according to claim 25, wherein the steering arm has a slender hole that is positioned rearward from the output shaft hole and extends in the longitudinal direction, and a connecting member that is connected to the slender hole, wherein right and left tie rod holes for the attachment of the respective tie rods are provided in the connecting member in such a manner that the respective attachment positions of the tie rods are respectively positioned rightward and leftward from the center line, and wherein the attachment position varying mechanism is constituted by the slender hole and the connecting member.

29. The arm stopper mechanism according to claim 1, wherein the steering arm is made of a metallic material or a resin material, a specific gravity of which is smaller than that of iron.

30. The arm stopper mechanism according to claim 1, wherein a side portion of a main body of the steering arm has a thickness greater than that of other portions of the main body, the side portion functioning as one of the two striking surfaces.

31. A method of assembling a steering apparatus, the steering apparatus comprising:

a steering handlebar-side input shaft;

a steering wheel-side output shaft;

a torsion bar that connects the input shaft with the output shaft, and can be twisted;

a rotation restriction portion that is provided in an overlapping portion in which the input shaft and output shafts overlap with each other in an axial direction, and restricts a relative rotation range of the input and output shafts; and an arm stopper mechanism that has a steering arm which rotates about the output shaft, and to which two tie rods respectively connected to wheels are attached; and a stopper that is provided around the output shaft and restricts a turning angle of the steering arm, wherein when a center line refers to an imaginary straight line that passes through the output shaft and extends in a longitudinal direction of a vehicle, the steering arm comprises, in a neutral state:

an output shaft hole which is provided on the center line, and into which the output shaft is fitted;

two tie rod holes which are respectively provided to be positioned rightward and leftward from the center line and rearward from the output shaft hole, and to which the tie rods are respectively attached; and two striking surfaces which are respectively provided to be positioned rightward and leftward from the center line and rearward from the output shaft hole, and which strike against the stopper, wherein the stopper comprises two contact surfaces that are respectively provided to be positioned rightward and leftward from the center line and in a turning direction of the striking surfaces of the steering arm, and are respectively brought into contact with the striking surfaces, and wherein an angle formed by the two contact surfaces of the stopper is greater than an angle formed by the two striking surfaces of the steering arm, and is greater than or equal to 90°, the method comprising:

determining a neutral direction of the input and output shafts with respect to an axis thereof by rotating the input and output shafts relative to each other, while restricting a relative rotation range of the input and output shafts via the rotation restriction portion in a state where the overlapping portion is formed.

32. The method of assembling a steering apparatus according to claim 31, the method further comprising:

determining a position at which an output voltage of a sensor becomes a neutral voltage state by moving the input shaft or the output shaft in the axial direction in a state where neutral state of the input and output shafts with respect to the axis thereof is maintained, while measuring the output voltage of the sensor that detects a relative rotation angle of the input and output shafts by detecting a position of a member which axially moves in response to a change in the relative rotation angle of the input and output shafts.

* * * * *